United States Patent [19]
Murakami et al.

[11] Patent Number: 5,923,320
[45] Date of Patent: *Jul. 13, 1999

[54] LIQUID-CRYSTAL DISPLAY HAVING THE CAPABILITY OF A TABLET

[75] Inventors: Hiroshi Murakami; Masafumi Itokazu; Ken-ichi Nakabayashi; Kazuhiro Takahara; Michiya Oura; Masami Oda, all of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/511,613

[22] Filed: Aug. 4, 1995

[30] Foreign Application Priority Data

Aug. 10, 1994 [JP] Japan .................................. 6-188214
Jun. 28, 1995 [JP] Japan .................................. 7-162164

[51] Int. Cl.$^6$ ..................................................... G09G 5/00
[52] U.S. Cl. .......................................... 345/179; 345/173
[58] Field of Search .................................. 345/156, 173, 345/174, 175, 179; 349/12

[56] References Cited

U.S. PATENT DOCUMENTS

| | | | |
|---|---|---|---|
| 5,192,826 | 3/1993 | Aoki | 84/737 |
| 5,241,308 | 8/1993 | Young | 341/34 |
| 5,283,556 | 2/1994 | Ise | 345/174 |
| 5,392,058 | 2/1995 | Tagawa | 345/173 |
| 5,442,373 | 8/1995 | Nomura et al. | 345/173 |
| 5,491,706 | 2/1996 | Tagawa et al. | 345/174 |
| 5,506,375 | 4/1996 | Kikuchi | 178/18 |
| 5,534,892 | 7/1996 | Tagawa | 345/173 |
| 5,552,568 | 9/1996 | Onodaka et al. | 345/156 |

*Primary Examiner*—Amare Mengistu
*Assistant Examiner*—Ricardo Osorio
*Attorney, Agent, or Firm*—Greer, Burns & Crain, Ltd.

[57] ABSTRACT

Disclosed is a liquid-crystal display having the capability of a tablet which offers high image quality and a high response speed. An active matrix type liquid-crystal display having the capability of a tablet comprises: an active matrix type liquid-crystal display composed of a device substrate having a plurality of scan electrodes, a plurality of data electrodes, a plurality of pixel electrodes, and a plurality of switching devices, and an opposed substrate holding a liquid crystal in cooperation with the device substrate; a voltage detector that when brought into contact with a display surface of the liquid-crystal display, detects pulses, which are applied consecutively to the scan electrodes and data electrodes, through electrostatic coupling between the detector and the scan electrodes or between the detector and the data electrodes and that outputs a detected signal; and a position detector for detecting a contact position of the detector on the basis of the detected signal. Herein, the device substrate is situated on the side of the observer of the display. The positions of data electrodes lying in the vicinity of a stylus are detected during a data electrode position detection period defined as a period during which no pulses are applied to scan electrodes. Positions of scan electrodes lying in the vicinity of the stylus are identified by detecting display scanning pulses that are applied consecutively to a plurality of scan electrodes in order to cause the switching devices to conduct consecutively during a display data writing period.

8 Claims, 56 Drawing Sheets

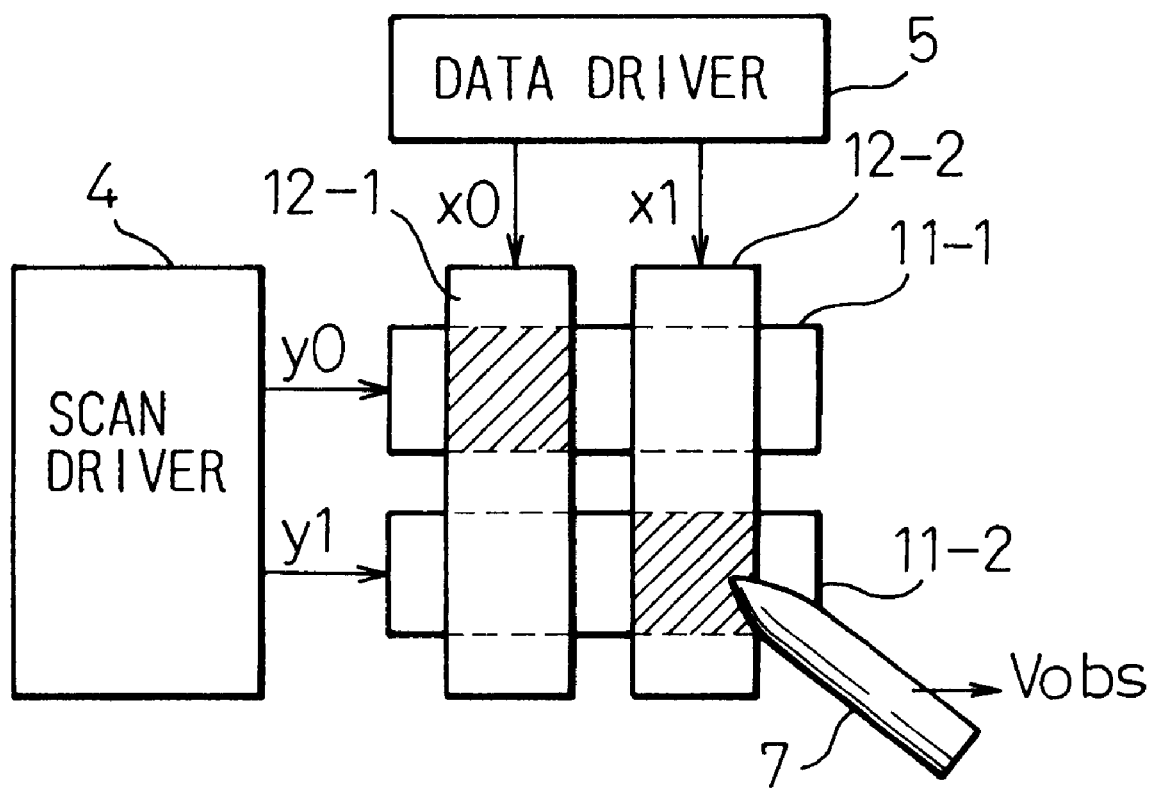

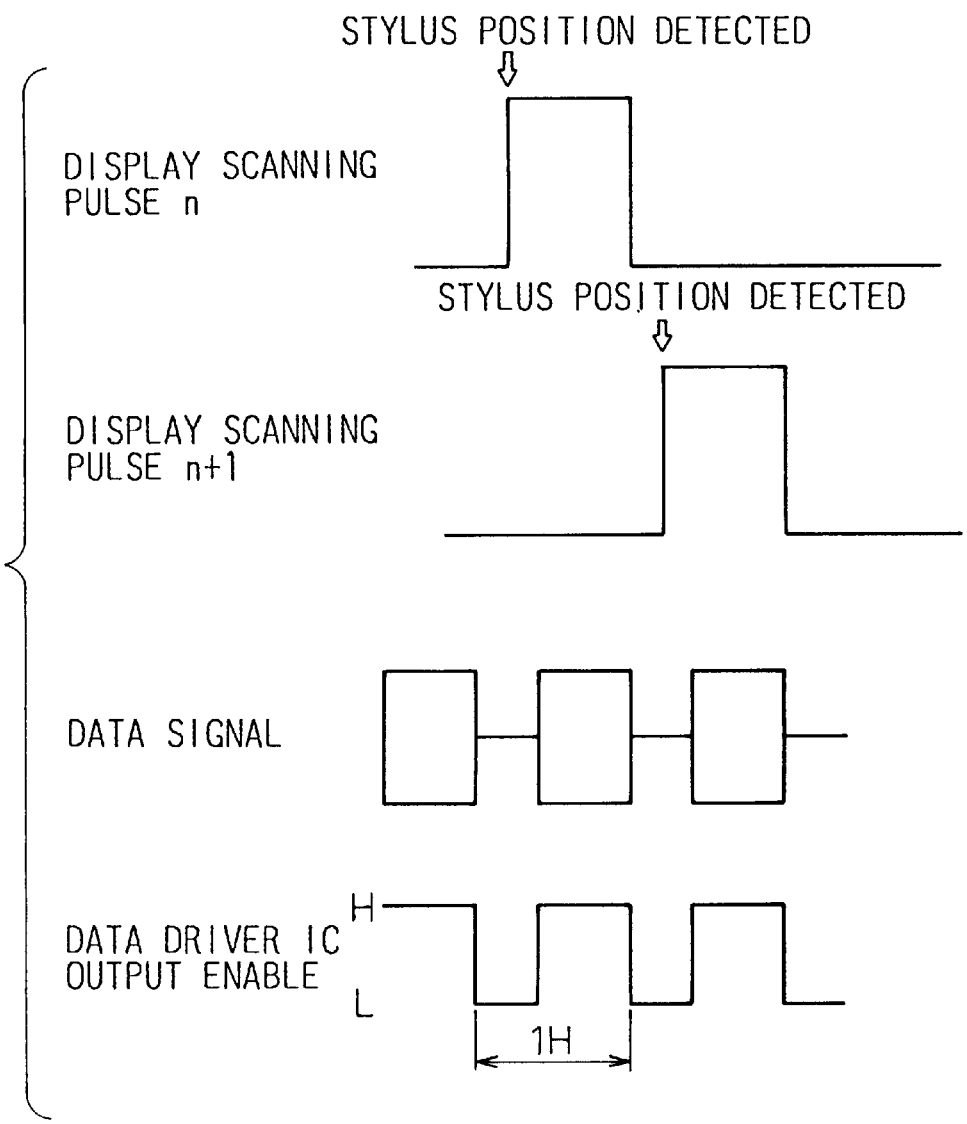

DETECTION DURING A VERTICAL-RETRACE PERIOD

DATA SIGNAL

HORIZONTAL SLANNING PULSES ARE APPLIED CONSECUTIVELY TO ALL DATA ELECTRODES.

HORIZONTAL SCANNING PULSES ARE APPLIED CONSECUTIVELY TO DATA ELECTRODED L-M TO L+M AT GIVEN INTERVALS DURING A HORIZONTAL-RETRACE PERIOD.

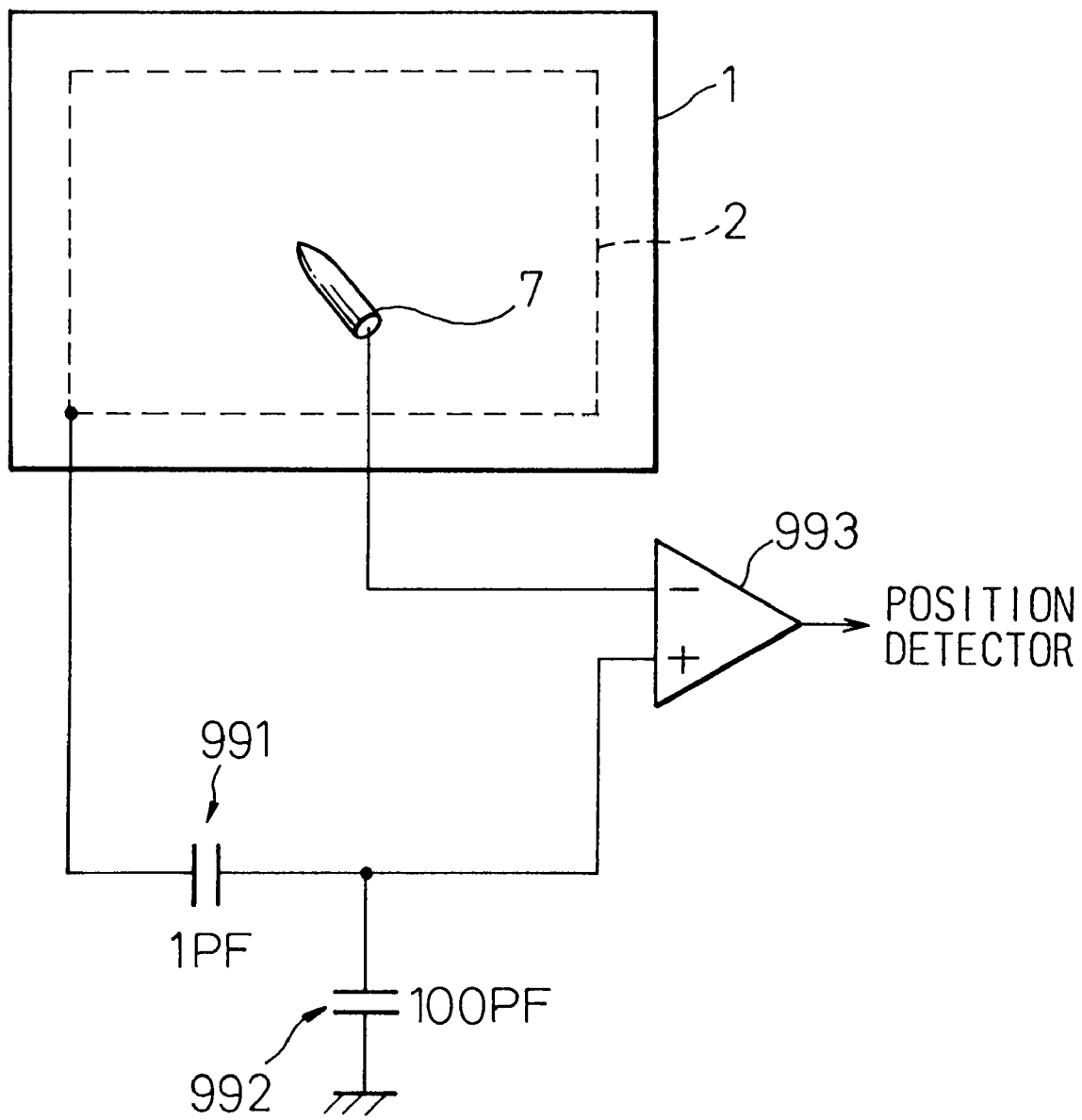

CONTACT STATE

DRIVING SIGNALS AND STYLUS OUTPUT $$h = \frac{(D_{n-1} - D_{n+2}) - (D_n - D_{n+1})}{(D_n + D_{n+1}) - (D_{n-1} + D_{n+2})}$$

ACTUAL TRAJECTORY

RESULT OF READING

TRAJEGORY OF A STYLUS

PRINCIPLE OF PREDICTION

RESULT

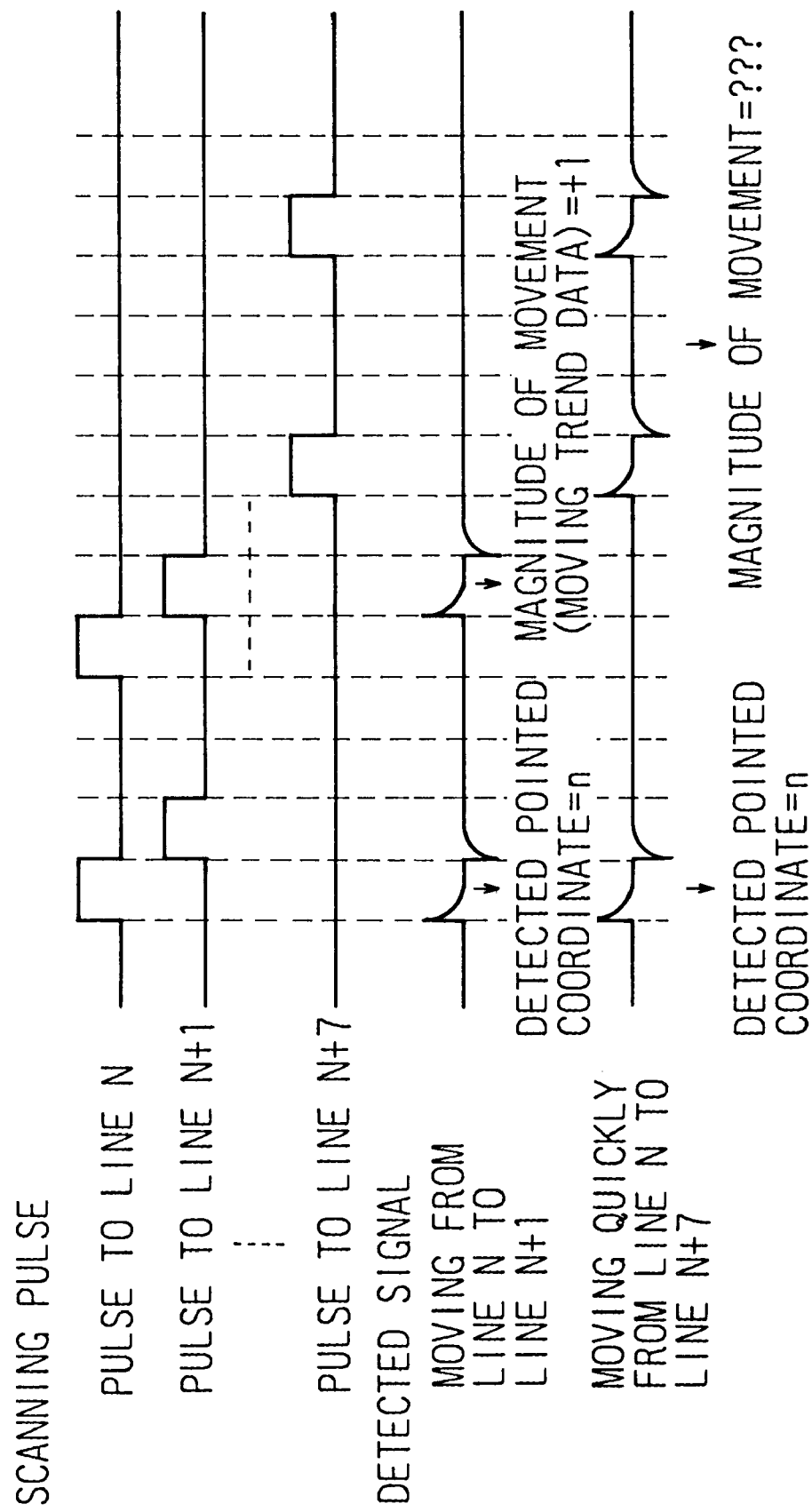

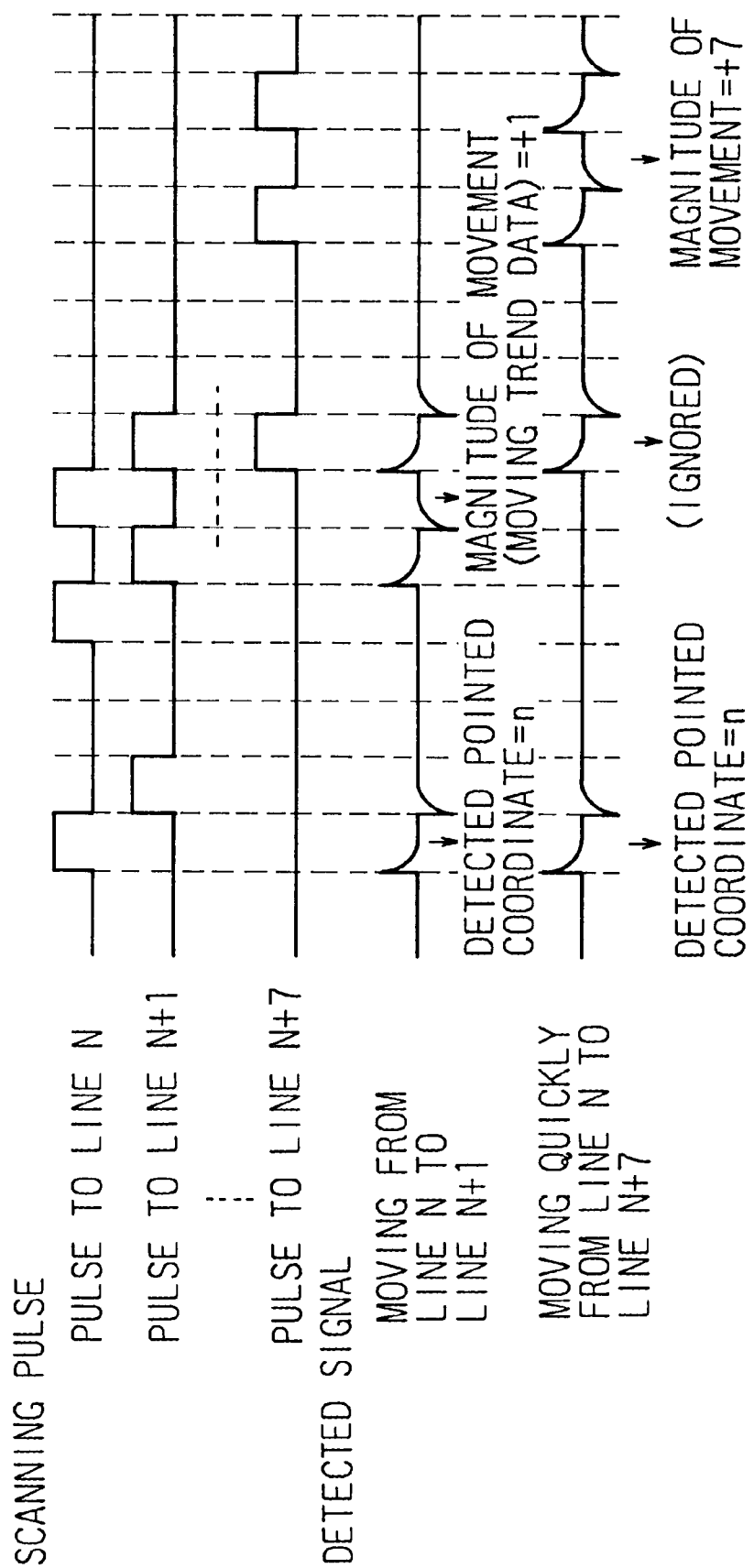

↑ TWO CONSECUTIVE PULSES ALONE ARE DETECTED.

LIQUID-CRYSTAL DISPLAY HAVING THE CAPABILITY OF A TABLET

BACKGROUND OF THE INVENTION

1. Field of the Invention

The present invention relates to a liquid-crystal display (hereinafter, LCD) having the capability of a tablet in which a position of a stylus in contact with a display screen is detected using an electric signal developed at the stylus through electrostatic coupling between the stylus and electrodes in the LCD.

2. Description of the Related Art

In recent years, personal computers and word processors having the capability of a stylus input (tablet) unit have begun to prevail. This has facilitated the tendency toward more compact and lightweight information equipment and improved ease of operation. Requirements for an input unit range from cost-effectiveness, precision, and compact appearance to the possibility that the input unit can be incorporated into a color display.

Various input methods have been proposed to date. Above all, an electrostatic coupling (also called capacitive coupling) method, which enables integration of an input unit into an LCD and is effective in realizing a compact and lightweight design and in reducing cost, is attracting attention.

The principle of applied voltage detection based on electrostatic coupling will be described. When a point on a LCD is touched by the tip of a stylus, a series capacitance is induced between the stylus and electrodes in the LCD via a glass substrate. Assuming that a pulsed voltage that scans each electrode is applied continually to the electrodes, when a pulse is applied to an electrode located close to the stylus, an alternating component (differential voltage) of the applied pulsating voltage is detected in a detected signal provided by the stylus. Therefore, the contact position of the stylus on the LCD is calculated by detecting the position of an electrode to which a pulse causing the detected signal to have a peak value is applied. The coordinates of the contact position shall be referred to as the pointed coordinates.

A video signal fed to an LCD is of the same type as the one fed to a CRT or the like. The period required for feeding video signals constituting one screen is referred to as a frame. The period shall also be called a vertical scanning period. Within a frame, a signal representing one horizontal line is fed continually to the vertical arrays of pixels. This period of this signal shall be referred to as a display period. The remnant of one frame from which the display period is subtracted is a period referred to as a vertical-retrace period. The vertical-retrace period originally means a period during which an electron beam returns from the right lower corner of a CRT that is a scanning end position of a screen to the left upper corner of the CRT that is a scanning start position. The same kind of video signals are fed to an LCD. The term "vertical-retrace period" is therefore often used as it is, and will also be used herein. Normally, a ratio of the vertical-retrace period to one frame is as small as several percentages.

In a conventional simple matrix type LCD, voltages that cause currents in scan electrodes are consecutively applied, vertically and horizontally, during a vertical-retrace period in order to acquire a detected signal. Thereafter, pointed coordinates of a stylus are calculated on the basis of the variations of the detection signal. At this time, the orientation of a liquid crystal in the simple matrix type LCD is dependent on the effective voltage of the applied voltage. Pulses of any voltage can be applied as detection pulses during the vertical-retrace period as long as the voltage does not affect the effective voltage greatly.

In recent years, an active matrix type LCD able to display a screen composed of a large number of pixels with high image quality and a high-quality color display has been widely adopted.

In the active matrix type LCD, scan electrodes, data electrodes, and thin-film transistors (hereinafter TFTs) are formed on a device substrate. An opposed substrate on which common electrodes are formed is opposed to the device substrate. A liquid crystal layer is interposed between the device substrate and opposed substrate. The LCD is usually placed so that the opposed substrate will face an observer in consideration of current leakage through off-state TFTs caused by strong light such as direct sunlight. When a stylus is put onto a display surface, the stylus comes into contact with the opposed substrate. The scan electrodes and data electrodes, to which pulses are applied and detected due to electrostatic coupling with the stylus, are formed on the device substrate opposed to the opposed substrate. When an LCD is placed as mentioned above, the solid common electrodes act as a kind of shield. Even if the stylus is put on the LCD, the voltage applied to the device substrate is hardly detected and the contact position of the stylus cannot be identified with sufficiently high precision.

In a conventional LCD, scan electrodes are scanned consecutively during a vertical-retrace period in order to identify a pointed y-coordinate. In this case, TFTs are turned on, and voltage in data electrodes is placed in cells. As a result, image information written during a display period is destroyed. This makes it impossible to scan scan electrodes consecutively during a vertical-retrace period in order to identify a pointed y-coordinate. Consequently, a pointed y-coordinate cannot be identified.

A signal detected by a stylus through electrostatic coupling contains various kinds of noise passing through the liquid-crystal panel. The noise deteriorates the position detection accuracy.

For identifying coordinates pointed to by a stylus, the position of the scan electrode or data electrode located closest to the position at which the stylus comes into contact with the liquid-crystal panel is detected. Resolution is therefore dependent on the spacing between adjoining electrodes. There is also a demand to indicate the coordinates with higher resolution.

SUMMARY OF THE INVENTION

The first object of the present invention is to provide an LCD having the capability of a tablet in which the electrostatic coupling method enabling integration into an LCD and helping realize a compact lightweight design and reduce cost is implemented in an active matrix type LCD, and which permits high image quality and a high response speed. The second object of the present invention is to improve the sensitivity of an LCD having the capability of a tablet which is based on an active matrix type LCD and adopts the electrostatic coupling method, and to enable high-precision detection. The third object of the present invention is to improve the detection rate of an LCD having the capability of a tablet which is based on an active matrix type LCD and adopts the electrostatic coupling method. The fourth object of the present invention is to improve the precision in position detection made by an LCD having the capability of a tablet. The fifth object of the present invention is to provide an LCD having the capability of a tablet which is capable of indicating coordinates with high resolution.

FIGS. 1A and 1B show the principle and structure of an LCD having the capability of a tablet according to the first aspect of the present invention. FIG. 2 is an explanatory diagram concerning the actions performed in the LCD. In FIG. 2, black is displayed at (x0, y0) and (x1, y1) in a normally-white mode (in this mode, white is displayed with application of 0 V, and black is displayed with application of high voltage) LCD having a matrix of two by two pixels. As shown in FIG. 1A, a stylus is put to the position (x1, y1).

The LCD according to the first aspect of the present invention is characterized in that a device substrate is placed on the side of an observer of the display.

Since the device substrate is placed on the side of an observer, the voltage applied to the device substrate can be detected with high sensitivity. This results in improved detection precision.

An LCD according to the second aspect of the present invention is an active matrix type LCD, wherein no pulses are applied to scan electrodes during a data electrode position detection period. The positions of data electrodes located close to a stylus are detected during the data electrode position detection period. The positions of scan electrodes located close to the stylus are detected by detecting pulses that are applied consecutively to a plurality of scan electrodes in order to cause switching devices to conduct one after another during a display data writing period. The pulses shall be called display scanning pulses.

One example of the data electrode position detection period is a vertical-retrace period. During the verticalretrace period, pulses are applied consecutively to all data electrodes. The pulses shall be referred to as horizontal scanning pulses. Variations in a detected signal responsive to the horizontal scanning pulses are detected. Another example of the data electrode position detection period is a plurality of data electrode position detection periods defined within one frame that is a period during which one frame is displayed by the LCD. Alternatively, a small number of data electrode position detection periods may be defined, or a horizontal-retrace period defined between applications of display scanning pluses to display lines may be defined as a data electrode position detection period. The number of horizontal scanning pulses to be applied during each data electrode position detection period may be determined so that one or more horizontal scanning pulses will be applied to each data electrode during one frame.

Horizontal scanning pulses to be applied to adjoining data electrodes during a vertical-retrace period are different from each other in terms of rise timing and fall timing.

Display scanning pulses to be applied to adjoining scan electrodes are different from each other in terms of rise timing and fall timing.

At least one of the edges of the display scanning pulses used for detection do not coincide with the variations of a display data signal to be applied continually to data electrodes.

A y-coordinate is detected using display scanning pulses. Unlike a conventional simple matrix type LCD, other scanning pulses need not be applied for detection. Destruction of image information will therefore not take place.

When a stylus is put onto a display surface, electrostatic capacitance is induced between the stylus and a scan electrode or data electrode. When a pulse is applied to the scan electrode or data electrode, a differential of the pulse voltage is developed at the stylus. A position detecting means calculates the contact position of the stylus by detecting the position at which a pulse, causing a detected signal to have the largest differential voltage, is applied. In an actual active matrix type LCD, both scan electrodes and data electrodes are arranged at very small intervals. When a stylus is brought into contact with a display surface, a certain level of electrostatic capacitance is induced between the stylus and pluralities of scan electrodes and data electrodes. When the edges of the pulses to be applied consecutively to adjoining electrodes become coincident, phases of differential voltage developed at the stylus are mutually cancel out and position detection is crippled. For high-sensitivity detection of the differential voltage phases, it is essential that the edges of consecutive pulses to be applied to adjoining electrodes do not coincide with each other.

When horizontal scanning pulses are applied consecutively to data electrodes during a data electrode position detection period, it is unnecessary to apply a signal continually to the scan electrodes. Consideration should be taken to ensure that the edges of horizontal scanning pulses to be applied to adjoining data electrodes do not coincide with one another. During the writing of display data, when display scanning pulses are applied consecutively to the scan electrodes, voltages representing display data are applied to associated data electrodes. At this time, it is essential that the edges of not only the pulses to be applied to adjoining scan electrodes but also the edges of the display data pulses to be applied to the data electrodes do not coincide with each other.

For preventing the edges of pulses from coinciding with each other, various techniques are available. The techniques will be described below in conjunction with the embodiments.

In an LCD according to the third aspect of the present invention, n auxiliary pulses, each of which lags a display scanning pulse by a phase difference of substantially 1/n of one frame and which do not substantially affect display data even when applied to a scan electrode, are applied to scan electrodes. A voltage detecting means determines whether a detected signal is responsive to the display scan pulse or with any of the n auxiliary pulses, and calculates a contact position of the voltage detecting means on the basis of the position of the scan electrode to which the display scanning pulse and n auxiliary pulses are applied. The n auxiliary pulses are so short or weak as not to cause an associated switching device to conduct.

The vertical-retrace period can be used as a data electrode position detection period. If a plurality of data electrode position detection periods are defined within one frame, the cycle of detecting a contact position in a horizontal direction is shortened. In this case, however, a means for delaying display data for a data electrode position detection period is necessary. A horizontal-retrace period is defined between periods during which display data concerning each display line is applied to data electrodes. During the horizontal-retrace period, a display scanning pulse must not be applied. Since the horizontal-retrace period cannot be made very long, the number of horizontal scanning pulses applicable during the horizontal-retrace period is small. However, since the horizontal-retrace period can be defined by the number of scan electrodes, horizontal scanning pulses can be applied consecutively to all data electrodes during one frame. A plurality of consecutive horizontal scanning pulses can be applied to each data electrode.

The vertical detection rate is improved by applying auxiliary pulses, which lag behind one another by a phase difference of 1/n of one frame, to a scan electrode. This leads to an improved detection rate in a vertical direction. If the auxiliary pulses are so short or weak as not to cause a switching device at each pixel to conduct, the auxiliary pulses will not affect the display data. A position detecting means can distinguish a scanning pulse from any of the auxiliary pulses according to the timing or strength of a detected signal.

In an LCD according to the fourth aspect of the present invention, a dummy voltage detecting means is located at a position unaffected by scan electrodes and data electrodes formed on a device substrate. An output of the dummy voltage detecting means is subtracted from a detected signal sent from a voltage detecting means.

A signal provided by a stylus is composed of a signal component that is responsive to pulses applied to adjoining electrodes, and a noise component. A dummy stylus is placed at a position at which no signal is acquired but only noise is acquired. The noise is subtracted from an output of the stylus, whereby the noise component is removed. External noise is induced into common electrodes formed on an opposed substrate. Since the common electrodes have low electrode resistance, noise with almost the same level is detected at any position within the opposed substrate. Therefore, when the dummy stylus is placed at a position on the opposed substrate unaffected by the scan electrodes, data electrodes, and a seal, noise alone can be detected. For reference, in a stylus of a electrostatic coupling type, an amplifier amplifies voltage detected at the tip of the stylus and provides an output whose amplitude is about 100 times larger than that of the input voltage. The amplitude of the voltage detected at the tip of the stylus is calculated by multiplying the amplitude of a signal component by a quotient of capacitance on the substrate glass by input capacitance at the tip of the stylus. The input capacitance varies depending on the shape of the tip of the dummy stylus. By changing amplification factors to be set in an amplifier connected in a succeeding stage, the output of noise can be suppressed to the level permitted by the electrostatic coupling type stylus.

In an LCD according to the fifth aspect of the present invention, a position detecting means calculates a contact position of a voltage detecting means by performing interporation using the strengths of a plurality of pulses associated with adjoining scan electrodes or data electrodes located in the vicinity of the contact position and provided by the voltage detecting means.

The tip of a stylus is about 1 mm wide. The stylus therefore detects voltage variations at several electrodes. When the peak voltages of the voltage variations are plotted, curves are drawn to have ridges that are congested to the same extent as the peak voltages occur. Outputs of several electrodes lying in the vicinity of the stylus can be used for approximation. This results in improved resolution.

In an LCD according to the sixth aspect of the present invention, two or more pulses having a given time lag between them are used as a horizontal scanning or display scanning pulse. Based on a phase difference between variations of a detected signal, which is provided by a voltage detecting means, responsive to the plurality of pulses having a given time lag between them, a direction-of-movement detecting means detects a direction of movement made by the voltage detecting means. Alternatively, three or more pulses having a given time lag between adjoining ones may be used as a horizontal scanning or display scanning pulse. A direction-of-movement change detecting means for detecting a change in direction of movement on the basis of a plurality of phase differences among variations of a detected signal responsive to the three or more pulses may be included.

When two or more pulses having a given time lag between them are used as horizontal scanning or display scanning pulses, if a phase difference between variations responsive to the pulses is detected in a detected signal provided by a stylus, the direction of movement made by the stylus moving on a liquid-crystal panel and the moving speed can be detected. Furthermore, when three or more pulses having a given time lag between adjoining ones are used as a horizontal scanning or display scanning pulse, if a change in phase difference among variations responsive to the pulses are detected in a detected signal provided by the stylus, a change in direction of movement made by the stylus and a change in moving speed can be detected.

As mentioned above, according to the present invention, the electrostatic coupling method is implemented in an active matrix type LCD. Consequently, there is provided an LCD, having the capability of a tablet, which offers high image quality and a high response speed, an active matrix type LCD suitable for the use as an LCD having the capability of a tablet, and a method of driving an LCD having the capability of a tablet.

BRIEF DESCRIPTION OF THE DRAWINGS

The present invention will be more clearly understood from the description set forth below with reference to the accompanying drawings, wherein:

FIG. 2 is an explanatory diagram concerning position detection in a simple matrix type LCD;

FIG. 19 shows modifications of pulses;

FIG. 42 shows the configuration of the twelfth embodiment;

FIG. 55 is an explanatory diagram concerning problems arising when a stylus is moved too quickly in the fourteenth embodiment;

FIG. 56 shows display scanning pulses in the sixteenth embodiment; and

DESCRIPTION OF THE PREFERRED EMBODIMENTS

Prior to detailed description of the preferred embodiments of the present invention, an LCD having the capability of a tablet in accordance with a prior art will be described with reference to the accompanying drawings for a better understanding of the differences between the prior art and the present invention.

Figure 1A:
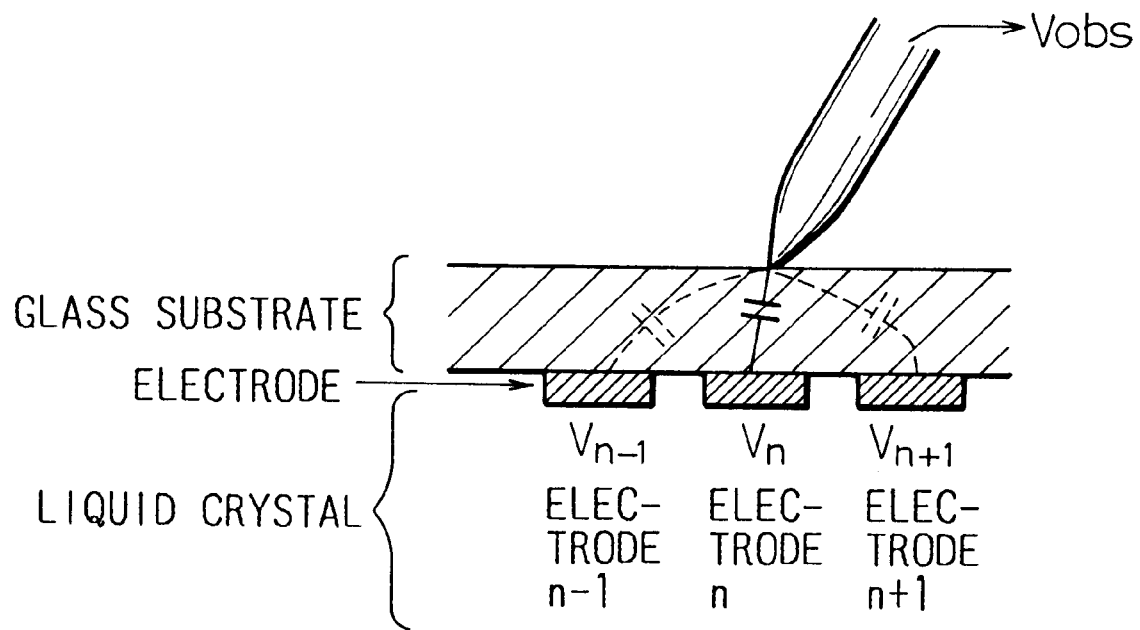
FIGS. 1A and 1B show the principle of detecting a contact position of a stylus according to the electrostatic coupling method.
Figure 1B:
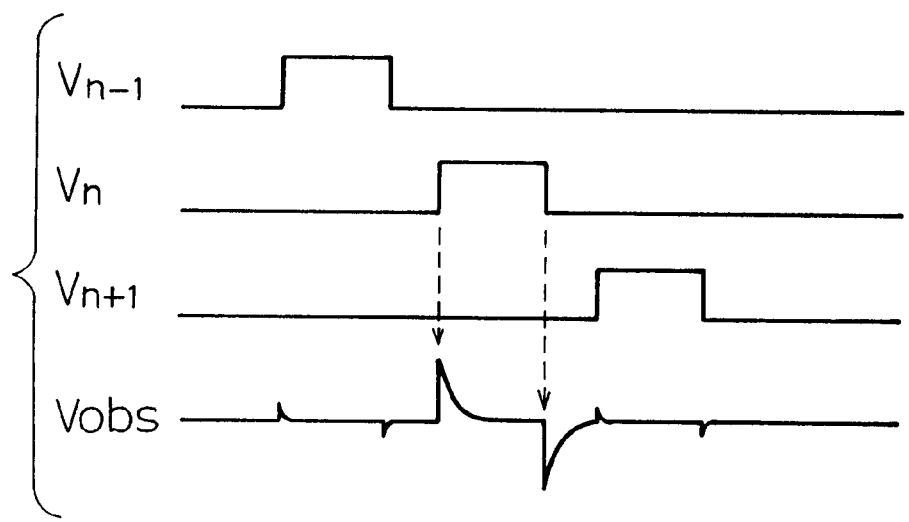

FIGS. 1A and 1B show the principle of applied voltage detection based on electrostatic coupling. FIG. 1A shows a sectional structure with a stylus put onto a surface. FIG. 1B shows operating and detected signals. When the tip of a stylus is put to a point onto an LCD, series capacitance is induced between the stylus and electrodes in the LCD via a glass substrate. Supposing a pulsating quantity that scans each electrode is fed continually, when a pulse is applied to an electrode located closely to the stylus, an alternating component (differential voltage) of the applied pulsating quantity is detected in a detected signal Vobs provided by the stylus. Therefore, a contact position of the stylus on the LCD can be calculated by detecting the position of an electrode to which a pulse causing the detected signal Vobs to have a peak value is applied. The coordinates of the contact position shall be referred to as pointed coordinates. In the drawings referenced below, the same components will be assigned the same reference numerals. No mention will be made of some of the components.

Figure 3:
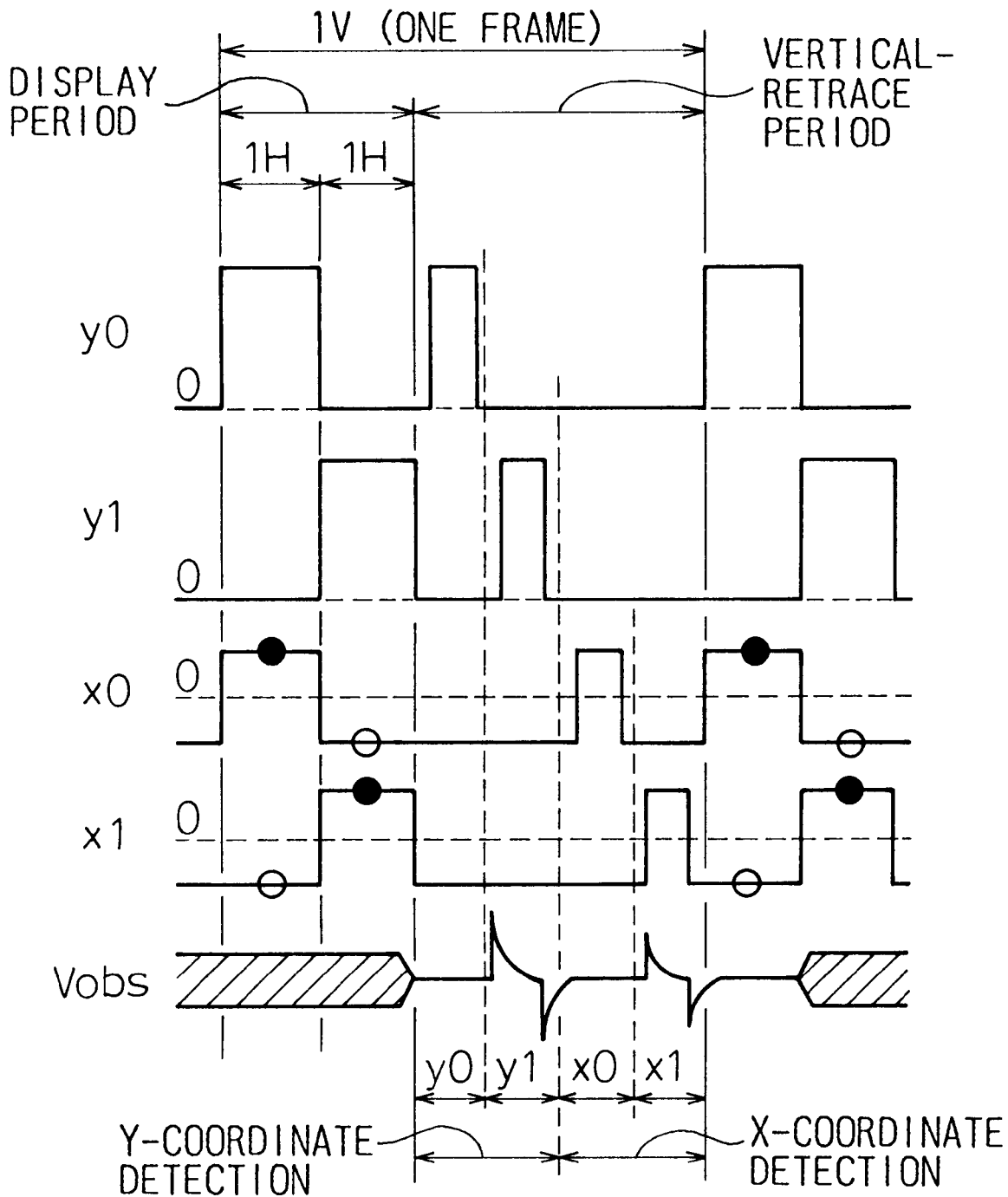
FIG. 3 is a timing chart describing the timing of actions for position detection performed in the simple matrix type LCD.

FIG. 2 shows the structure of a conventional electrostatic coupling type LCD. FIG. 3 shows examples of applied voltage. The LCD shown in FIG. 2 is a simple matrix type LCD. Reference numeral 4 denotes a scan driver. 5 denotes a data driver. 7 denotes a stylus. 11-1 and 11-2 denote scan electrodes. 12-1 and 12-2 denote data electrodes. Signals x0 and x1 are fed to the data electrodes 12-1 and 12-2, while signals y0 and y1 are fed to the scan electrodes 11-1 and 11-2. x0, y0, etc. also denote coordinates in the display. FIGS. 2 and 3 are concerned with a normally-white mode LCD that has a matrix of two by two pixels and that displays black with application of high voltage to the liquid crystal. In FIG. 2, black is displayed at (x0, y0) and (x1, y1), while white is displayed at (x1, y0) and (x0, y1). The stylus is put to the position (x1, y1). These conditions shall apply to the description below.

As shown in FIG. 3, as far as the prior art using a simple matrix type LCD is concerned, voltages that scan each electrode vertically and horizontally are applied during a vertical-retrace period in order to acquire a detected signal. Based on variations of the detected signal, the coordinates (x, y) pointed to by the stylus are detected. At this time, the orientation of the liquid crystal in the simple matrix type LCD is dependent on the effective voltage of the applied voltage. As long as the effective voltage does not vary greatly, pulses of any voltage can be applied during the vertical-retrace period.

In FIG. 3, 1H denotes one horizontal line period. A pulse for scanning each electrode has a pulse duration equivalent to the one horizontal line period. In the example shown in FIGS. 2 and 3, the number of pixels is a product of 2 and 2. The vertical-retrace period is therefore longer than a display period. As mentioned above, the ratio of the vertical-retrace period to a frame is generally small and a position pointed to by the stylus must be detected during a short period.

Figure 4:
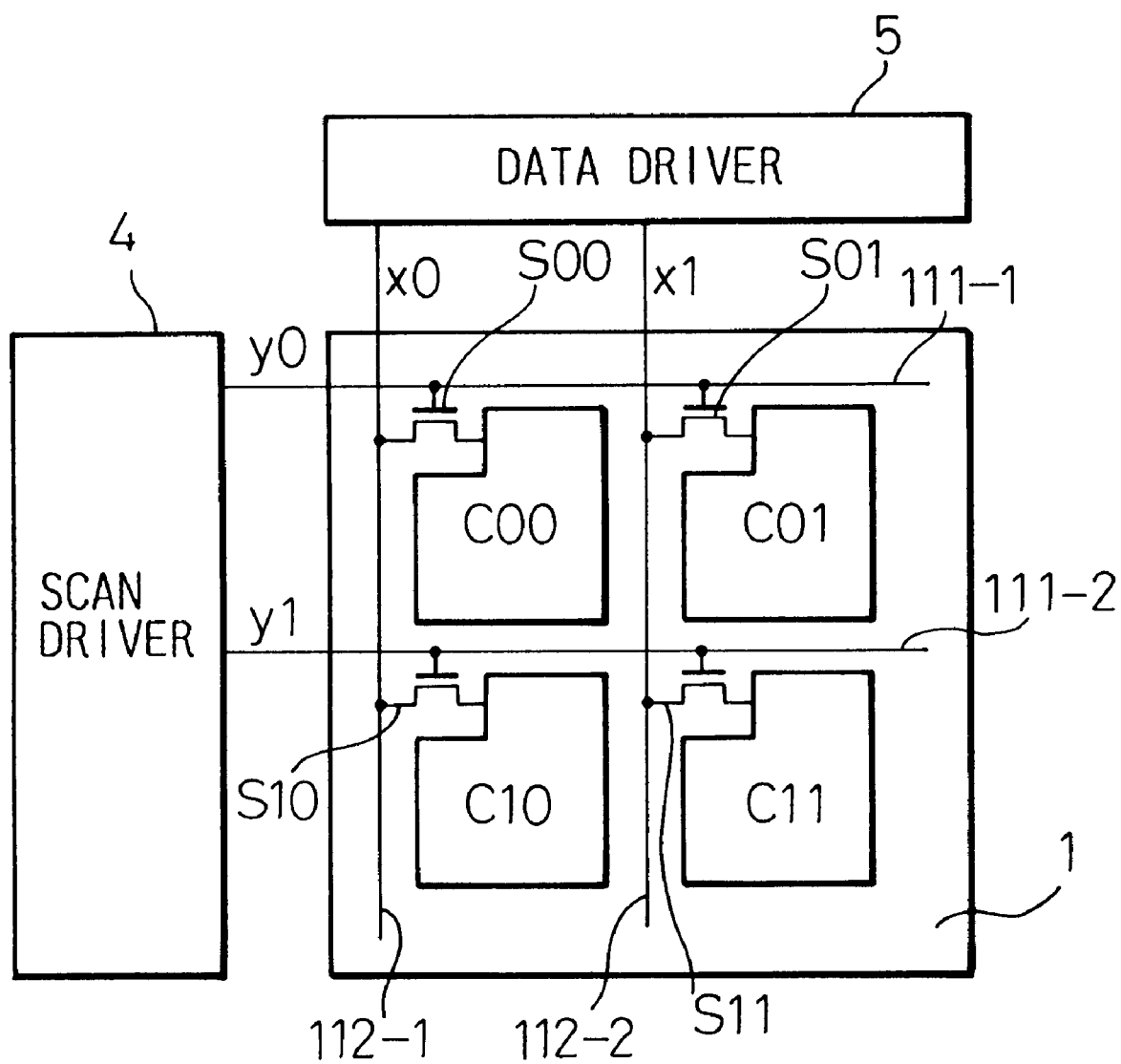
FIG. 4 shows the structural arrangement of an active matrix type LCD.
Figure 5:
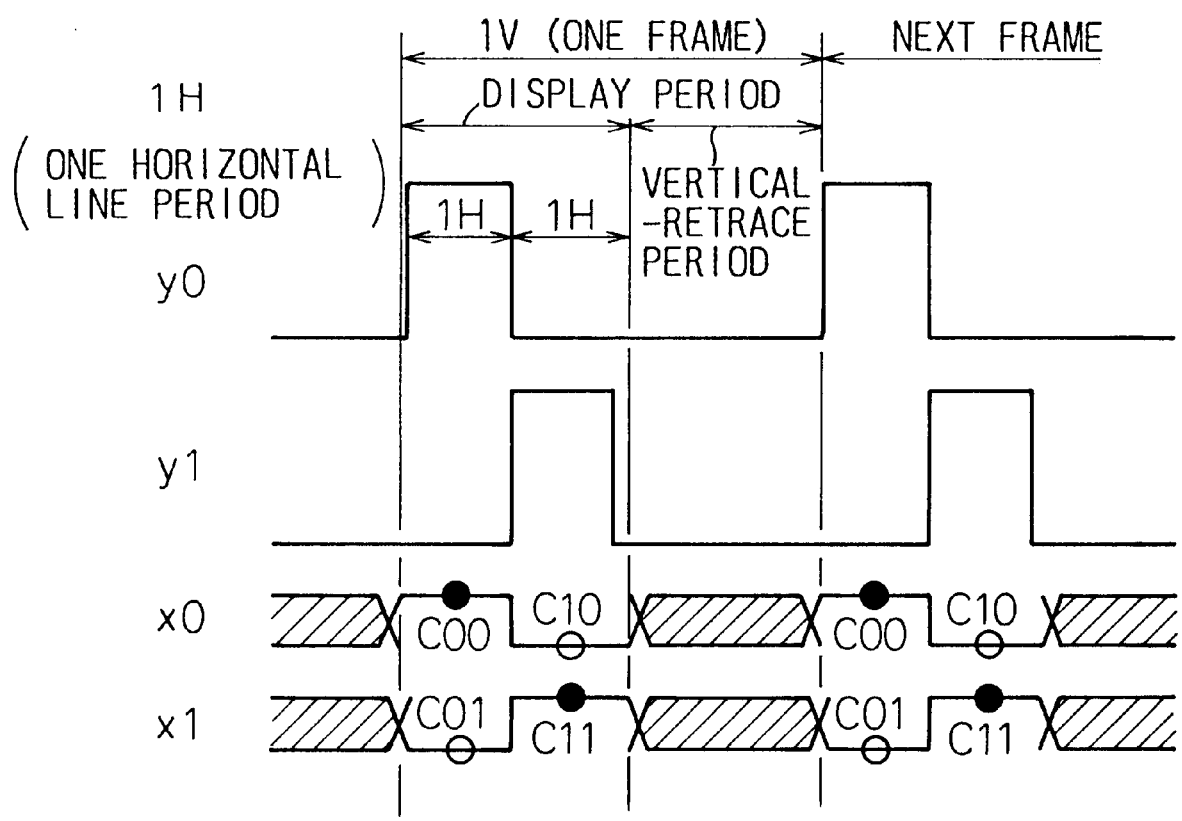
FIG. 5 is a timing chart describing the timing of actions performed in the active matrix type LCD.

FIG. 4 shows the structural arrangement of an active matrix type LCD. FIG. 5 shows waveforms of the operating signals. In FIG. 4, reference numerals 111-1 and 111-2 denote scan electrodes constituting display lines. 112-1 and 112-2 denote data electrodes constituting display columns. S00 to S11 denote switching devices (for example, TFTS) placed at intersections between the scan electrodes and data electrodes. C01 to C11 denote pixel electrodes. These circuit elements are formed on a device substrate 1. An opposed substrate having common electrodes for applying common voltage is opposed to the device substrate 1. A liquid-crystal layer is interposed between the device substrate 1 and opposed substrate. With scanning pulses applied consecutively to the scan electrodes, the TFTs constituting each display line are turned on sequentially. Display data is written in cells (capacitors) formed between the pixel electrodes and common electrodes according to voltage applied to the data electrodes. The voltage representing the display data is retained until the TFTs are turned on again after one display period. As described previously, in consideration of current leakage through off-state TFTs caused by strong light such as direct sunlight, the LCD is placed so that the opposed substrate will face an observer.

Figure 6:
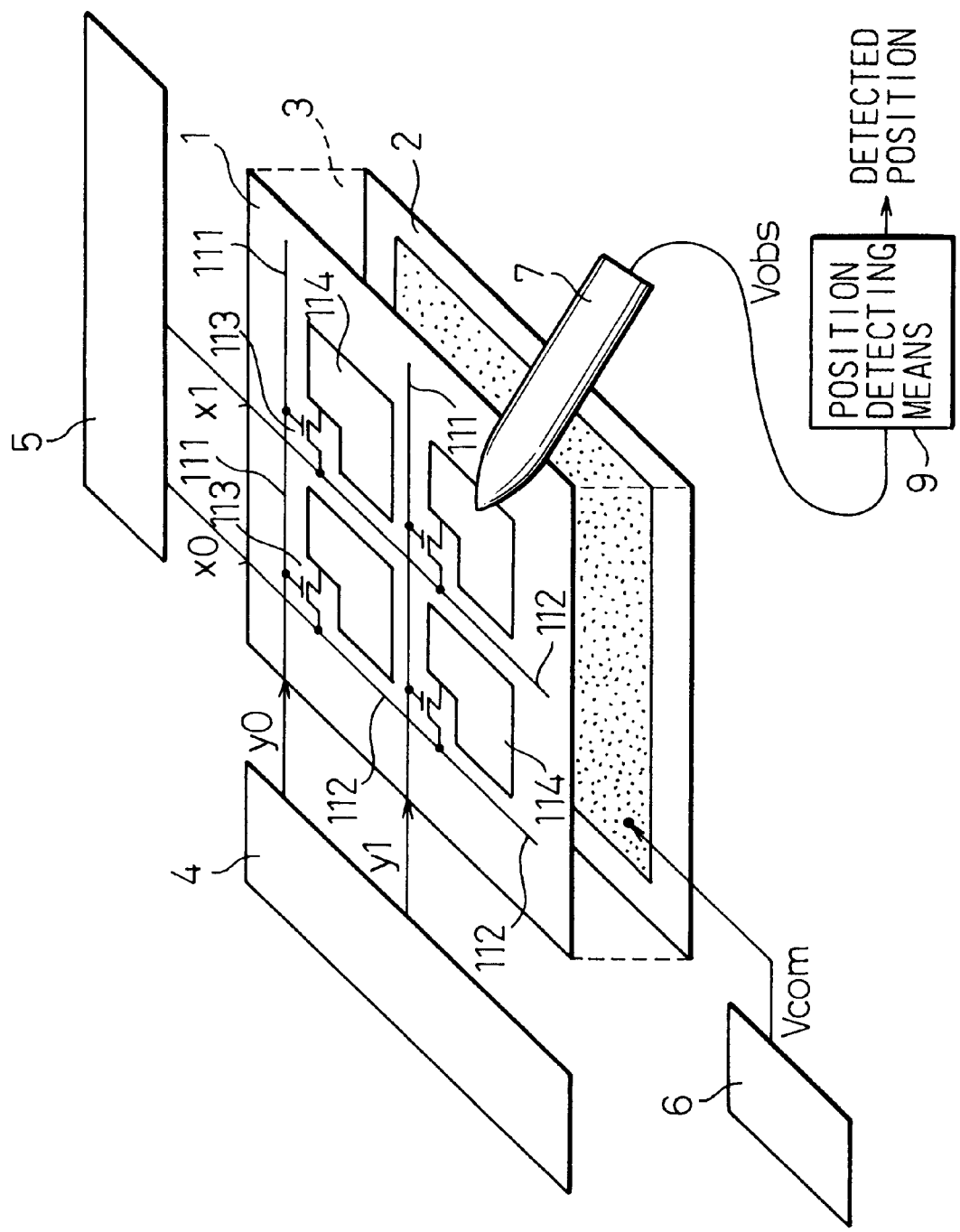
FIG. 6 shows the principle and structure in accordance with the present invention.
Figure 7:
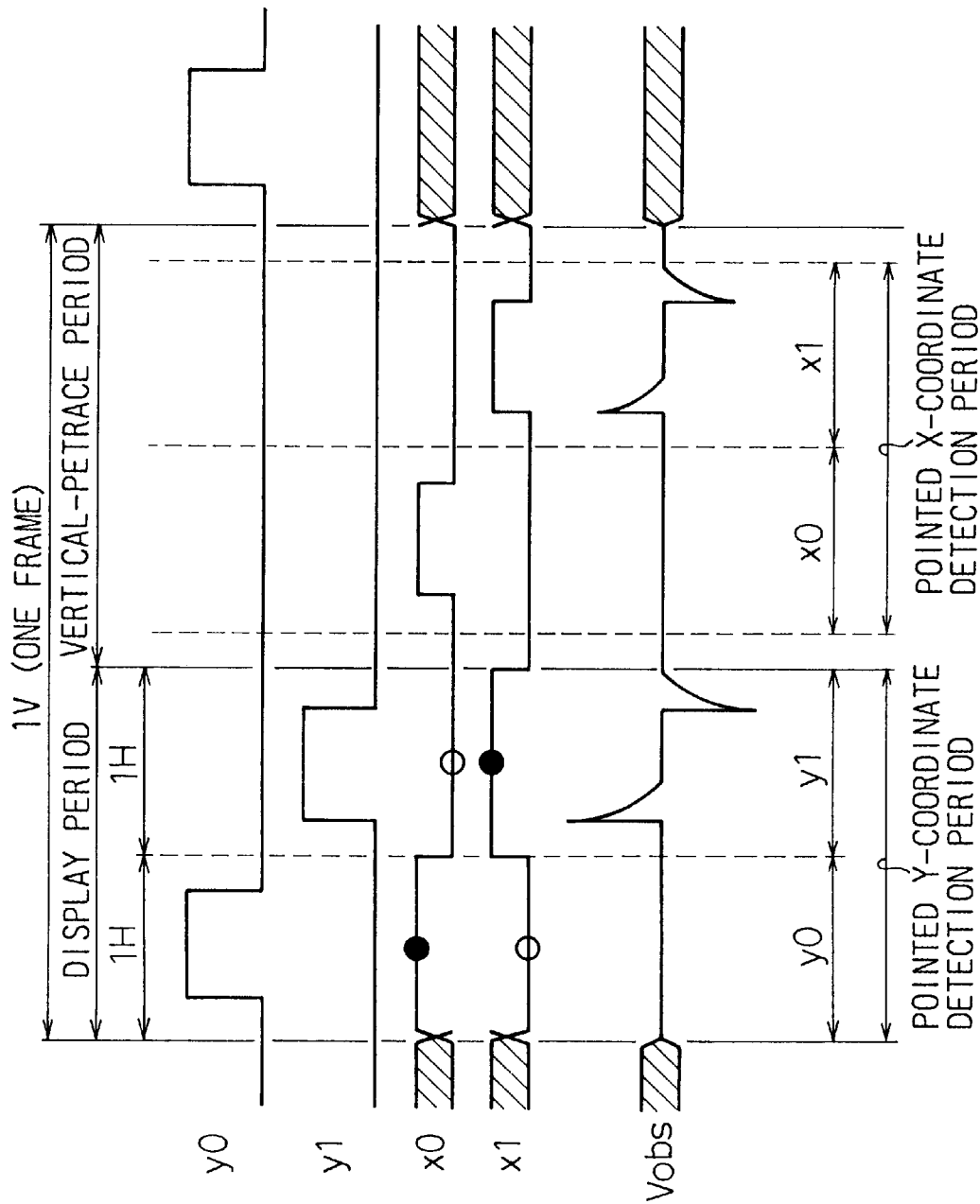
FIG. 7 shows the principle of operation in accordance with the present invention.

FIG. 6 shows the principle and structure of an LCD, having the capability of a tablet, in accordance with the first or second aspect of the present invention. FIG. 7 is an explanatory diagram concerning the operation of the LCD. A normally-white mode LCD (wherein, white is displayed with application of 0 V and black is displayed with application of high voltage) having a matrix of two by two pixels is used to display black at (x0, y0) and (x1, y1) alike. As shown in FIG. 6, a stylus is put to the position (x1, y1).

In FIG. 6, reference numeral 1 denotes a device substrate. The device substrate 1 has a plurality of scan electrodes 111 constituting display lines, a plurality of data electrodes 112 constituting display columns, pixel electrodes 114 formed at intersections between the scan electrodes and data electrodes, and switching devices 113 located at the intersections between the scan electrodes and data electrodes and designed to conduct with the application of pulses (display scanning pulses) to the scan electrodes and to deliver voltages from the data electrodes to the pixel electrodes. 2 denotes an opposed substrate that holds a liquid crystal 3 in cooperation with the device substrate 1 and applies a common voltage. 4 denotes a scan driver. 5 denotes a data driver. 6 denotes a common voltage applying means for applying common voltage Vcom. These components constitute an active matrix type LCD. 7 denotes a stylus that is brought into contact with a display screen. The stylus 7 includes a voltage detecting means for detecting a signal, which is applied continually to the scan electrodes 111 and data electrodes 112, through electrostatic coupling, and provides a detected signal Vobs. A position detecting means 9 calculates a contact position of the stylus 7 on a display screen using the detected signal Vobs. The LCD of the first embodiment of the present invention is characterized in that the device substrate is located on the side of the observer of the display.

In an LCD according to the second aspect of the present invention, no pulses are applied to the scan electrodes during a data electrode position detection period. The positions of the data electrodes 112 located in the vicinity of the stylus 7 are detected during the data electrode position detection period. The positions of the scan electrodes located in the vicinity of the stylus 7 are detected during a display data writing period by sampling display scanning pulses that are applied consecutively to the plurality of scan electrodes 111 in order to cause the switching devices 13 to conduct one after another.

One example of the data electrode position detection period is a vertical-retrace period as shown in FIG. 7. During the vertical-retrace period, horizontal scanning pulses are applied consecutively to all the data electrodes. Variations of the detected signal Vobs responsive to the horizontal scanning pulses are detected. Another example of the data electrode position detection period is a plurality of data electrode position detection periods defined within one frame or one period during which one frame is displayed by the LCD. Alternatively, a small number of data electrode position detection periods may be defined, or a horizontal-retrace period, which is a period defined between applications of a display scanning pulse to each display line, may be defined as a data electrode position detection period. As for the number of horizontal scanning pulses to be applied during each data electrode position detection period, one horizontal scanning pulse, or a plurality of horizontal scanning pulses may be applied to each data electrode during one frame.

Horizontal scanning pulses to be applied to the adjoining data electrodes 112 during a retrace period are, as shown in FIG. 7, different from each other in terms of rise timing and fall timing.

Display scanning pulses to be applied to the adjoining scan electrodes 111 are different from each other in terms of rise timing and fall timing.

At least one of the edges of the display scanning pulses used for detection do not coincide with variations of display data signals applied consecutively to the data electrodes 112.

Figure 8:
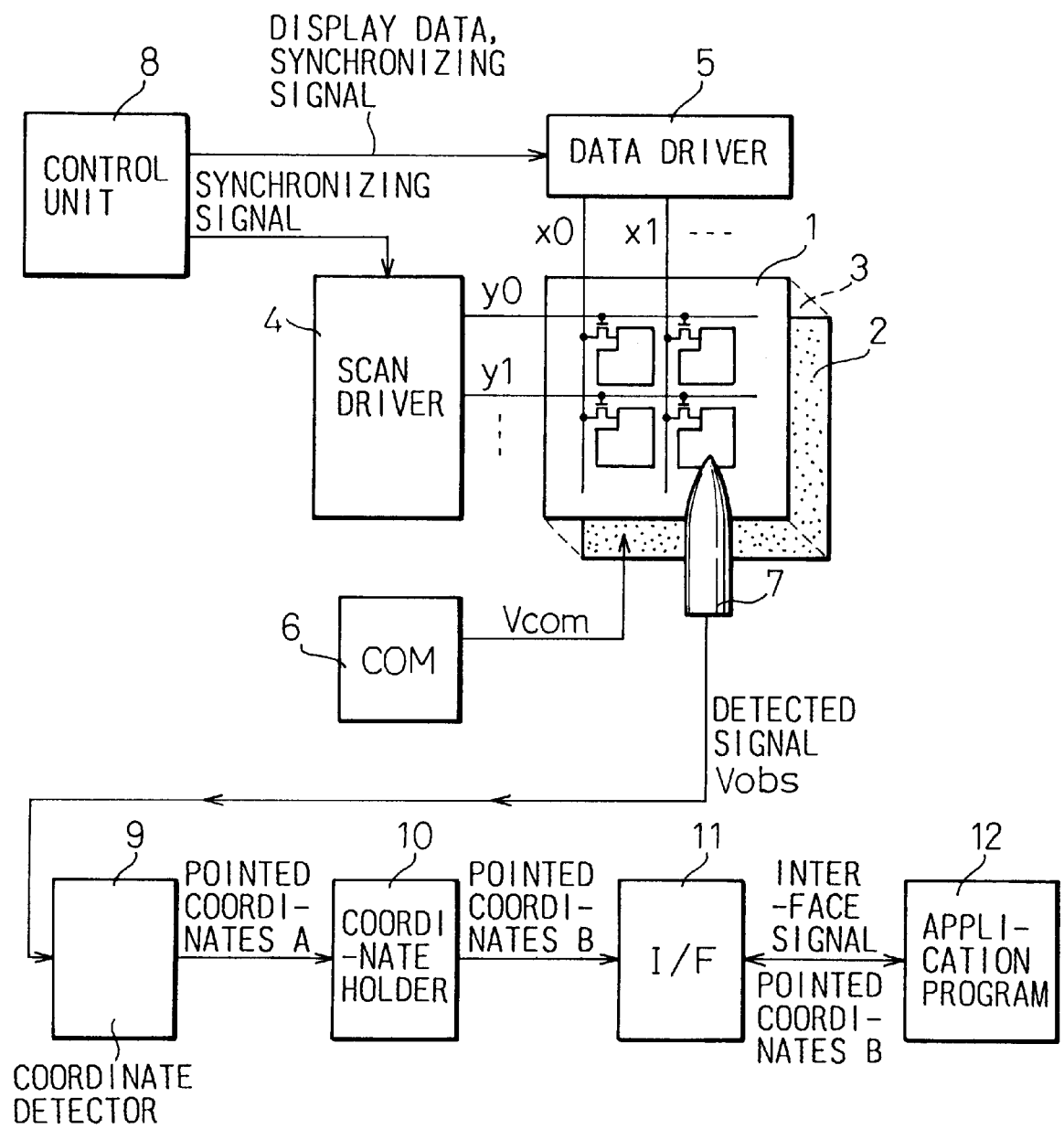
FIG. 8 shows the configuration of the first embodiment.
Figure 9:
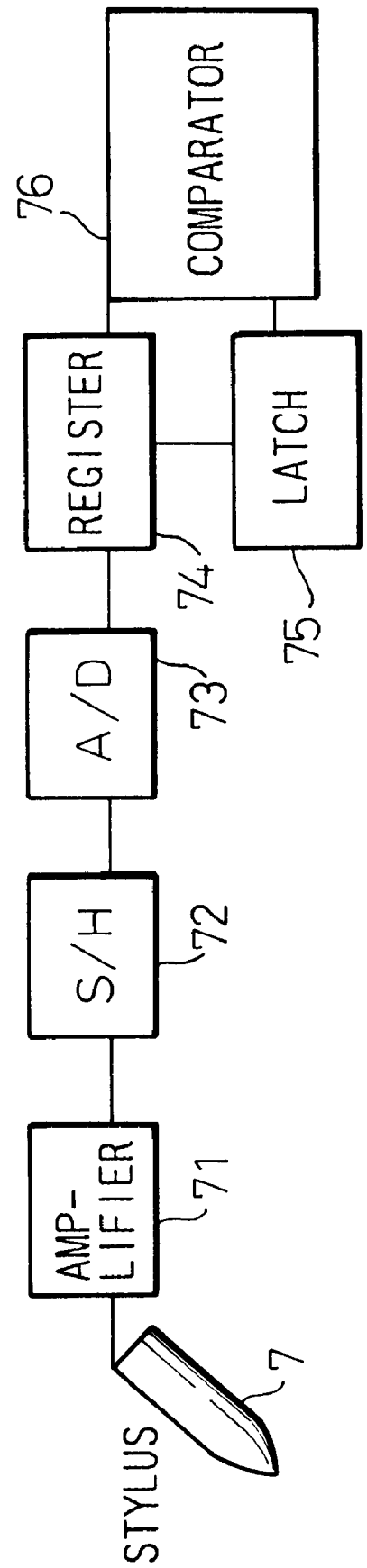
FIG. 9 is a block diagram showing a voltage detector.
Figure 10:
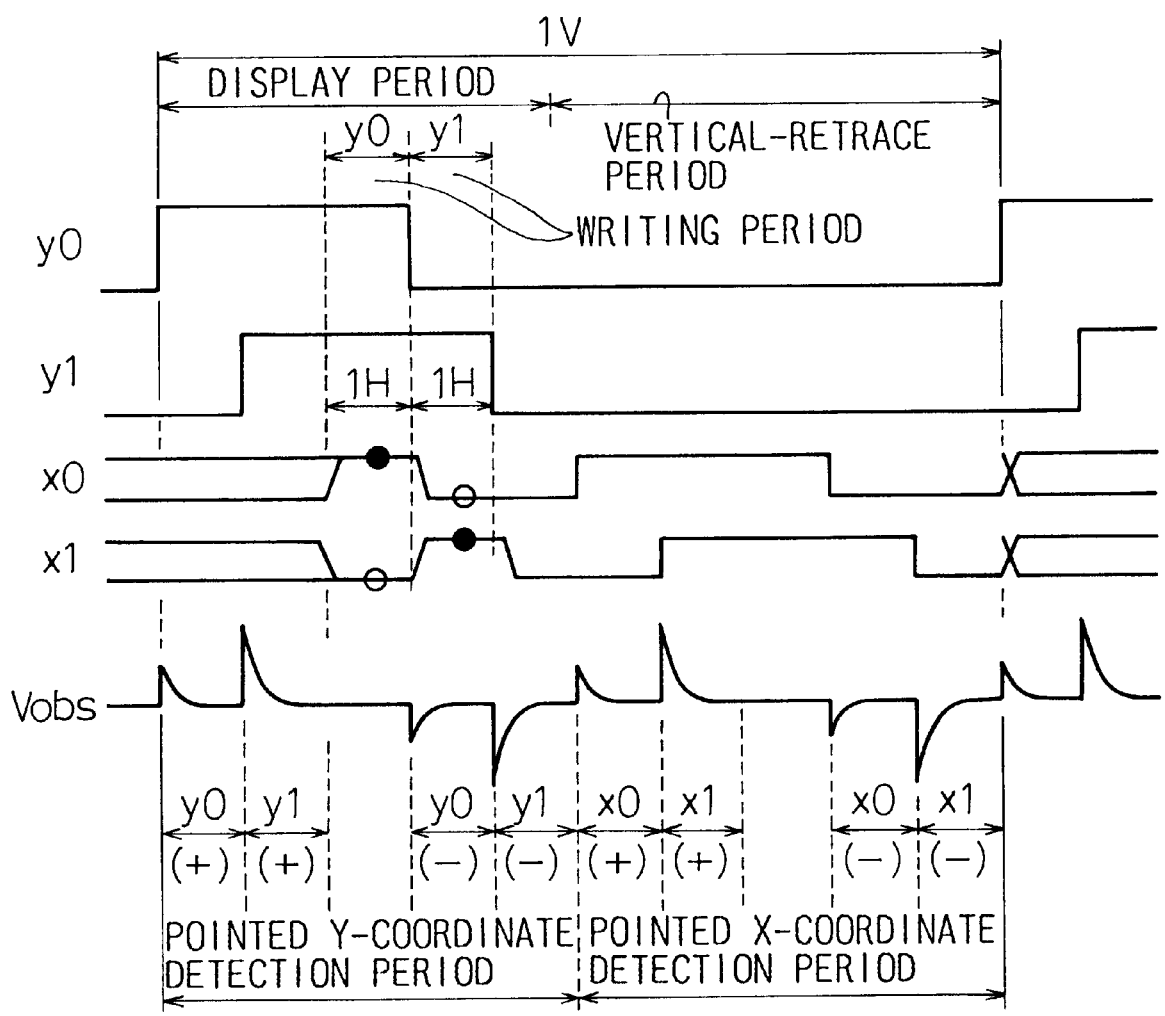
FIG. 10 is a timing chart describing the timing of actions performed in the first embodiment.

FIG. 8 shows the configuration of the first embodiment of the present invention. FIG. 9 is a block diagram showing a voltage detector in the first embodiment. FIG. 10 is an explanatory diagram concerning the operation of the first embodiment. Components identical to those in the drawings referenced previously are assigned the same reference numerals. No further mention will be made of these components.

In this embodiment, the pulse duration of a display scanning pulse is longer than that of a horizontal scanning pulse by a multiple of the pulse duration of a shift clock pulse. Pulses to be applied to adjoining electrodes are shifted by the duration of a shift clock pulse, so that the pulses will not interfere with each other.

In FIG. 8, reference numeral 8 denotes a control unit for outputting display data and a synchronizing signal. The control unit 8 outputs signals that are necessary to operate scan driver 4 and data driver 5. 9 denotes a coordinate detector for detecting the coordinates on a display screen pointed to by the tip of the stylus 7; that is, the pointed coordinates. The coordinate detector 9 corresponds to the position detector in FIG. 6. The coordinate detector 9 calculates pointed coordinates A responsively to the peak value of a detected signal Vob provided by the stylus 7. 10 denotes a coordinate holder that inputs the pointed coordinates A, transforms the pointed coordinates A according to the number of input bits in the next stage or the necessity of coordinate transform, and then outputs the resultant pointed coordinates B. The pointed coordinates A and B may be identical to each other. 11 denotes an interface that inputs the pointed coordinates B and an interface signal sent from an application program 12 and posts the pointed coordinates B to the application program 12. The application program 12 uses the input pointed coordinates B to draw a picture, input a character, indicate a point, or the like.

FIG. 9 is a block diagram showing the coordinate detector 9 for identifying pointed coordinates on the basis of an output of the stylus 7. As illustrated, the coordinate detector 9 includes an amplifier 71 for amplifying a display scanning pulse and horizontal scanning pulse detected through electrostatic coupling made between the stylus 7 and the associated display scanning electrode and data electrode in the LCD, a sample and hold 72 for sampling and holding an output of the amplifier 71 synchronously with a pulse, an analog-to-digital converter (hereinafter A/D converter) 73 for converting an output of the sample and hold 72 into a digital signal, a register 74 for temporarily storing an output of the A/D converter 73, a latch 75 for latching and holding a value stored in the register 74 in response to a latch signal, and a comparator 76 for comparing the value stored in the register 74 with the value stored in the latch 75.

The latch 75 is reset before the start of a display period or a vertical-retrace period. The comparator 76 compares the values in the register 74 and latch 75. When the value in the register 74 is larger, a latch signal is supplied. In response to the latch signal, the latch 75 latches the value in the register. This sequence is repeated until the display period and vertical-retrace period are completed. Thus, the positions of a scan electrode and data electrode to which a display scanning pulse and horizontal scanning pulse causing a peak voltage to develop are applied, are detected, and eventually the pointed coordinates of the stylus 7 are identified.

FIG. 10 is a timing chart describing the timing of the actions performed in the first embodiment. As illustrated, the pulse durations of a display scanning pulse and horizontal scanning pulse are three times longer than that (one horizontal line period H) of a horizontal synchronizing signal. Thus, the rises and falls of pulses to be applied to adjoining electrodes do not mutually coincide. Consequently, the detected signal Vobs has sufficient signal voltage responsive to the edges of the pulses. If the pulse durations correspond to one horizontal line period 1H, as they do in the prior art, the trailing edge of a pulse applied to one electrode coincides with the leading edge of the next pulse applied to an adjoining electrode. The pulses therefore interfere with each other and weaken each other. The detected signal Vobs becomes weak. This results in degraded detection precision.

In FIG. 10, when a display scanning pulse is applied to a scan electrode y1, the detected signal has high voltage. When a horizontal scanning pulse is applied to a scan electrode x1, the detected signal has high voltage. This implies that the stylus 7 is in contact with the position (x1, y1).

As shown in FIG. 10, when the pulse duration of a display scanning pulse corresponds to three horizontal line periods (3H), the voltage to be applied to the liquid crystal is finalized at the trailing edge of each display scanning pulse. The voltage is retained until another scanning pulse rises during the next display period. During a period corresponding to two horizontal line periods (2H) from when one scanning pulse rises until voltage to be retained is applied to a data electrode, the voltage to be retained is applied continually to pixel electrodes constituting two upper display lines. As described previously, an actual LCD has about 500 scan electrodes. A period during which voltage unrelated to display is applied is 1/250 of one frame and no crucial problem occurs.

In FIG. 10, the pulse duration of a horizontal scanning pulse applied to a data electrode during a vertical-retrace period corresponds to three horizontal line periods. The horizontal scanning pulse is applied solely to detect pointed coordinates. The pulse duration should be determined depending on the response characteristic of a voltage detector to such an extent that the voltage detector can detect the horizontal scanning pulse; that is, should preferably be set to as small a value as possible. Even when the pulse duration of the horizontal scanning pulse is set to a smallest possible value, if the pulse duration corresponds to the product of a time lag between adjoining pulses and three, high detection sensitivity ensues.

The pointed coordinates A provided by the coordinate detector 9 are delivered to the application program 12 via the interface 11. When the number of pixels in the LCD is large, the number of bits representing pointed coordinates is very large and may not, therefore, be able to be delivered at one time. Assume that the application program 12 inputs eight bits and pointed coordinates are represented by nine bits. The coordinate holder 10 that has the ability to perform coordinate transform divides nine bits representing the pointed coordinates A into eight low-order bits and one high-order bit and transmits them as pointed coordinates B separately. Alternatively, one low-order bit may be rounded down and eight high-order bits alone are supplied as the pointed coordinates B.

Figure 11:
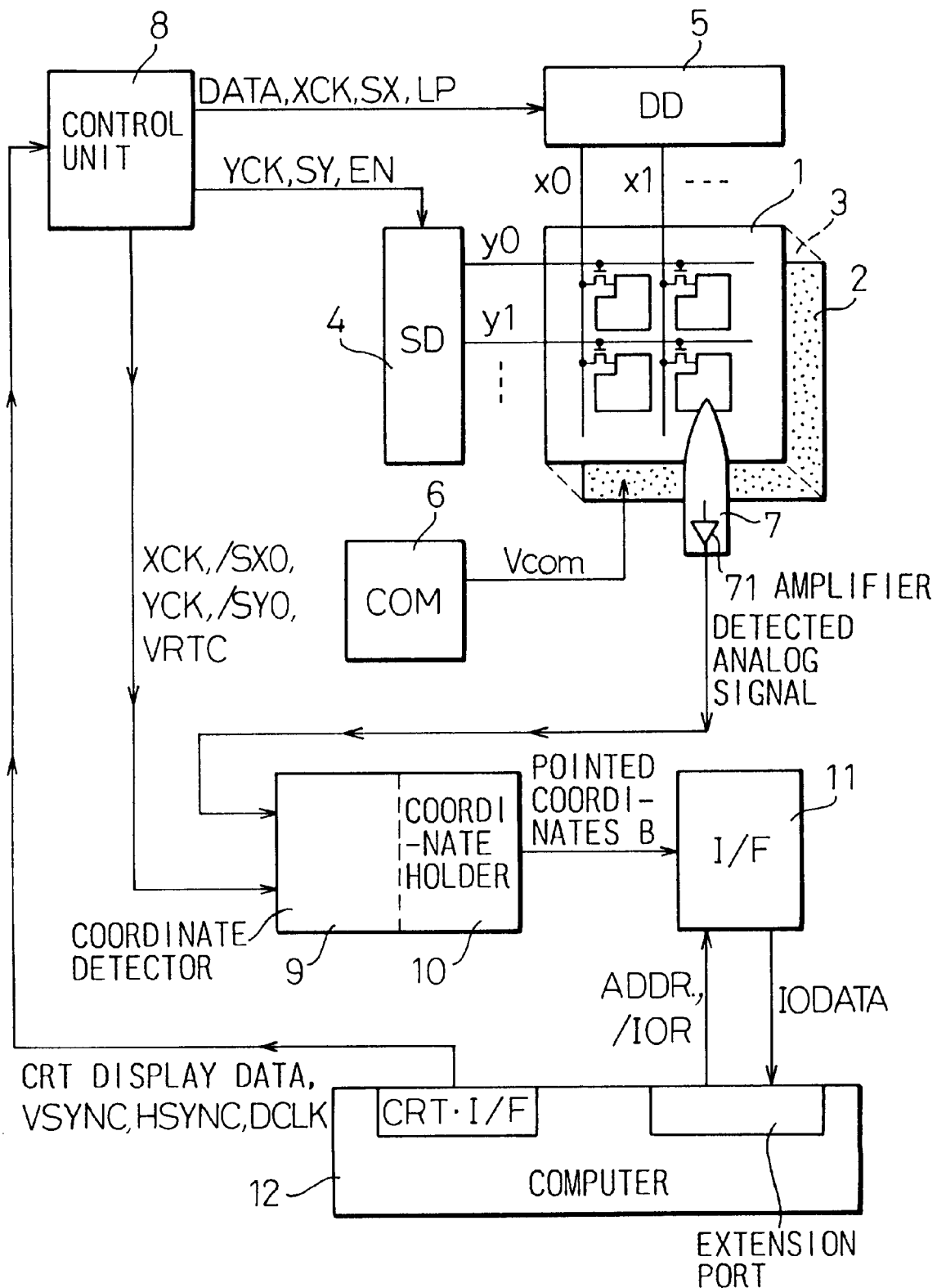
FIG. 11 shows the configuration of the second embodiment.

FIG. 11 shows the configuration of the second embodiment of the present invention.

In FIG. 11, reference numeral 71 denotes an amplifier that outputs an analog detected signal to the coordinate detector 9. The control unit 8 inputs CRT display data via a CRT interface, a vertical synchronizing signal VSYNC, a horizontal synchronizing signal HSYNC, and a dot clock DCLK which are provided by a computer 12 on which an application program runs. The control unit 8 outputs display data DATA, an x-axis shift clock XCK, a start pulse SX, and a one-line latch pulse LP to the data driver 5, and also outputs a y-axis shift clock YCK, a start pulse SY, and an output enable signal EN to the scan driver 4. The control unit 8 further outputs the x-axis shift clock XCK, the y-axis shift clock YCK, an x-coordinate count start pulse SX0* (a signal bearing an asterisk * is low active), a y-coordinate count pulse SY0*, and a vertical-retrace period indication signal VRTC to the coordinate detector 9.

Figure 12A:
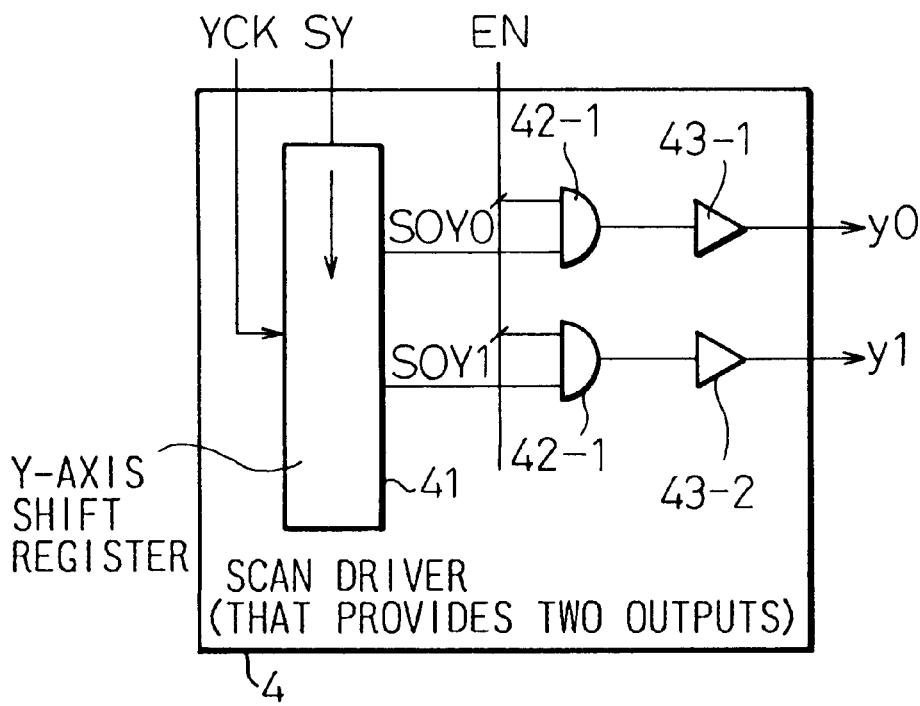
FIG. 12A shows the circuitry of a scan driver in the second embodiment.
Figure 12B:
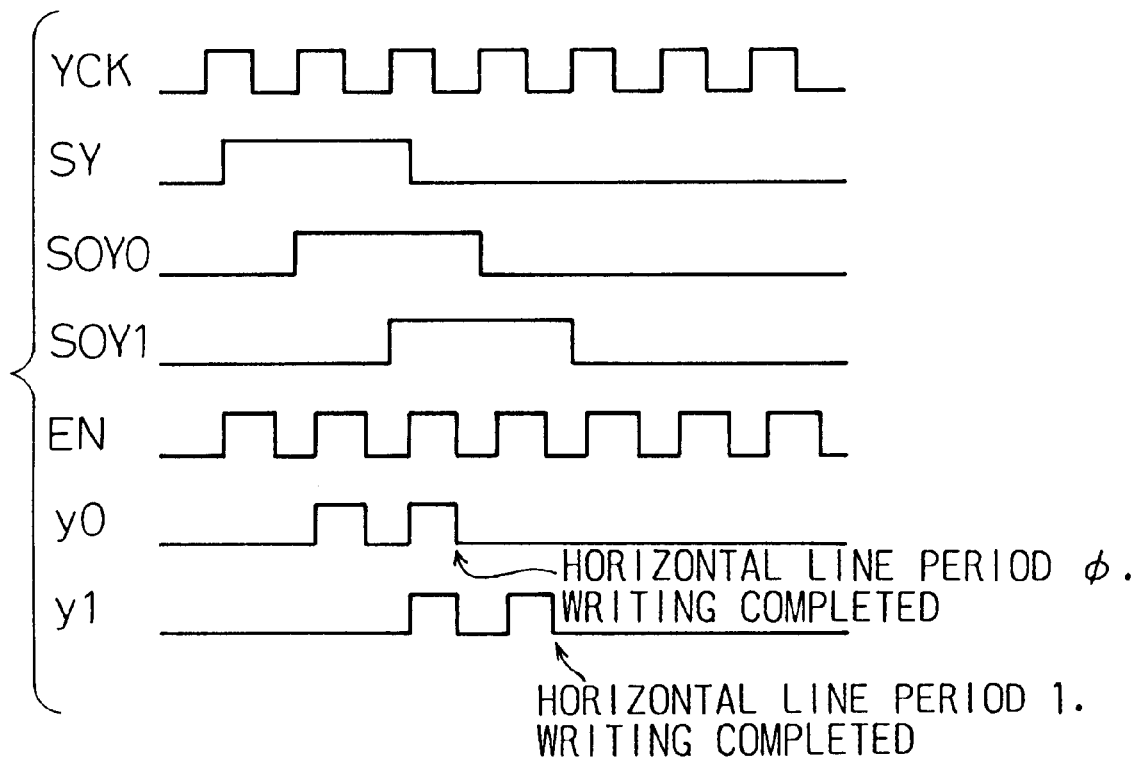
FIG. 12B shows output signals of the scan driver in the second embodiment.

FIG. 12A shows the configuration of a scan driver. FIG. 12B is a timing chart describing the timing of actions performed in the scan driver.

In FIG. 12A, reference numeral 41 denotes a y-axis shift register that shifts the pulse SY in synchronization with the clock YCK and outputs pulses SOY0 and SOY1. 42-1 and 42-2 denote output control AND gates that control the pulses SOY0 and SOY1 according to the signal EN. 43-1 and 43-2 denote buffers that perform impedance transform or level translation and provide display scanning pulses y0 and y1 which are applied to scan electrodes.

As shown in FIG. 12B, the start pulse SY has a pulse duration corresponding to two horizontal line periods. The pulses SOY0 and SOY1 are produced by shifting the pulse SY in units of one horizontal line period. These pulses have the waveforms illustrated. Since the pulses SOY0 and EN, and SOY1 and EN are ANDed respectively, each of the pulses y0 and y1 consists of two pulses each of which has a pulse duration corresponding to a half of one horizontal line period and which are separated from each other by one horizontal line period.

Figure 13:
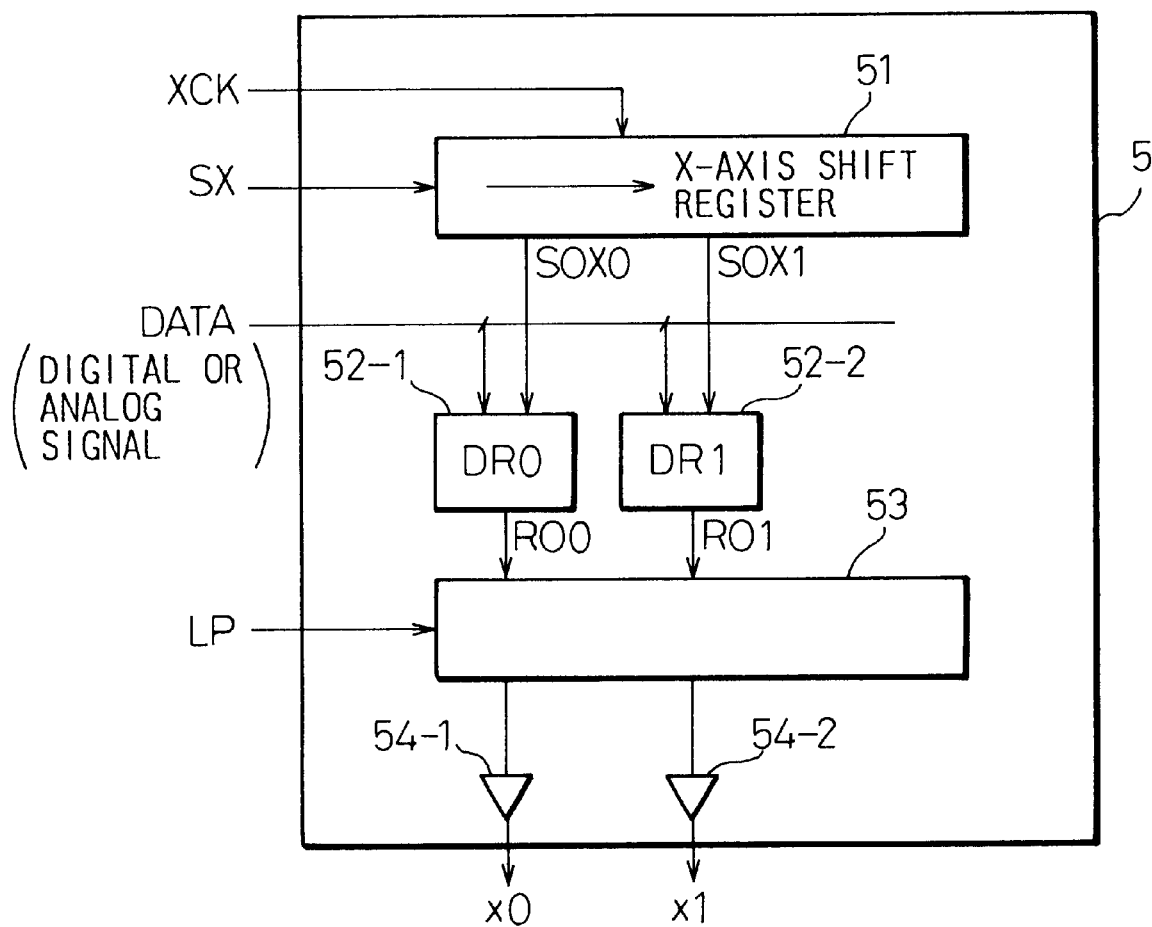
FIG. 13 shows the configuration of a data driver in the second embodiment.

FIG. 13 shows an example of the configuration of the data driver 5. In FIG. 13, reference numeral 51 denotes an x-axis shift register that shifts the start pulse SX in synchronization with the clock XCK and outputs pulses SOX0 and SOX1. 52-1 and 52-2 denote data registers that sample and hold the display data DATA (which may be in digital or analog form) synchronously with the pulses SOX0 and SOX1, and then provide signals RO0 and RO1. 53 denotes a latch. When the pulse LP is active (high), the latch 53 supplies the signals RO0 and RO1 as they are. When the pulse LP is inactive (low), the latch 53 holds the signals RO0 and RO1 and then supplies them. 54-1 and 54-2 denote buffers that perform impedance transform or level translation and provide pulses x0 and x1.

Figure 14:
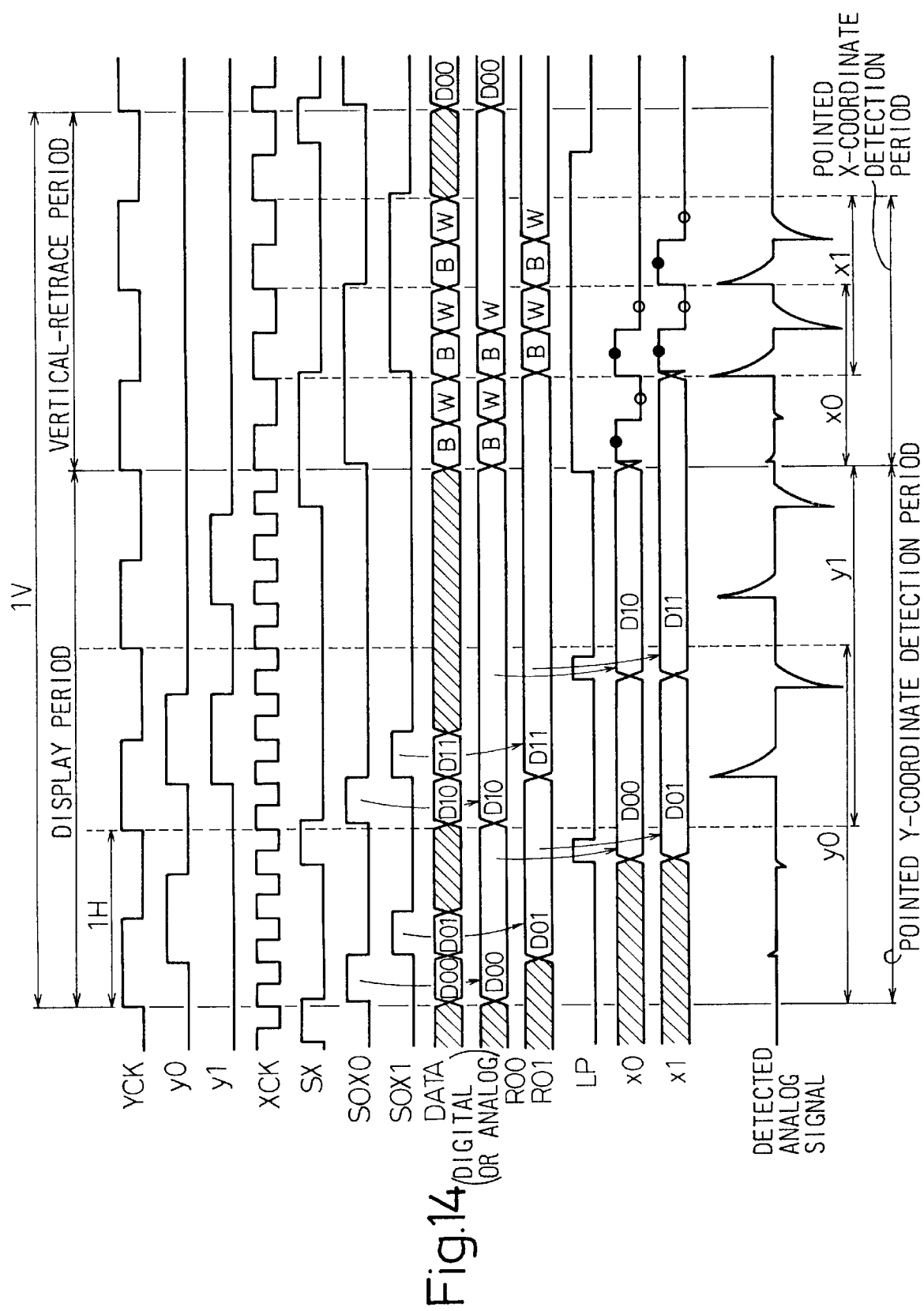
FIG. 14 is a timing chart describing the timing of actions performed in the second embodiment.

FIG. 14 is a timing chart in the second embodiment. As described previously, the pulses y0 and y1 are controlled according to the signal EN so that they will have a pulse duration corresponding to one horizontal line period or shorter. Pulses applied to adjoining electrodes do not therefore interfere with each other. Consequently, a detected analog signal has a peak value that is easily distinguishable. Furthermore, since a plurality (two pulses in this case) of pulses whose pulse durations correspond to a half of one horizontal line period are used in combination and applied consecutively with one horizontal line period inserted between them, pulses applied to adjoining electrodes intensify each other. The detected analog signal therefore has a high peak value that can be detected readily. On the other hand, during a pointed x-coordinate detection period within a vertical-retrace period, the latch pulse LP remains active (high) so that the pulses RO0 and RO1 will be reflected on the pulses x0 and x1 immediately. Moreover, the display data DATA is changed from black (B) to white (W) for each pulse spacing of the clock XCK. Pulses applied to adjoining electrodes, similarly to display scanning pulses, intensity each other. The detected analog signal has a peak value which can be detected readily and is responsive to a pointed coordinate.

Figure 15:
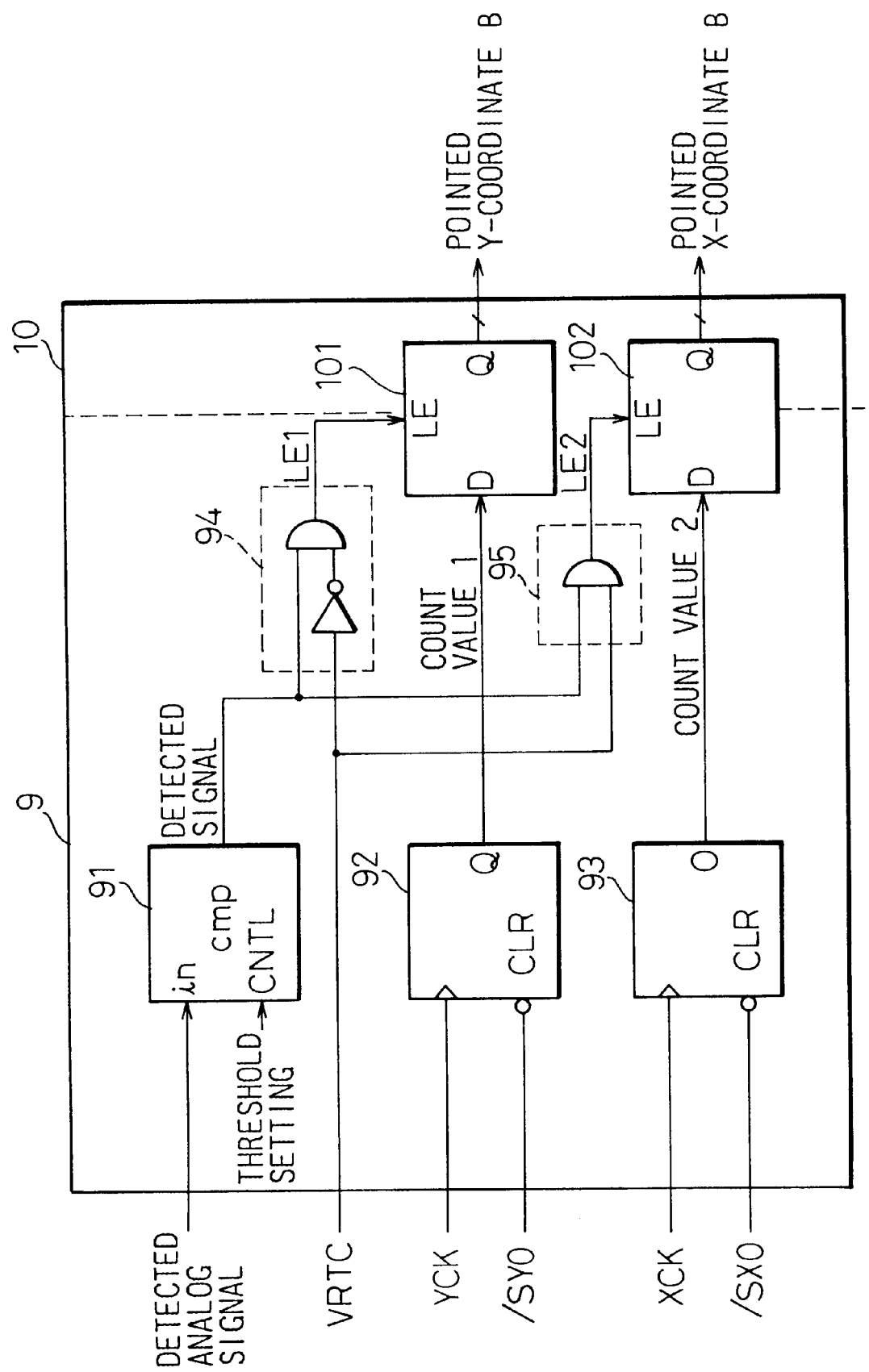
FIG. 15 shows the configuration of a coordinate detector and coordinate holder in the second embodiment.
Figure 16:
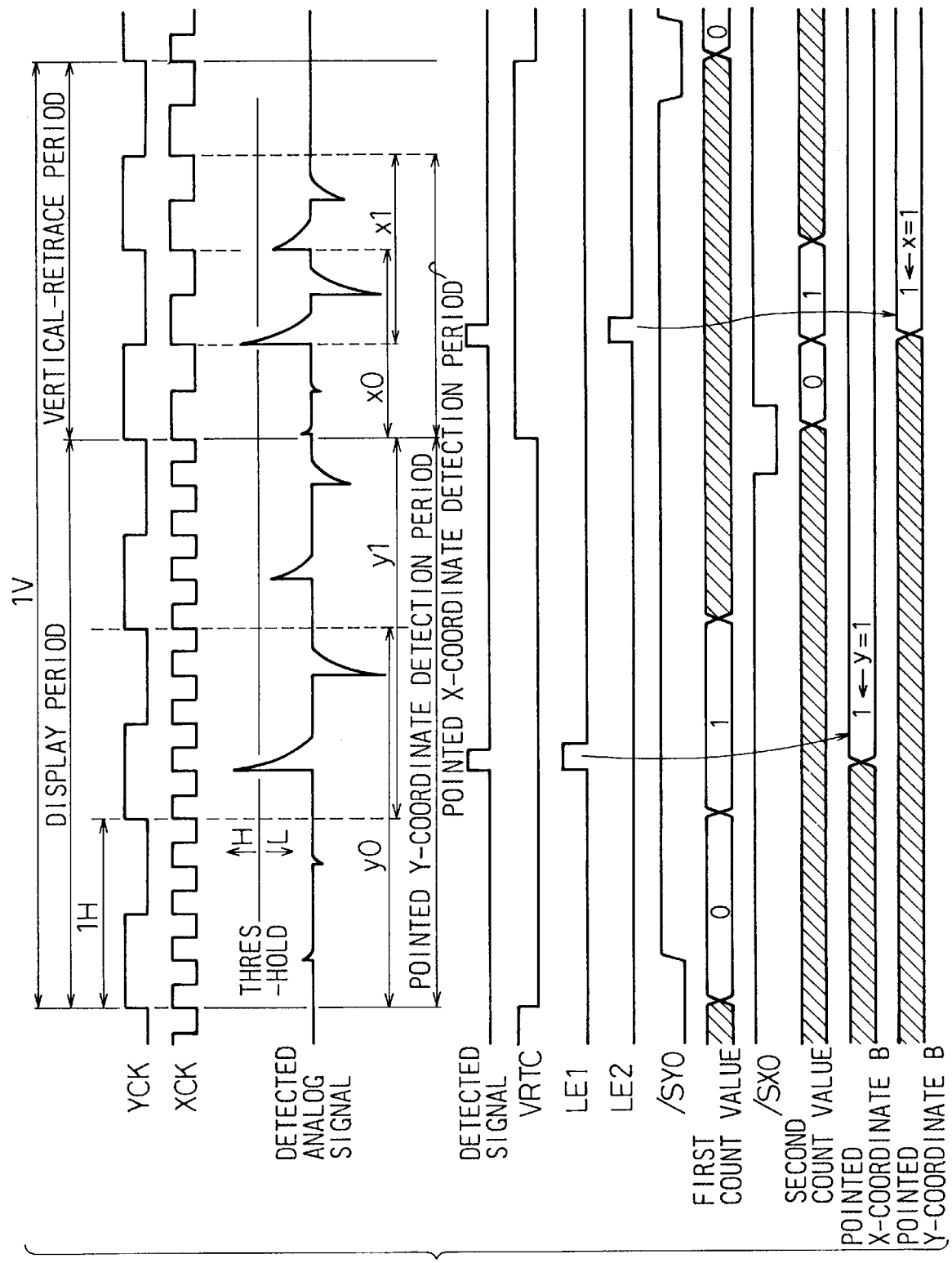
FIG. 16 is a timing chart describing the timing of actions performed by the coordinate detector and coordinate holder shown in FIG. 10.

FIG. 15 shows an example of the configuration of the coordinate detector 9 and coordinate holder 10. In this example, the coordinate detector 9 and coordinate holder 10 are not distinguished from each other in particular. Reference numeral 91 denotes a comparator that compares a detected analog signal with a predetermined threshold and provides a detected binary signal (that is high when the detected analog signal exceeds the threshold). The threshold can be set to any value. 92 denotes a first counter that starts counting synchronously with the clock YCK and is reset with the pulse /SY0. The first counter 92 provides a first count value. 93 denotes a second counter that starts counting synchronously with the clock XCK and is reset with the pulse /SX0. The second counter 93 provides a second count value. 94 denotes a first latch signal generator for providing a first latch signal LE1, which becomes active when a first detected signal is high, during a display period (VRTC is low). 95 denotes a second latch signal generator for providing a latch signal LE2, which becomes active when a second detected signal is high, during a vertical-retrace period (VRTC is high). 101 denotes a first latch for latching the first count value in response to the latch signal LE1 and providing a pointed y-coordinate B. 102 denotes a second latch for latching the second count value in response to the latch signal LE2 and providing a pointed x-coordinate B. In this example, pointed y- and x-coordinates A are not transformed into pointed y- and x-coordinates B. Simple bit manipulation (for example, one low-order bit is rounded down) can be implemented by changing the connections of signal lines on which outputs of the first and second latches 101 and 102 are placed. FIG. 16 is a timing chart describing the timing of actions performed in the coordinate detector 9 and coordinate holder 10. Pointed y- and x-coordinates B can be detected and held as illustrated.

Figure 17:
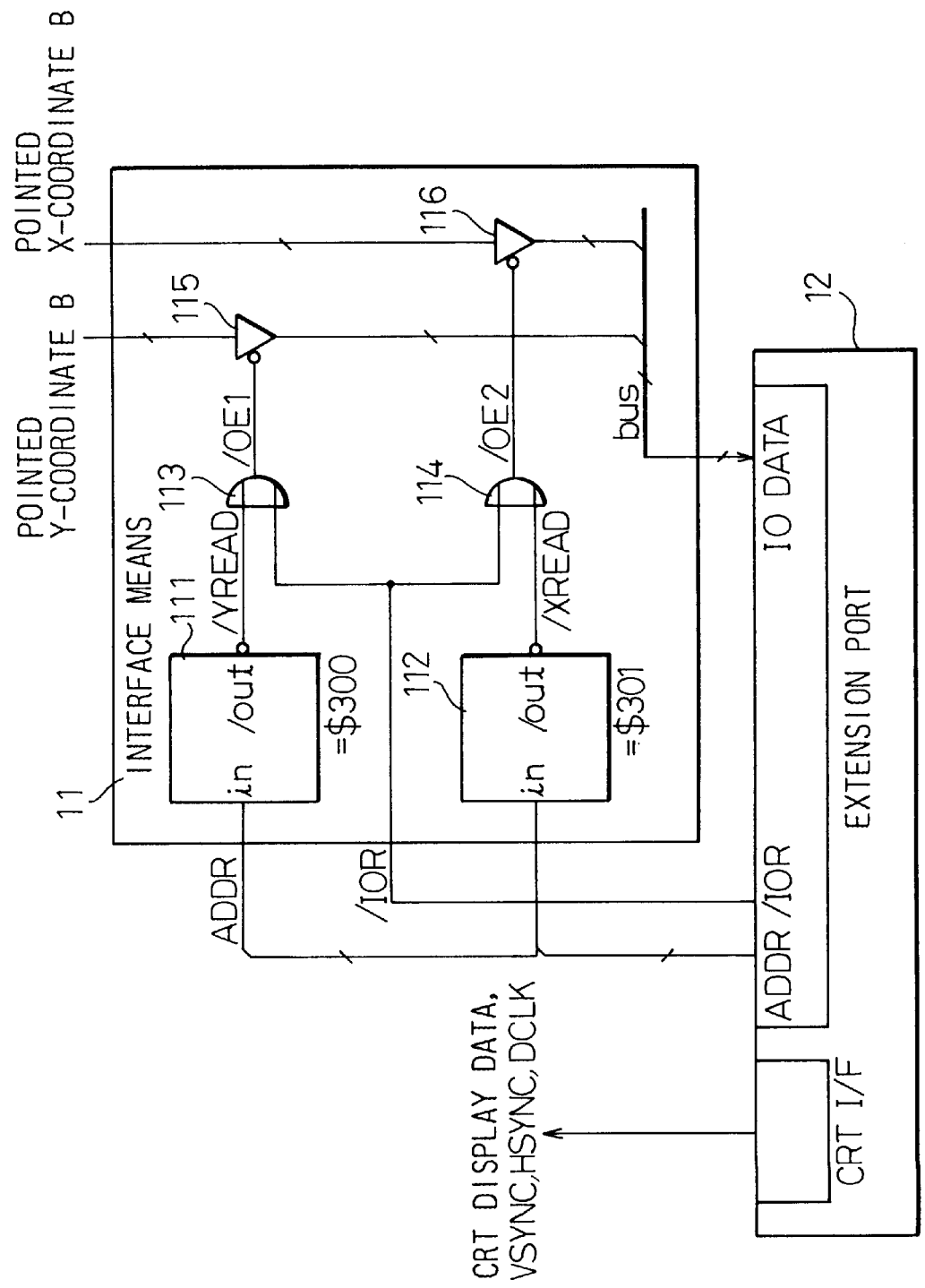
FIG. 17 shows the configuration of an interface in the second embodiment.

FIG. 17 shows an example of the configuration of the interface 11 and computer 12. The computer 12 runs an application program and is interfaced with an extension port (logically, an I/O port). In FIG. 17, a pointed y-coordinate B is assigned to an I/O address $300 (hexadecimal number) and a pointed x-coordinate B is assigned to an I/O address $301.

In FIG. 17, reference numeral 12 denotes a computer that reads an address signal ADDR and I/O data, outputs a control signal /IOR, and has an I/O port for inputting or outputting bidirectional I/O data IODATA.

Reference numeral 11 denotes a first decoder for decoding the ADDR signal and providing a signal /YRED that becomes active (low) when the ADDR signal represents $300. 112 denotes a second decoder for providing a signal XREAD* that becomes active (low) when the ADDR signal represents $301. 113 denotes a first output enable signal generator for providing a signal /OE1 that becomes active (low) when an I/O read request is issued (/IOR is low) and the signal YREAD is low. 114 denotes a second output enable signal generator for providing a signal /OE2 that becomes active (low) when the signals /IOR and /XREAD are low. 115 denotes a first three-state buffer capable of providing high-level, low-level, and high-impedance (Hi-Z) outputs. The first three-state buffer 115 is composed of buffers each of which supplies a pointed y-coordinate B when the signal /OE1 is low and supplies an output Hi-Z when the /OE2 is high, and the number of the buffers is same as the number of bits constituting data. 116 denotes a three-state buffer for providing a pointed x-coordinate B. Output bits of the three-state buffers 115 and 116 are placed on the same bus. The bus is linked to the I/O port IODATA of the computer 12.

Figure 18:
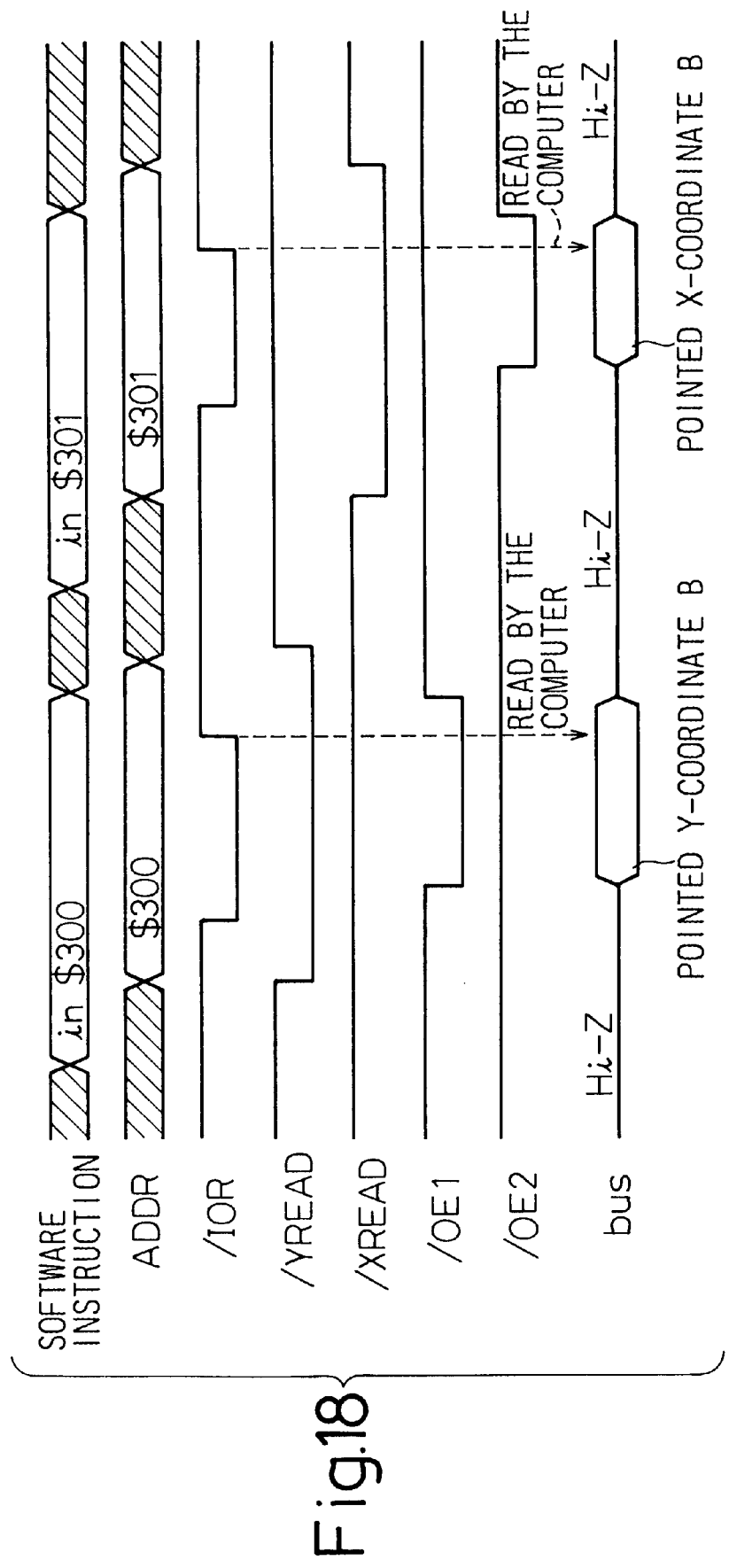
FIG. 18 is a timing chart describing the timing of actions performed by the interface shown in FIG. 12.

FIG. 18 shows an example of timing of actions performed by the first and second decoders. Assuming that reading through the I/O port has been instructed by the running software, a value to be represented by the signal ADDR is usually determined. The signal /IOR then becomes active. The computer reads the ADDR value through the port IODATA responsively to the rise of the signal /IOR. Meanwhile, the connected first decoder places a required value on the bus. The example of the timing of actions in FIG. 18 agrees with this sequence. An address value can be reliably delivered to the computer.

The first and second decoders may be allocated to an address space in a processor and re-programmed. A memory read control signal /MEMR may be used instead of the /IOR signal to deliver an address value.

The first and second embodiments have been described so far. As mentioned previously, when it is intended to detect pulses applied to electrodes through electrostatic coupling using a stylus, it is essential that pulses applied to adjoining scan electrodes or data electrodes do not weaken each other. In the example shown in FIG. 7, both the display scanning pulse and horizontal scanning pulse have short pulse durations so that pulses will not interfere with each other. During a display period, measures are taken to prevent the display scanning pulse and data signal (or a horizontal scanning pulse) from interfering with each other. By contrast, the data signal may have a short pulse duration in order to prevent mutual interference between the display scanning pulse and data signal. FIG. 19 shows this kind of modification concerning pulses.

As shown in FIG. 19, in this modification the pulse duration of a display scanning pulse is shorter than that of a horizontal line period H. The pulse duration of a data signal is shorter than that of the display scanning pulse. A variation in a data signal coincides with the ending of each horizontal line period. The rise of a display scanning pulse does not therefore coincide with a variation of the data signal. For detecting the position of the stylus, the rise of a display scanning pulse is checked. A detected signal varies responsively to both edges of a pulse. For calculating pointed coordinates, only the rise or fall should be detected. The rise of a pulse is therefore detected.

In the first embodiment, variations in a data signal are not taken into consideration in particular. As shown in FIG. 19, the data signal has a short pulse duration. As only the rise or fall of a display scanning pulse is detected, measurement with higher sensitivity becomes possible.

It has been described that horizontal scanning pulses are applied in order to detect a pointed x-coordinate during a vertical-retrace period. For detecting pointed coordinates, a variation in only one direction of the detected signal responsive to the rise or fall of a pulse need be detected. Therefore, pulses to be applied in order to detect a pointed x-coordinate during a vertical-retrace period may be as shown in FIG. 15.

Figure 20A:
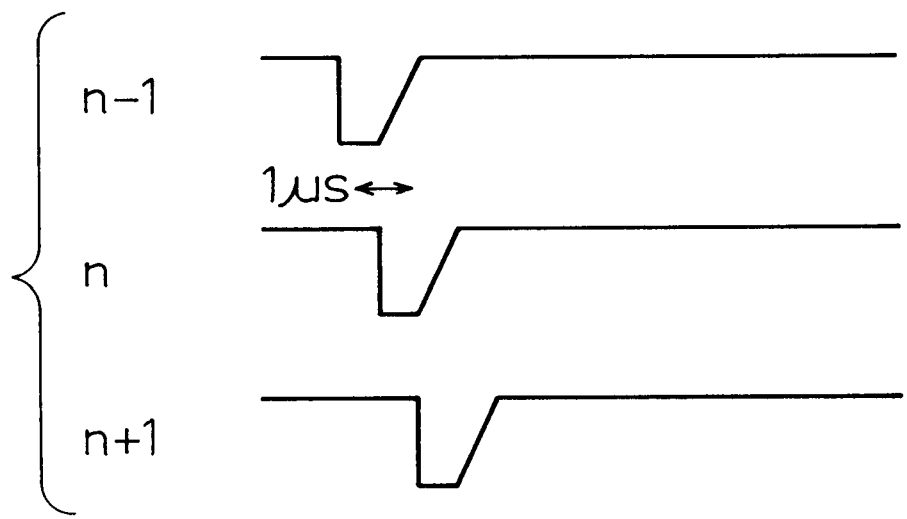
FIGS. 20A and 20B show modifications of outputs provided by the data driver during a vertical-retrace period.

In FIG. 20A, a horizontal scanning pulse varies abruptly in one direction but varies moderately in the opposite direction. The abrupt variation is detected. Since the horizontal scanning pulse varies moderately in the opposite direction, even if a leading edge coincides with a trailing edge, a detected signal is not weakened very much. A strong detected signal is made available and this results in excellent position detection.

Figure 20B:
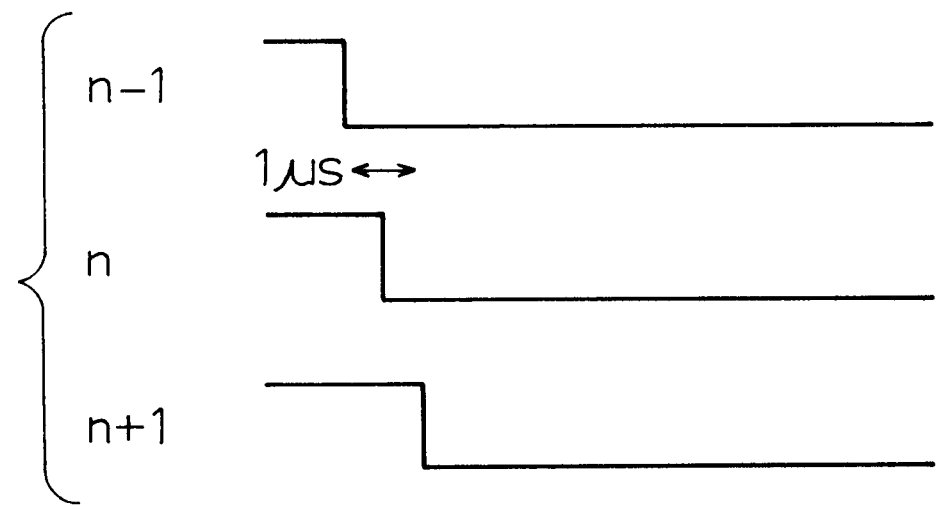

In FIG. 20B, voltage levels at data electrodes are set to the same value at the start of a vertical-retrace period, and then changed in one direction consecutively. That is to say, a signal that is not pulsating is applied to each electrode. Signals applied to adjoining data electrodes do not weaken each other. A strong detected signal is therefore produced. If it is required for the purpose of driving to reset levels of voltage to be applied to data electrodes, the voltage levels at all data electrodes are changed in the opposite direction at the start of a vertical-retrace period, and then varied again as shown in FIG. 20B.

As far as a color LCD is concerned, three color filters of red, green, and blue are placed in each cell. Depending on a data transmission rate, three kinds of data concerning red, green, and blue are fed concurrently to the data driver. The third embodiment is concerned with this kind of color LCD, wherein voltage levels at data electrodes are varied as shown in FIG. 20B during a vertical-retrace period.

Figure 21:
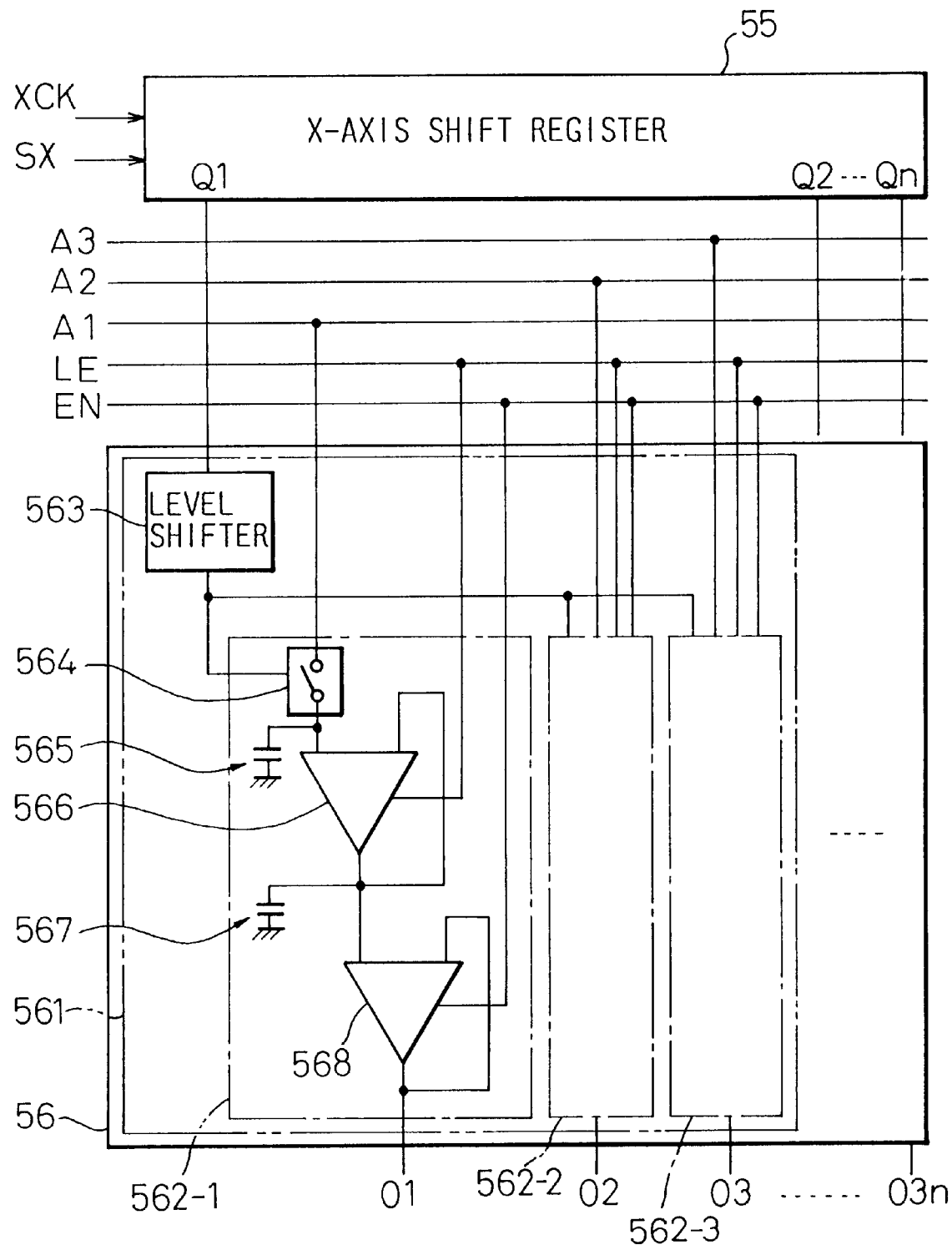
FIG. 21 shows the configuration of a data driver in the third embodiment.

FIG. 21 shows the configuration of a data driver in the third embodiment.

In FIG. 21, reference numeral 55 denotes an x-axis shift register. The x-axis shift register 55 has the same configuration as the one in the second embodiment shown in FIG. 8 except the number of bits. 56 denotes an array of data registers and latches. The array 56 consists of units 561 that number the same as output bits of the x-axis shift register. Each unit 561 consists of three identical sections 562-1, 562-2, and 562-3 associated with three data signals of red, green, and blue. Reference numeral 563 denotes a level shifter shared by the three sections. The level shifter 563 shifts the level of an output of the x-axis shift register 55, actuates an analog switch 564 in each section, and applies voltage to a capacitor 565 in each section according to the data signal A1, A2, or A3. When the x-axis shift register 55 shifts output bits to those concerning the next column, the analog switches 564 are opened. The voltage present at that time is held according to the data signals A1, A2, and A3. Output bits in the x-axis register 55 are changed continually in synchronization with an x-axis clock XCK. The three data signals A1, A2, and A3 are varied accordingly. Voltage is held in each unit 561 according to the data signals A1, A2, and A3 concerning each column. An operational amplifier 566 and a capacitor 567 constitute a latch. When associated data signals A1, A2, and A3 are held in every unit as mentioned above; that is, when output bits of the x-axis shift register 55 are shifted to the last ones, the data signals A1, A2, and A3 concerning every column are fetched from the capacitors 565 in response to a latch signal LE. Thus, data concerning one horizontal line is held and supplied in response to an output control signal EN. Meanwhile, data concerning the next horizontal line is held in the capacitors 565.

Figure 22:
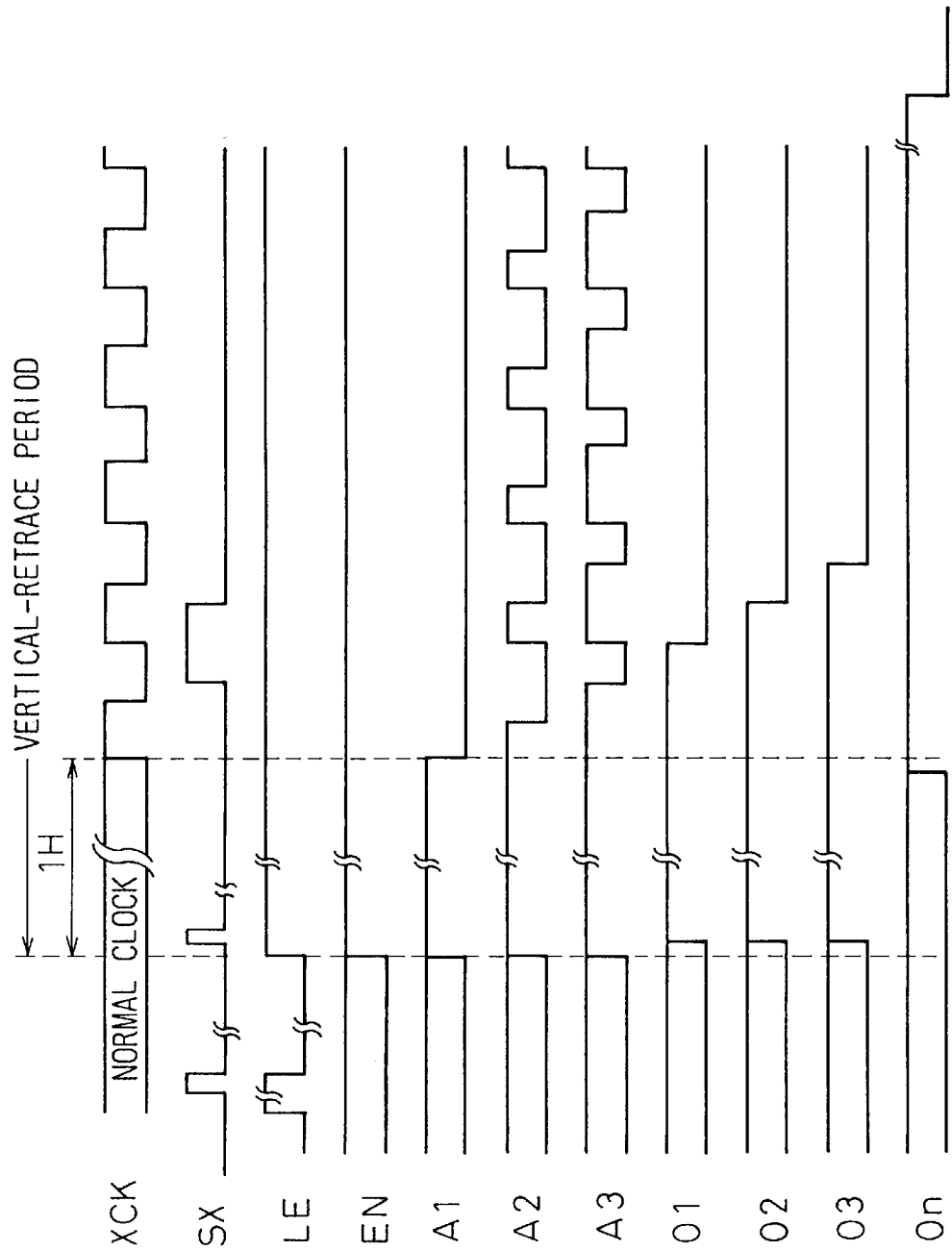
FIG. 22 shows the timing of actions performed by the data driver in the third embodiment.

For varying the voltage levels at data electrodes during a vertical-retrace period, the data driver shown in FIG. 21 operates according to the timing shown in FIG. 22.

As shown in FIG. 22, all display data signals remain high during the first one horizontal line period H within a vertical-retrace period. The high level need not be the highest level but is determined to such a level that a variation of a signal to the level can be detected by an electrostatic coupling type stylus. The latch signal LE and output control signal EN are driven high so that an output will vary depending on the voltage held in each capacitor 564. Thus, after one horizontal line period H has elapsed, all outputs are high. The x-axis clock XCK is modulated to have a frequency that enables scanning of all data electrodes during the remaining time interval of the vertical-retrace period. The data signal A1 is driven low, and the data signal A2 is modulated to have the same frequency as the x-axis clock XCK and to have a duty ratio of 1/3. The data signal A3 is modulated to have the same frequency as the x-axis clock XCK and to have a duty ratio of 2/3. When a certain output bit of the x-axis shift register 55 goes high, an output of the first section of a unit associated with the bit is driven low responsively to the data signal A1. When the data signal A2 varies, an output of the second section of the unit is driven low. When the data signal A3 varies, an output of the third section thereof is driven low. This operation is performed relative to all bits by the end of the vertical-retrace period. The high-to-low transition is made continually at all the data electrodes. The stylus 7 detects this transition and calculates a contact position on the basis of the position of a data electrode at which the transition is made.

In the first to third embodiments, detection of a contact position of the stylus 7 is performed in frames. Assuming that sixty frames are displayed for one second, one frame is 16.7 ms. The contact-position detection rate is 60 points per second. As described previously, a detection rate of 100 points per second is desired for a stylus input unit. The first to third embodiments are unsatisfactory from this viewpoint. The fourth embodiment offers a detection rate of 120 points or more per second.

Improvement of a detection rate must be achieved in two directions; that is, vertically and horizontally. In other words, both the rates of detecting the positions of a scan electrode and data electrode which are located closely to a stylus must be improved. To begin with, improvement of the rate of detecting the position of a scan electrode located close to a stylus will be described.

Figure 23:
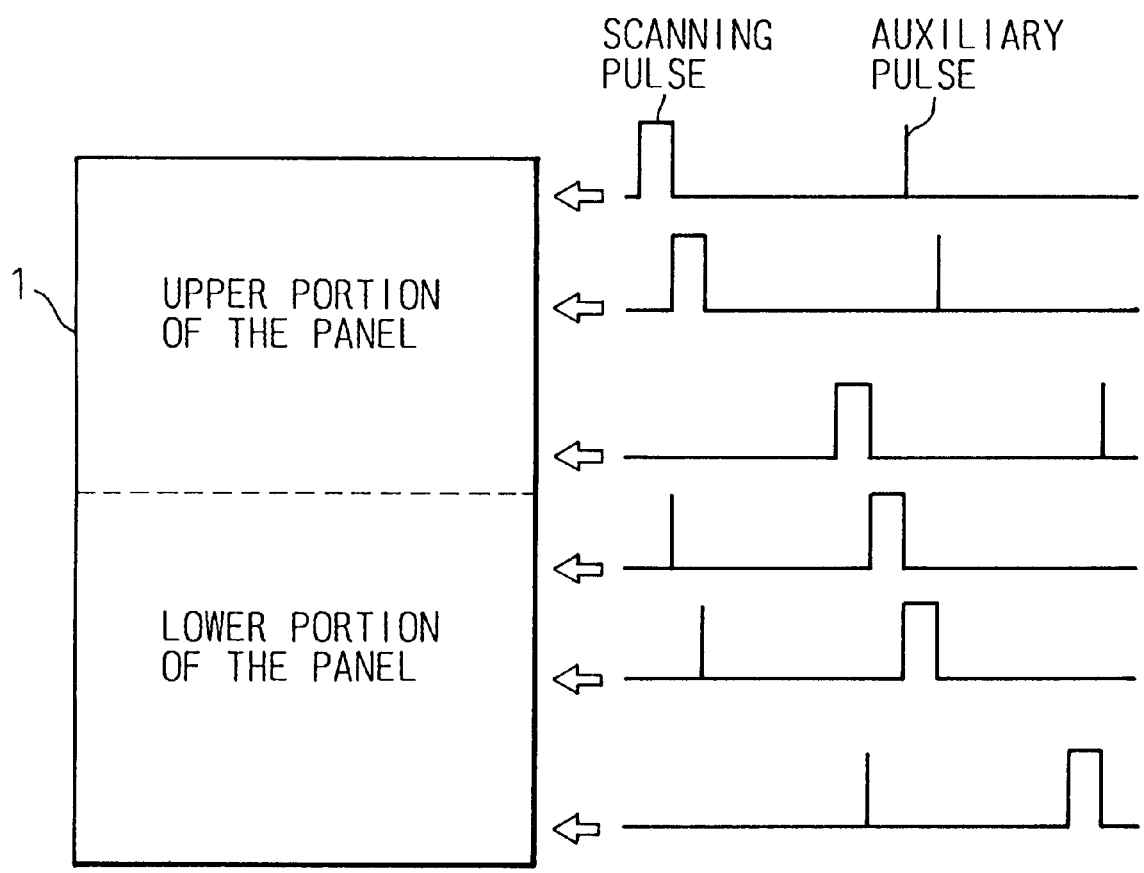
FIG. 23 shows outputs of a scan driver in the fourth embodiment.

FIG. 23 shows outputs of a scan driver in the fourth embodiment.

Figure 24:
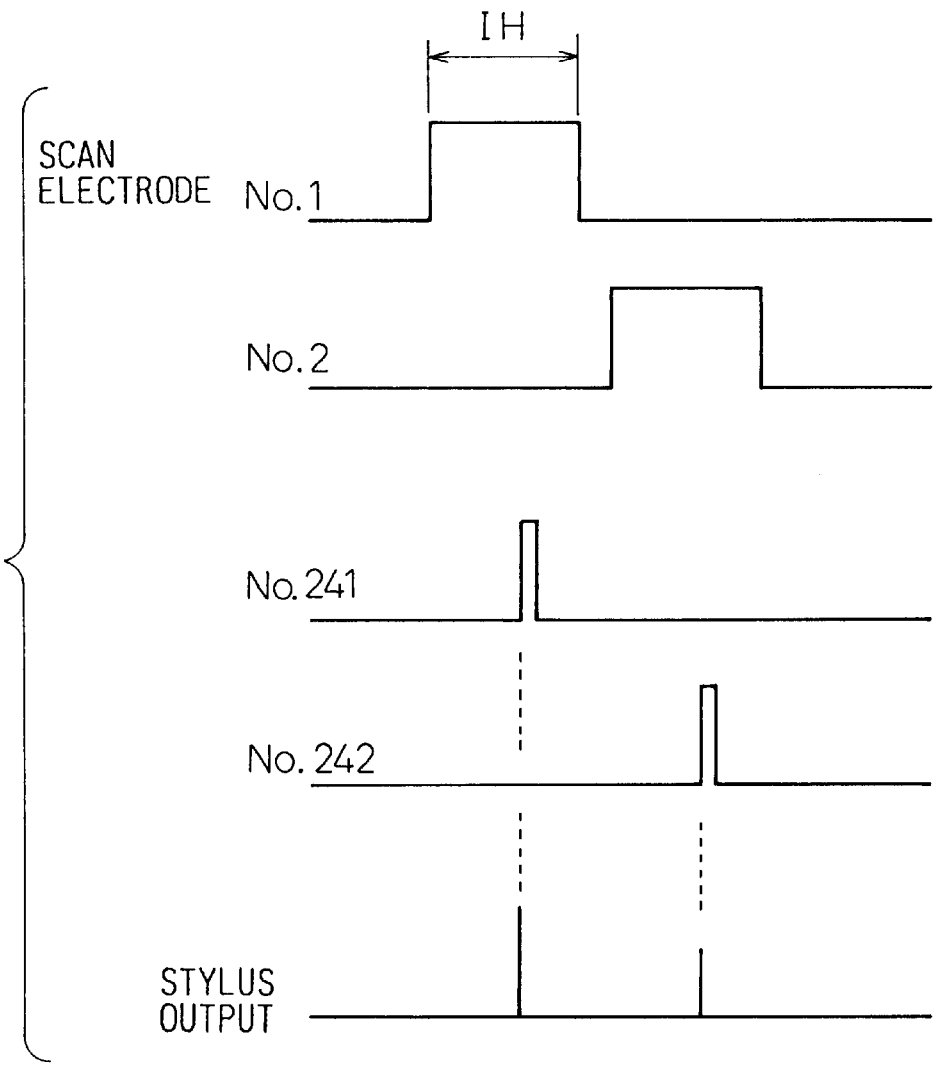
FIG. 24 shows scan pulses and auxiliary pulses in the fourth embodiment.

As shown in FIG. 23, in the fourth embodiment, an auxiliary pulse is applied to a data electrode together with a scanning pulse. An auxiliary pulse lags behind a scanning pulse by a half of one frame. Assuming that the number of scan electrodes is 2n, when a scanning pulse is applied to the first scan electrode, an auxiliary pulse is applied to the n+1-th scan electrode. When a scanning pulse is applied to the second scan electrode, an auxiliary pulse is applied to the n+2-th scan electrode. When a scanning pulse is applied to the n+1-th scan electrode, an auxiliary pulse is applied to the first scan electrode. The pulse duration of an auxiliary pulse is determined to such an extent that when an auxiliary pulse is applied to a scan electrode located close to a stylus, the application of an auxiliary pulse can be detected. The pulse duration of an auxiliary pulse is shorter than that of a scanning pulse. Even when an auxiliary pulse causes a transistor in a cell to go on, current flowing from an associated data electrode into the cell or vice versa is negligible and does not cause the state of the cell to change. Consequently, application of auxiliary pulses will not affect a display. Furthermore, as shown in FIG. 24, variations of a scanning pulse and auxiliary pulse applied substantially concurrently to scan electrodes separated by a space corresponding to a half of a frame will not coincide with each other. Therefore, once it is determined whether a detected pulse provided by a stylus is responsive to a variation of a scanning pulse or a variation of an auxiliary pulse, a contact position of the stylus can be detected on the basis of an applied position of the scanning or auxiliary pulse. Assuming that the stylus provides a pulse shown in FIG. 24, it is recognized that the pulse is responsive to an auxiliary pulse applied to the two hundred forty-first scan electrode.

When the above method is adopted, the rate of detecting the position of a scan electrode located closely to a stylus improves to be 120 points per second, which corresponds to a rate twice as fast as a frame cycle.

Figure 25:
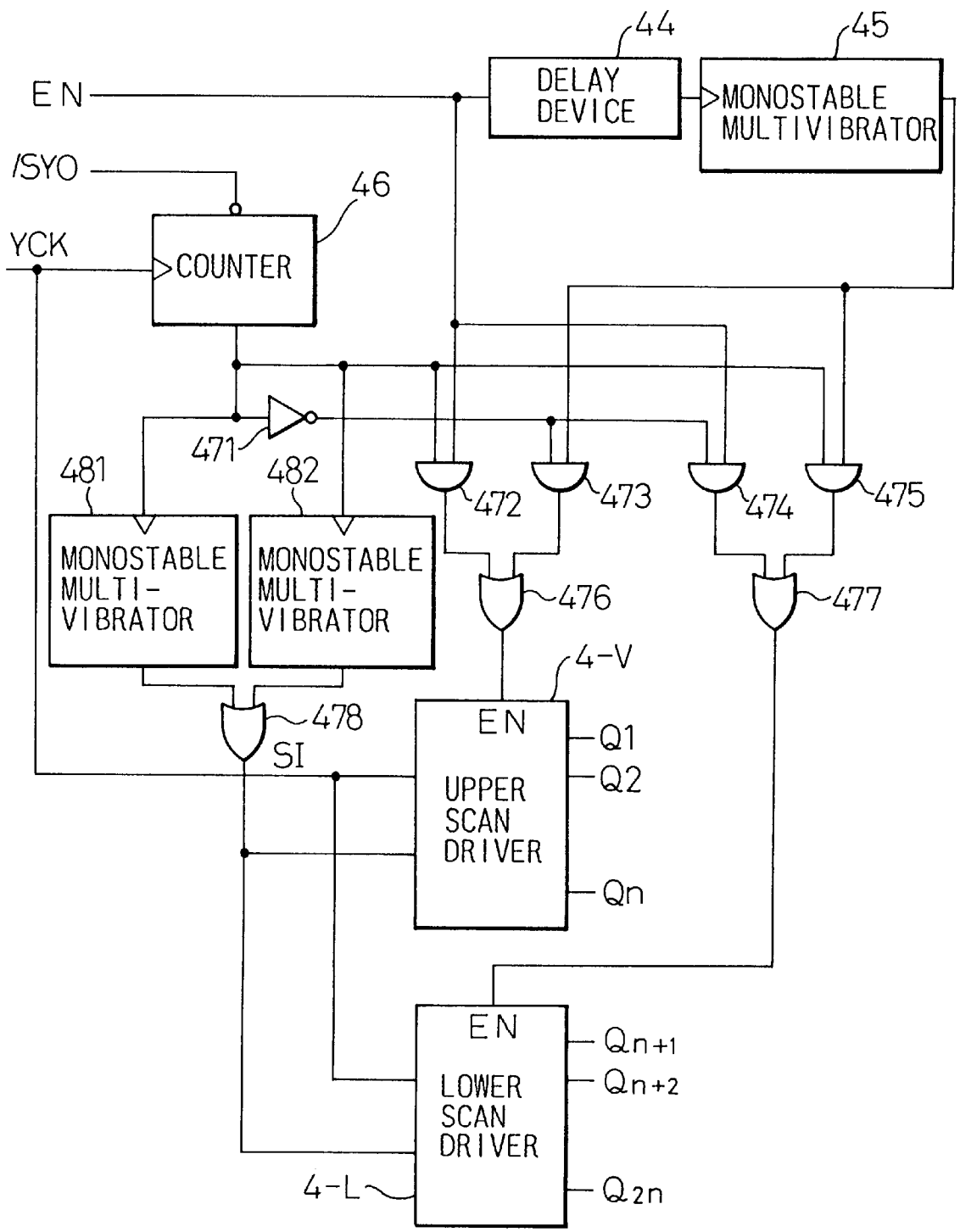
FIG. 25 shows the configuration of the scan driver in the fourth embodiment.
Figure 26:
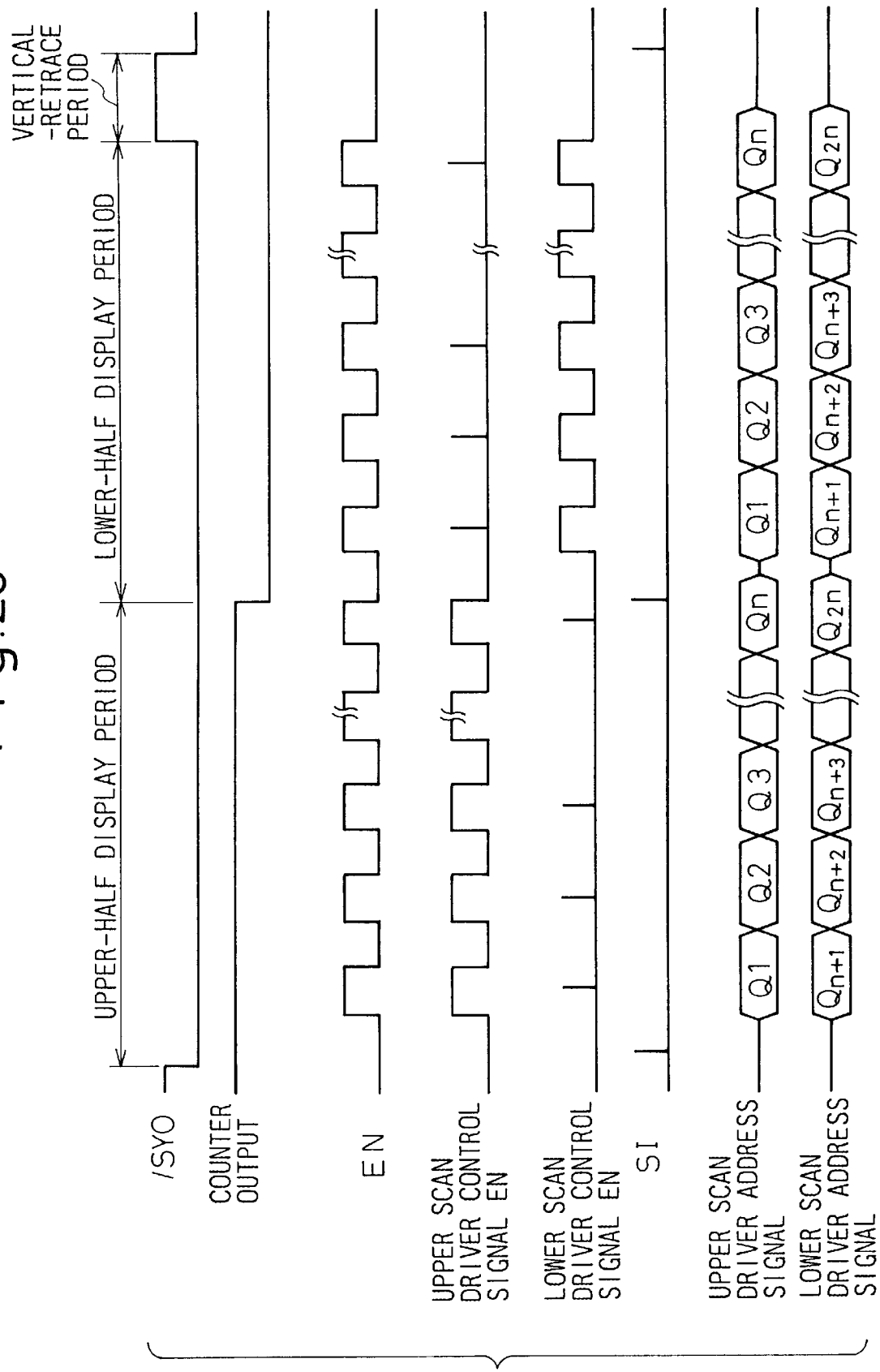
FIG. 26 shows the timing of actions performed by the scan driver in the fourth embodiment.

FIG. 25 shows the configuration of a scan driver for generating auxiliary pulses shown in FIG. 23 in the fourth embodiment. FIG. 26 is a timing chart describing the timing of actions performed by the scan driver of the fourth embodiment.

The scan driver is usually constructed in the form of an IC. The scan driver IC is usually designed to drive electrodes constituting sixty or one hundred and twenty display lines. For example, for realizing a liquid-crystal panel having scan electrodes constituting 240 display lines, two ICs each having the ability of drive 120 display lines are installed. The liquid-crystal panel is divided vertically into two portions. The upper and lower portions are driven by upper and lower scan drivers. When four scan driver ICs are used, the liquid-crystal panel is divided into two upper portions and two lower portions. In FIG. 25, reference numerals 4-U and 4-L denote upper and lower scan drivers. These scan drivers have the same circuitry. When a y-axis clock YCK and a shift start signal SI are applied, while a signal applied to an output control terminal EN remains on, a scanning pulse is applied to an electrode indicated by current bits. The output control signal EN is delayed by a given time by means of a delay device 44, and then fed to a monostable multivibrator 45. Thus, an auxiliary output control signal having so short a pulse duration that does not coincide with the output control signal EN is generated as shown in FIG. 24.

Reference numeral 46 is a counter. The counter 46 counts the clock pulses YCK. When display involves the upper half of the liquid-crystal panel, the counter 46 provides a high-level signal. When display involves the lower half thereof, the counter 46 provides a low-level signal. In response to an output of the counter 46, when display involves the upper half of the liquid-crystal panel, an inverter 471, AND gates 472 to 475, and OR gates 476 and 477 extend control so that the output control signal EN will be applied to the upper scan driver 4-U and the auxiliary output control signal will be applied to the lower scan driver 4-L. When display involves the lower half of the liquid-crystal panel, the control is extended so that the auxiliary output control signal will be applied to the upper scan driver 4-U and the output control signal EN will be applied to the lower scan driver 4-L Reference numerals 481 and 482 denote monostable multivibrators. Outputs of the monostable multivibrators 481 and 482 are ORed by an OR gate 478, whereby the shift start signal SI is fed to the upper and lower scan drivers 4-U and 4-L respectively. Each of the upper and lower scan drivers 4-U and 4-L handles a half of the number of bits manipulated in the liquid-crystal panel. Shifting must be performed twice a frame, wherein a scanning pulse and an auxiliary pulse can be provided at every shifting. In response to the shift start signal SI provided at the start and middle of one frame respectively, shifting is carried out twice.

As shown in FIG. 23, when display involves the upper half of the liquid-crystal panel, the upper scan driver 4-U shifts a scanning pulse continually and the lower scan driver 4-L shifts an auxiliary pulse continually. When display involves the lower half thereof, the upper scan driver 4-U shifts an auxiliary pulse continually and the lower scan driver 4-L shifts a scanning pulse continually.

Figure 27:
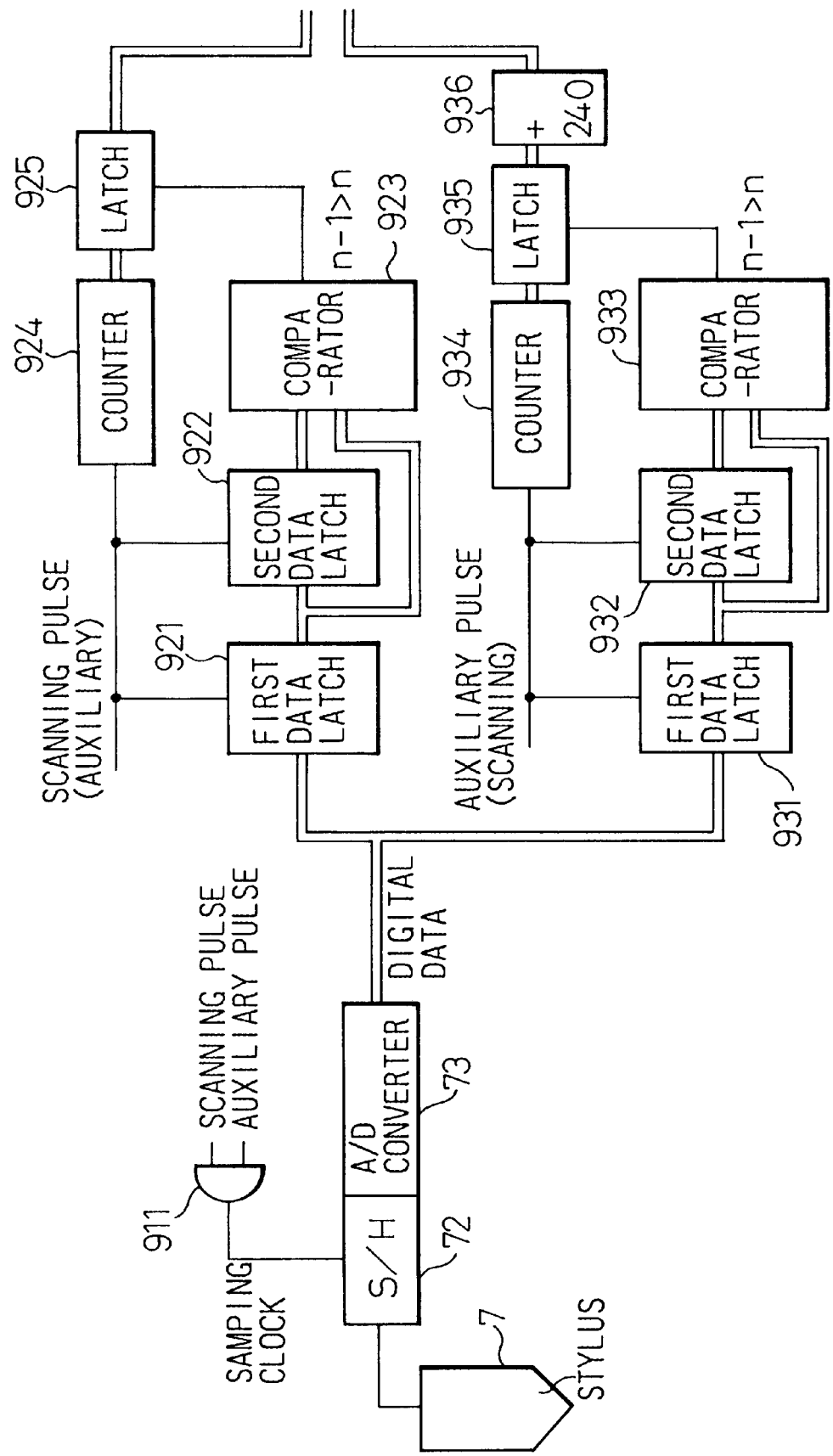
FIG. 27 shows the configuration of a detector in the fourth embodiment.

FIG. 27 shows a circuit that, when scanning pulses and auxiliary pulses such as those mentioned above are applied consecutively to scan electrodes, it processes an output of a stylus so as to detect a contact position.

Figure 28:
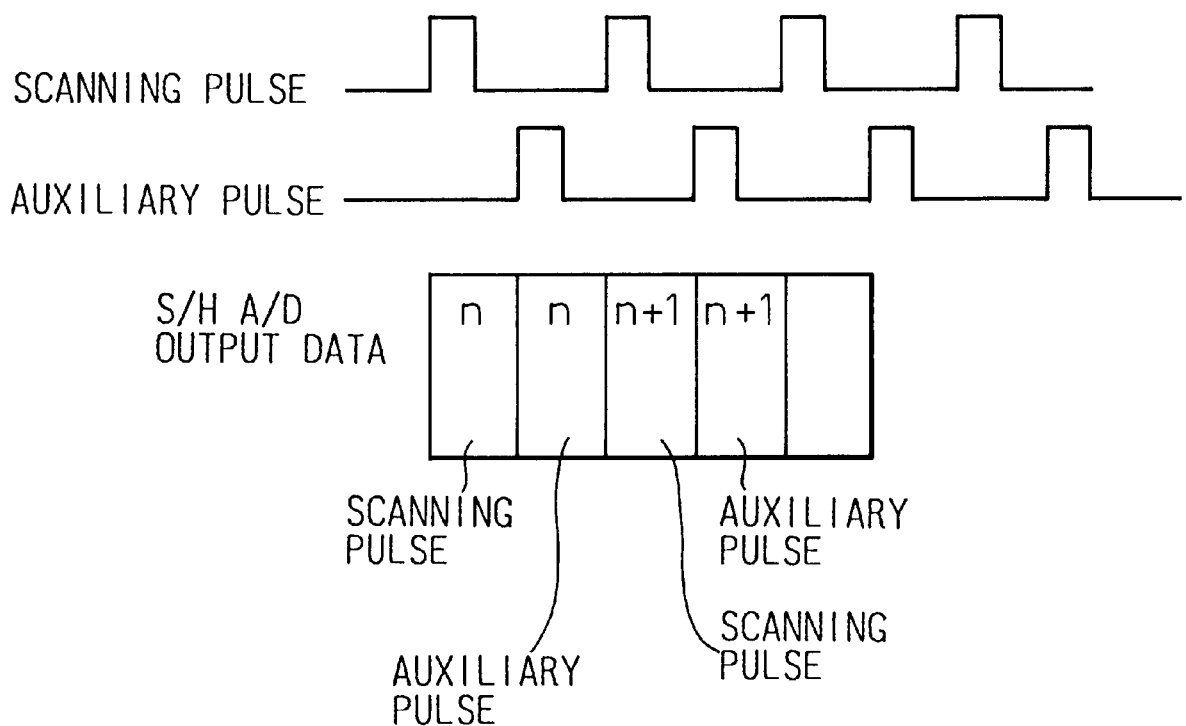
FIG. 28 shows a detected signal in the fourth embodiment.

As shown in FIG. 27, an output of the stylus 7 is held in the sample and hold 72 according to a scanning pulse and an auxiliary pulse, and then converted into a digital signal by the A/D converter 73. FIG. 28 shows the relationships among a scanning pulse, an auxiliary pulse, and a signal held by the sample and hold 72 and converted by the A/D converter 73.

The digital signal is fed to two circuit systems in order to detect a contact position of the stylus. One of the circuit systems detects a contact position in the upper half of the liquid-crystal panel. When display involves the upper half, scanning pulses are fed to this circuit. When display involves the lower half, auxiliary pulses are fed. Responsively to a scanning or auxiliary pulse, the digital signal provided by the A/D converter 73 is latched by a first data latch 921. In responsive to the next scanning or auxiliary pulse, the digital signal is latched by a second data latch 922. The latched values are mutually compared by a comparator 923. If the value latched later is smaller, a determination pulse is supplied. At the leading edge of the determination pulse, an output of a counter 924 that counts scanning pulses (auxiliary pulses) is latched by a latch 925.

When display involves the upper half of the liquid-crystal panel, the other circuit system inputs auxiliary pulses. When display involves the lower half thereof, the other circuit system inputs scanning pulses. Except this point, this circuit system is identical to the circuit system mentioned above. This circuit system adds 240 to the value of a position of a scan electrode to which a pulse causing a peak value to be detected is applied and supplies the sum.

As mentioned above, the contact position in a vertical direction; that is, the position of a scan electrode located most closely to the stylus can be detected at a two-fold detection rate. Next, a method of detecting the contact position in the horizontal direction; that is, the position of the data electrode located most closely to the stylus at a two-fold detection rate will be described.

Figure 29:
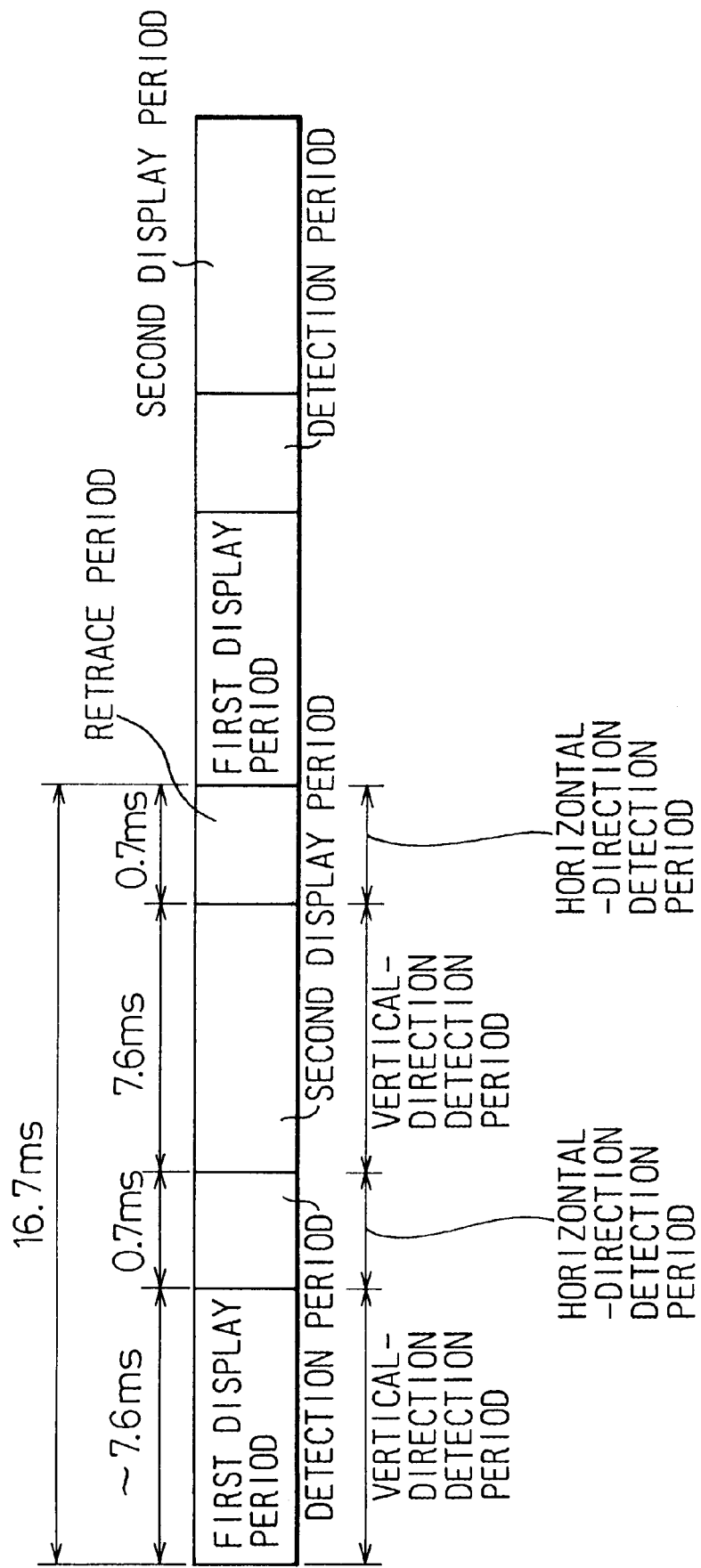
FIG. 29 describes a sequence of detecting a contact position in a horizontal detection in the fourth embodiment.

FIG. 29 shows a sequence for detecting a contact position in the horizontal direction in the fourth embodiment.

As shown in FIG. 29, when display is achieved at the rate of 60 frames per second, one frame is 16.7 ms. A vertical-retrace period within one frame is 1.4 ms. In the first to third embodiments, the last 1.4 ms of each frame is defined as a horizontal-direction detection period during which the contact position in the horizontal direction is detected. However, the detection rate is 60 points per second under these conditions. In the fourth embodiment, as shown in FIG. 29, one frame is divided into two portions; the first half and second half. The last 0.7 ms of each of the first and second halves is defined as a horizontal-direction detection period. During the horizontal-direction detection period, detection pulses are applied consecutively to all data electrodes in order to detect the contact position of a stylus in the horizontal direction. Thus, detection of the contact position in the horizontal direction is carried out twice a frame. The detection rate becomes as high as 120 points per second. Since one horizontal-direction detection period is half that employed in the first to third embodiments, a cycle of applying detection pulses consecutively to data electrodes must be half as long as the one employed in the first to third embodiments.

Figure 30:
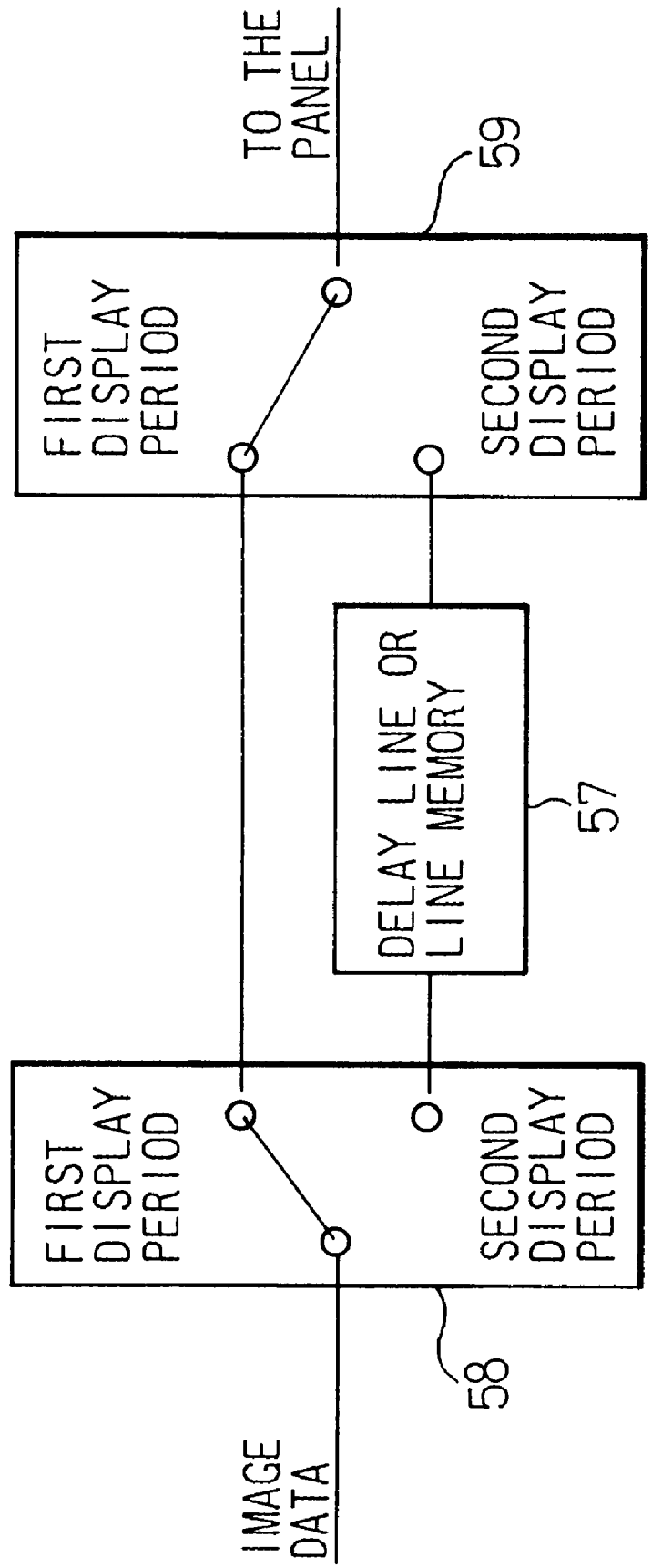
FIG. 30 shows a display data output unit in the fourth embodiment.

Normally, when display starts within one frame, display data is supplied continually. When a horizontal-direction detection period is defined at the end of the first half of one frame, as shown in FIG. 29, display data to be displayed thereafter must be delayed by a time interval corresponding to the horizontal-direction detection period. FIG. 30 shows the configuration of a display data output unit having the ability to delay display data. In FIG. 30, reference numeral 57 denotes a delay line for delaying display data by a time interval corresponding to the horizontal-direction detection period. Owing to switches 58 and 59, display data is supplied to the liquid-crystal panel as it is during the first half of one frame, whereas display data is delayed by the delay line 57 and then supplied during the second half thereof.

Assuming that, as shown in FIG. 29, the display period lasts 15.2 ms and the horizontal-direction detection period at the end of the first half of one frame lasts 0.7 ms, a delay time caused by the delay line 57 corresponds to about 1/20 of a full horizontal scanning line. When the number of horizontal lines is 480, the delay line must yield a delay time corresponding to 22 horizontal lines. Such a delay line, for example, is realized with a first-in-first-out (hereinafter FIFO) memory in which data stored first is read out first.

In the fourth embodiment, for detecting a contact position of a stylus in a vertical direction, an auxiliary pulse whose rise or fall timing is inconsistent with that of a scanning pulse is delayed by a half of one frame and then applied. In the fifth embodiment, an auxiliary pulse that is weaker than a scanning pulse is applied. It is determined according to the strength of an output pulse of a stylus whether the output pulse of the stylus is responsive to a scanning pulse or an auxiliary pulse.

Figure 31:
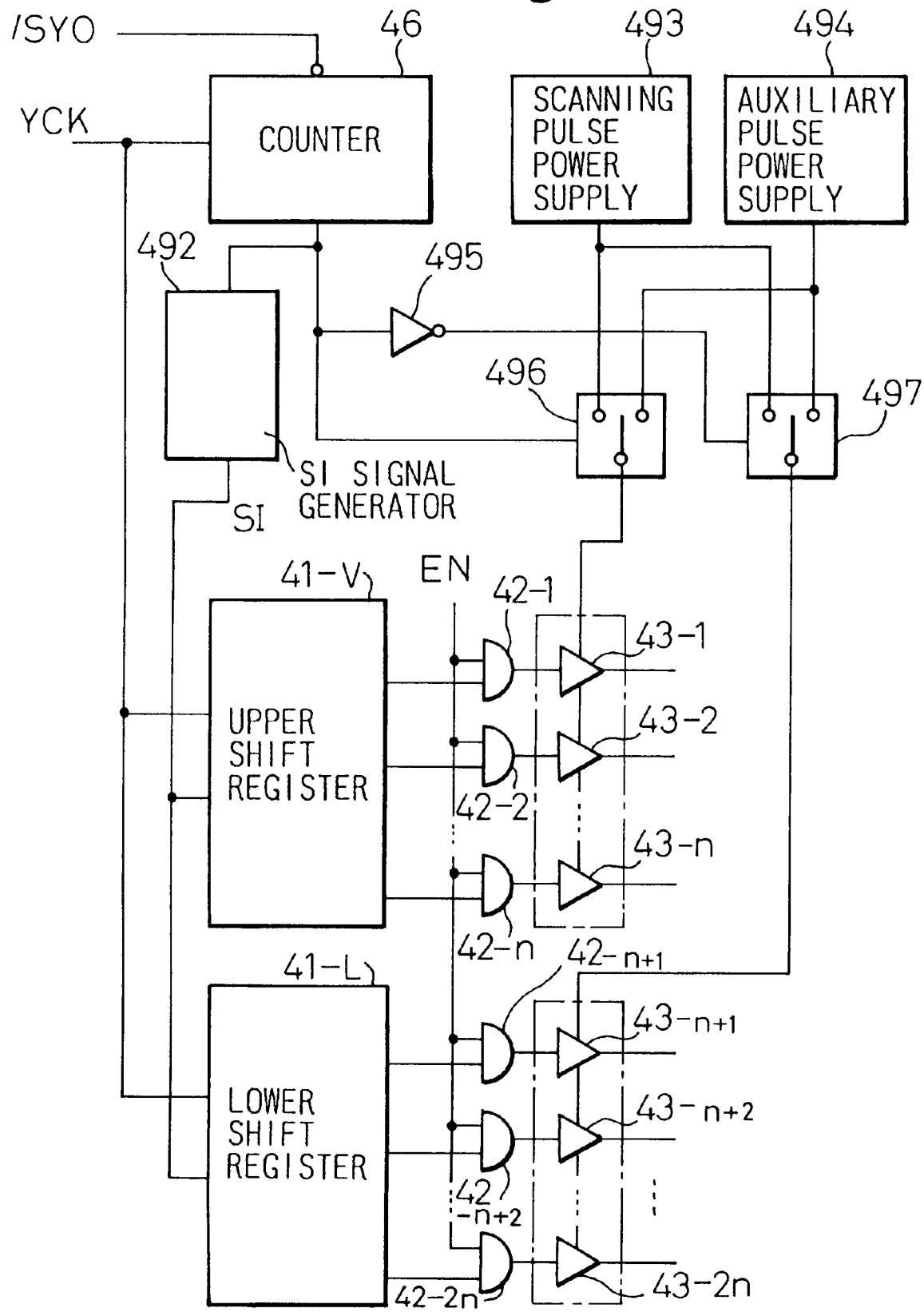
FIG. 31 shows the configuration of a scan driver in the fifth embodiment.

FIG. 31 is a circuit diagram showing the configuration of a scan driver in the fifth embodiment.

In FIG. 31, an upper shift register 41-U and lower shift register 41-L correspond to shift registers in the upper scan driver 4-U and lower scan driver 4-L in the fourth embodiment shown in FIG. 25. The counter 46 is identical to the one in the fourth embodiment shown in FIG. 25. An SI signal generator 492 is identical to the circuit composed of the monostable multivibrators 481 and 482 and the OR gate 478 in FIG. 20. Reference numerals 42-1 to 42-2n denote AND gates identical to those shown in FIG. 12A. The AND gates 42-1 to 42-2n define an output period of pulses to be applied to scan electrodes. 43-1 to 43-2n denote drivers identical to those in FIG. 12A. Depending on voltage applied to any of the drivers, the strength of an output pulse varies. 493 denotes a scanning pulse power supply for supplying voltage to be applied to each of the drivers 43-1 to 43-2n so that a scanning pulse can be provided. 494 denotes an auxiliary pulse power supply for supplying voltage to be applied to each of the drivers 43-1 to 43-2n so that an auxiliary pulse can be provided. Switches 496 and 497 are controlled according to a signal sent from the counter 46. During the first display period, the scanning pulse power supply 493 supplies voltage to each of the upper drivers 41-1 to 43-n and the auxiliary pulse power supply 494 supplies voltage to each of the lower drivers 43-n+1 to 43-2n. During the second half of the display period, the auxiliary pulse power supply 494 supplies voltage to each of the upper drivers 43-1 to 43-n and the scanning pulse power supply 493 supplies voltage to each of the lower drivers 43-n+1 to 43-2n. Thus, an auxiliary pulse that is weaker than a scanning pulse is applied such that it will lag behind a scanning pulse by a half of one frame.

Figure 32:
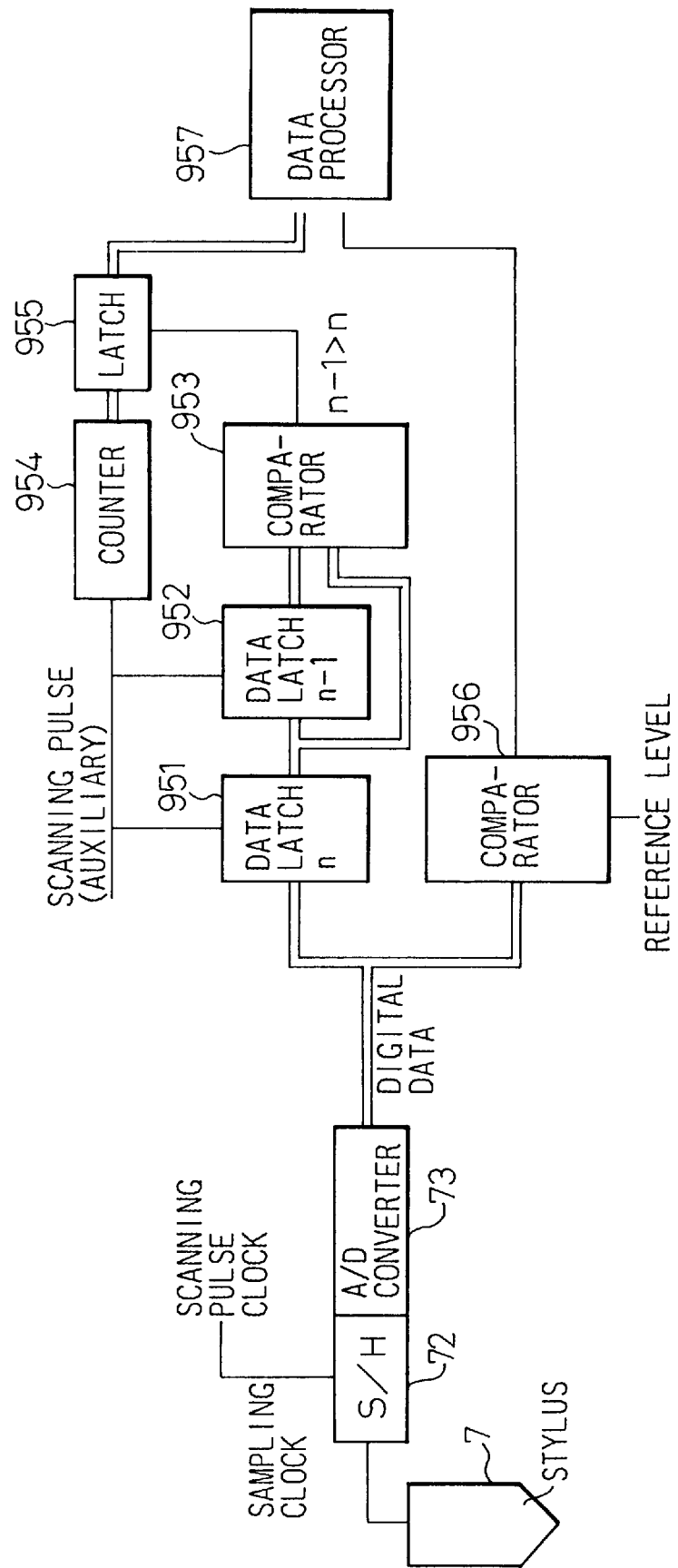
FIG. 32 shows the configuration of a detector in the fifth embodiment.

FIG. 32 shows a detector in the fifth embodiment.

As is apparent from comparison with FIG. 27, when a comparator 956 and a data processor 957 are excluded, the detector in the fifth embodiment is substantially identical to one of two systems in the detector in the fourth embodiment. As described in conjunction with FIG. 27, a latch 955 stores the position of a data electrode, which is detected with the peak value of an output of the stylus, at intervals of a half of one frame. A comparator 956 checks if an output of the stylus has the peak value and determines whether the peak value is in response to a scanning pulse or an auxiliary pulse. The data processor determines whether the scanning pulse or auxiliary pulse has been applied to either the upper or lower half of the liquid-crystal panel. If the pulse has been applied to the upper half of the liquid-crystal panel, the applied position of the pulse is supplied as it is. If the pulse has been applied to the lower half thereof, a position calculated by adding 240 to the applied position is supplied.

In the first to third embodiments, a contact position in a horizontal direction is detected during a vertical-retrace period. Horizontal scanning pulses are therefore applied consecutively to all the data electrodes during the vertical-retrace period, whereby a contact position in a horizontal direction is detected. In the fourth and fifth embodiments, two horizontal-direction detection periods are defined within one frame. This is intended to upgrade the rate of detecting a contact position in a horizontal direction. Even in this case, horizontal scanning pulses are applied consecutively to all the data electrodes during each horizontal-direction detection period. The horizontal-direction detection period must therefore be long to a certain extent. A delay line or delay memory is therefore needed to delay a data signal as shown in FIG. 25. As far as a normal video signal is concerned, what is called a horizontal-retrace period during which no data signal is supplied is defined between applications of a data signal concerning each horizontal line. A video signal supplied to the LCD has a horizontal-retrace period. During the horizontal-retrace period, display scanning pulses are inactive. The horizontal-retrace period can therefore be used as the horizontal-direction detection period. The sixth embodiment utilizes the horizontal-retrace period as the horizontal-direction detection period.

Figure 33:
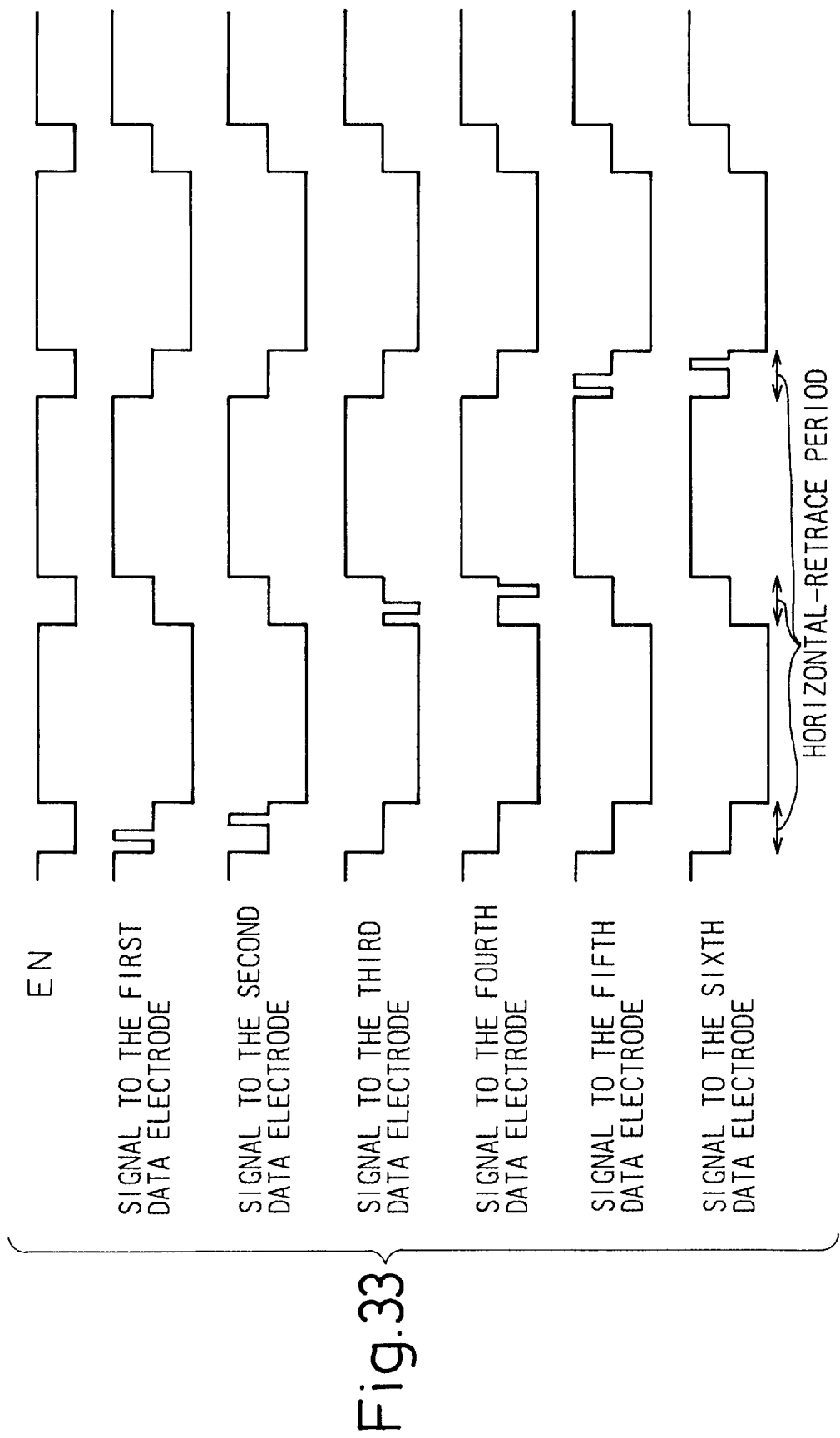
FIG. 33 shows horizontal scanning signals in the sixth embodiment.

FIG. 33 shows pulses applied to data electrodes by the data driver 5 in the fifth embodiment. The other components are identical to those in the fourth embodiment.

In FIG. 33, EN denotes a signal for controlling an output of a scan driver as described so far. When the EN signal is high, a display scanning pulse becomes active. This causes a transistor in each cell to go on. Writing of each cell is executed. The data driver 5 outputs a data signal for a period slightly longer than a period during which the EN signal is high. The data signal is then applied to the cells constituting a display line to which a display scanning pulse is applied. In this example, the data signal is reversed in polarity for each display line. As shown in FIG. 33, a period during which the EN signal is not high is a horizontal-retrace period. During the horizontal-retrace period, since a display scanning pulse is not active, a signal applied to a data electrode does not affect display. The horizontal-retrace period is defined by the number of display lines. In this embodiment, horizontal scanning pulses are applied consecutively to two data electrodes during one horizontal-retrace period. Horizontal scanning pulses are applied consecutively to all the data electrodes during one frame. In a normal liquid-crystal panel, the number of display columns is larger than that of display lines. For applying horizontal scanning pulses to all the data electrodes, horizontal scanning pulses must be applied to at least two data electrodes during one horizontal-retrace period. The number of horizontal scanning pulses applicable during one horizontal-retrace period depends on the length of a horizontal-retrace period. When the data driver 5 has high driving ability, the time required for writing can be shortened and the horizontal-retrace period can be extended. When the number of data electrodes to which horizontal scanning pulses are applied during one horizontal-retrace period increases, the number of horizontal scanning pulses applicable to data electrodes during one frame gets larger. This results in an upgraded detection rate. When the number of display lines is equal to or larger than that of display columns, application of one horizontal scanning pulse per horizontal-retrace period is conceivable.

As mentioned above, in the sixth embodiment, detection of a contact position in the horizontal direction is, similarly to detection thereof in the vertical direction, carried out continually during one full frame.

A vertical-retrace period is used as a horizontal-direction detection period in the fourth embodiment, while a horizontal-retrace period is used in the sixth embodiment. The vertical-retrace period and horizontal-retrace period do not coincide with each other. A contact position in a horizontal position may therefore be detected during both the vertical-retrace period and horizontal-retrace period. In the seventh embodiment, a contact position in a horizontal position is detected during both the vertical-retrace period and horizontal-retrace period.

Figure 34:
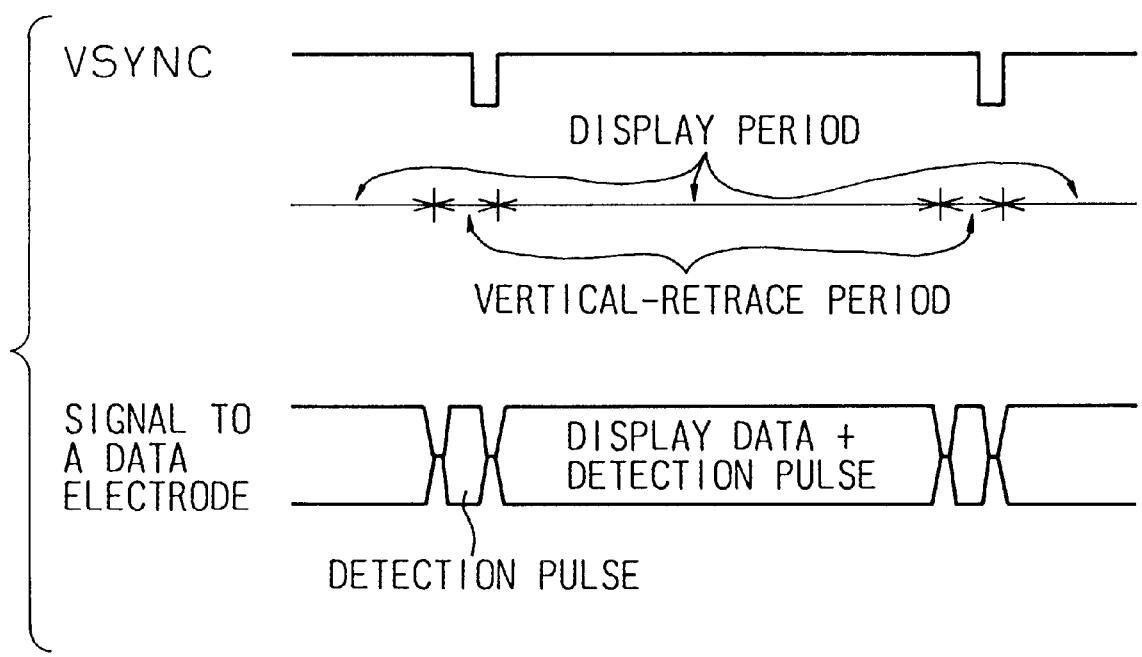
FIG. 34 shows the timing of applying a horizontal scanning signal in the seventh embodiment.

FIG. 34 shows the contents of a signal applied to a data electrode in the seventh embodiment. The other components are identical to those in the sixth embodiment.

In FIG. 34, horizontal scanning pulses as those shown in FIG. 7, 10, 14, 16, or 22 are applied consecutively during a vertical-retrace period. Horizontal scanning pulses shown in FIG. 33 are applied consecutively during a horizontal-retrace period within a display period. This results in an upgraded rate of detecting a contact position in the horizontal direction.

In the first to seventh embodiments, scanning pulses used for display are applied to detect a contact position of a stylus in the vertical direction. For detecting a contact position in the horizontal direction, pulses unrelated to display must be applied to data electrodes during a period during which display is not achieved. Power consumption increases by the amount required for the application. A stylus is used to point to any point in a display. An actual contact time is quite short. In the first to fifth embodiments, pulses for use in detecting a contact position in a horizontal direction are applied during a period during which display is not achieved.

In the eighth embodiment, an unnecessary application of pulses for detecting the contact position in the horizontal direction is avoided in order to reduce power consumption.

Figure 35:
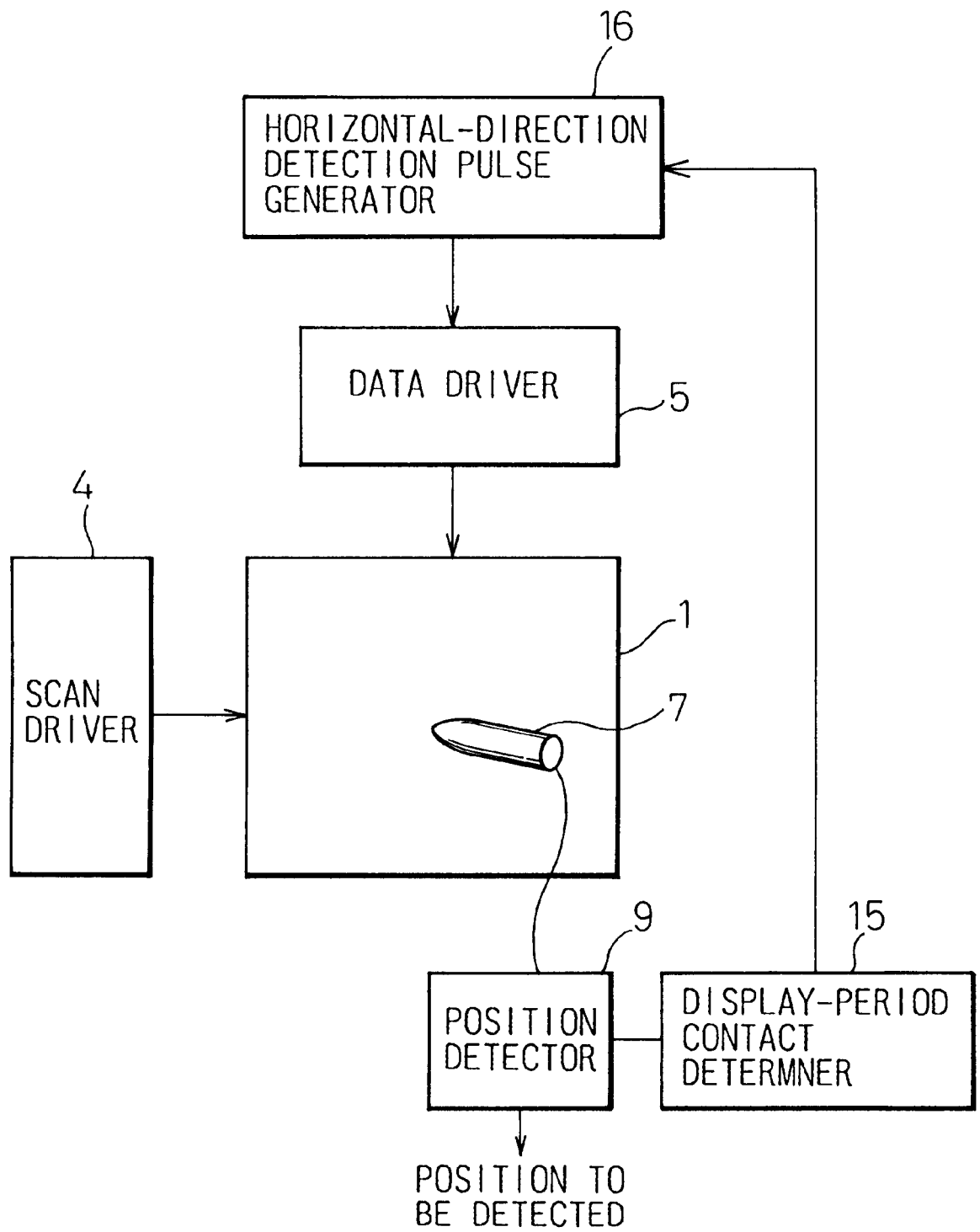
FIG. 35 shows the configuration of an LCD having the capability of a tablet in accordance with the eighth embodiment.

FIG. 35 shows the configuration of the eighth embodiment.

As shown in FIG. 35, an active matrix type LCD of the eighth embodiment comprises, similarly to a conventional LCD, a display panel 1, a scan driver 4, a data driver 5, a stylus 7, a position detector 9, and a horizontal-direction detection pulse generator 16 for generating pulses to be applied to data electrodes during a period during which display is not achieved so that the data electrodes can be used to detect the contact position in the horizontal direction. The active matrix type LCD of the eighth embodiment further comprises a display-period contact determiner 15 for determining whether an output pulse exceeding a given value is provided in response to a scanning pulse applied to a scan electrode by the scan driver 4. If the stylus 7 is in contact with the panel 1, an output pulse exceeding a given value is provided in response to a scanning pulse. If the stylus 7 is not in contact therewith, an output pulse of a small value is provided in response to a scanning pulse. Therefore, when an output pulse exceeding the given value is provided, it is assumed that the stylus is in contact. The horizontal-direction detection pulse generator 16 is activated to generate pulses for use in detecting a contact position in a horizontal direction during a detection period. Thus, a contact position in a horizontal direction is detected. When an output pulse exceeding the given value is not provided, it is assumed that the stylus is not in contact. The horizontal-direction detection pulse generator 16 is therefore not activated, and a contact position in a horizontal direction is therefore not detected. Thus, when the stylus is not in contact, an unnecessary application of pulses to data electrodes is not carried out. This results in reduced power consumption.

Figure 36A:
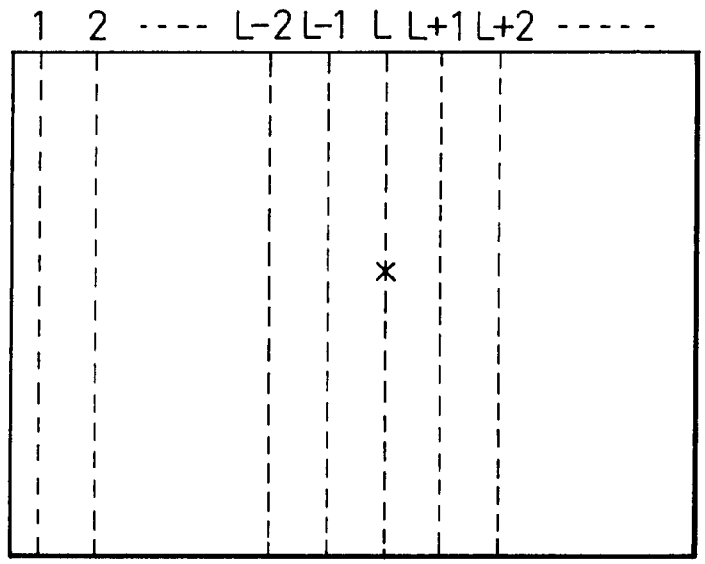
FIGS. 36A and 36B show position detection in the ninth embodiment.
Figure 36B:
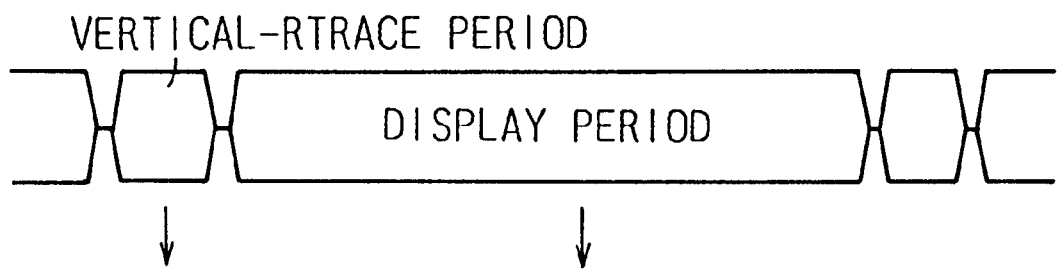

Next, a modification of detecting a contact position in a horizontal direction will be described as the ninth embodiment. FIGS. 36A and 36B show the procedure of detecting a contact position in a horizontal direction in the ninth embodiment.

In the seventh embodiment shown in FIG. 34, both the vertical-retrace period and horizontal-retrace period are used as horizontal-direction detection periods. During a vertical-retrace period, horizontal scanning pulses are applied consecutively to all data electrodes. When the stylus is in contact, a pulse is developed in a detected signal when a scanning pulse is applied to an electrode located at the contact position. The ninth embodiment is based on the seventh embodiment, wherein application of unnecessary horizontal scanning pulses during a horizontal-retrace period is avoided in order to reduce power consumption.

In the ninth embodiment, as shown in FIG. 36A, horizontal scanning pulses are applied consecutively to all data electrodes during a vertical-retrace period. When the stylus 7 is in contact, as shown in FIG. 36B, the contact position of the stylus 7 in a horizontal direction is detected. Application of horizontal scanning pulses during a horizontal-retrace period is achieved only when the stylus is in contact and involves only the data electrodes located within a given range centered on the detected contact position in a horizontal direction. The distance moved by the stylus 7 on the panel 1 during one frame is presumed to be not very long. Horizontal scanning pulses should be applied to the electrodes located in the vicinity of the contact position detected during the vertical-retrace period.

Figure 37:
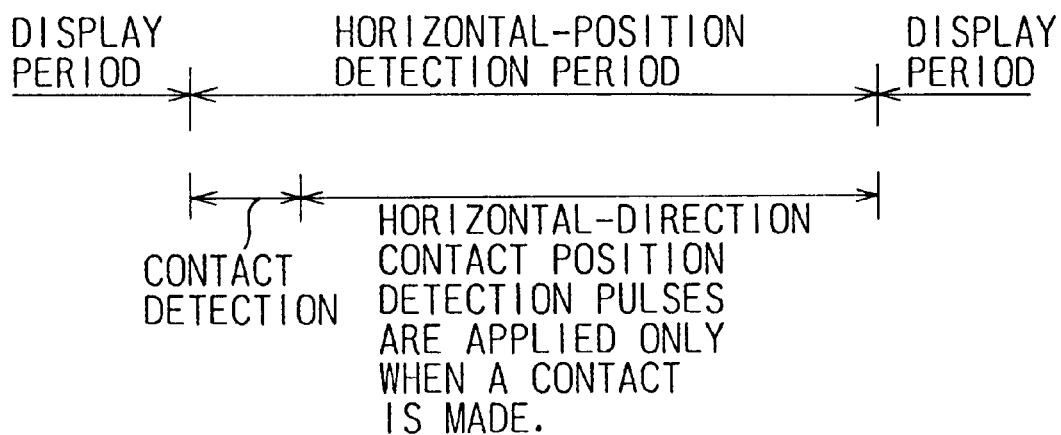
FIG. 37 shows position detection in the tenth embodiment.

FIG. 37 shows another modification of detecting a contact position in a horizontal direction; that is, a procedure of detecting a contact position in the horizontal direction in the tenth embodiment.

In the tenth embodiment, when a horizontal detection period starts, it is determined whether a stylus is in contact. Only when it is determined that the stylus is in contact, coordinates of a contact position are calculated. Thus, when the stylus is not in contact, unnecessary horizontal detection can be omitted.

Figure 38:
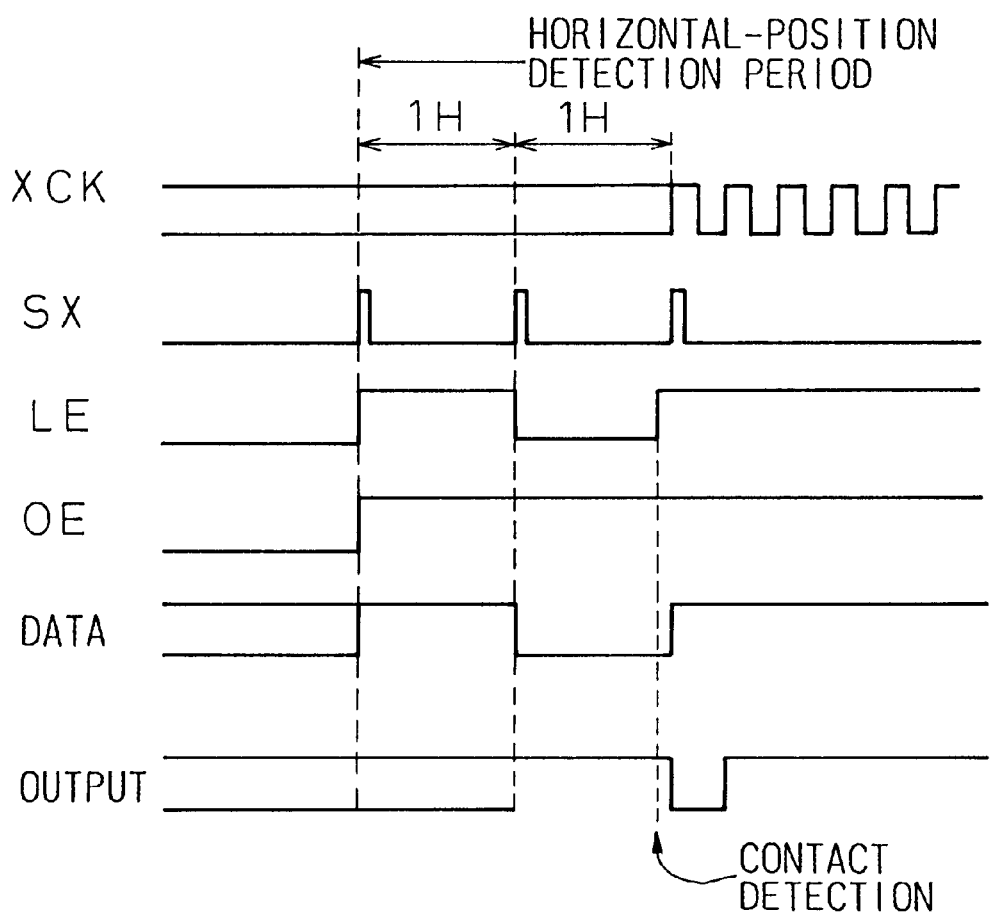
FIG. 38 shows operating signals used in the tenth embodiment.

In the tenth embodiment, the aforesaid data driver and control unit in any of the first to fourth embodiments are used to apply a signal shown in FIG. 38 to the data driver. To be more specific, when a horizontal detection period starts, the voltage applied continually to all data electrodes by the data driver is varied unidirectionally (driven high in FIG. 38). The time interval required for this variation is normally equal to one horizontal line period 1H. Thereafter, when a signal LE is driven from low to high, the voltage to be applied continually to all the data electrodes is varied in the opposite direction. The output provided by the stylus at this time is analyzed. This analysis requires time equal to one horizontal line period 1H. If the stylus is in contact, a signal whose strength exceeds a given value is detected. If the stylus is not in contact, a weak signal is detected. As mentioned above, the time required for setting a voltage to be applied continually to all the data electrodes in one direction and then varying it in the opposite direction is comparable to two horizontal line periods 2H.

After it is detected that the stylus is in contact, similarly to the aforesaid embodiments, data electrodes to which pulses are applied consecutively are shifted from one group to another in order to detect the position of a data electrode located most closely to the stylus. When the stylus is not in contact, no pulses are applied to data electrodes until a display period starts.

In reality, only when a user wants to point to a position in a display, is the stylus is brought into contact with the panel. Pointing is usually carried out slowly. In this case, a contact position to be detected is often not substantially changed from a previously-detected position. At the start of detection of a contact position in a horizontal direction, pulses are therefore applied to only the electrodes located in the vicinity of the previously-detected contact position. It is then determined whether a contact is made within the range. If a contact is detected within the range, application of pulses to data electrodes outside the range is suspended. If no contact is detected within the range, pulses may be applied consecutively to all the data electrodes in order to detect a contact position. When contact positions do not change very much, an unnecessary application of pulses to data electrodes can be avoided.

When electrostatic coupling is utilized in detecting a contact position of a stylus on a liquid-crystal panel, an output signal of the stylus contains various kinds of noise. Various kinds of signals invade the liquid-crystal panel, thus causing noise. The noise causes a signal provided by the stylus to fluctuate over several display lines. This results in degraded precision in position detection. An embodiment attempting to minimize the influence of noise and improve the position detection precision will be described below.

Figure 39:
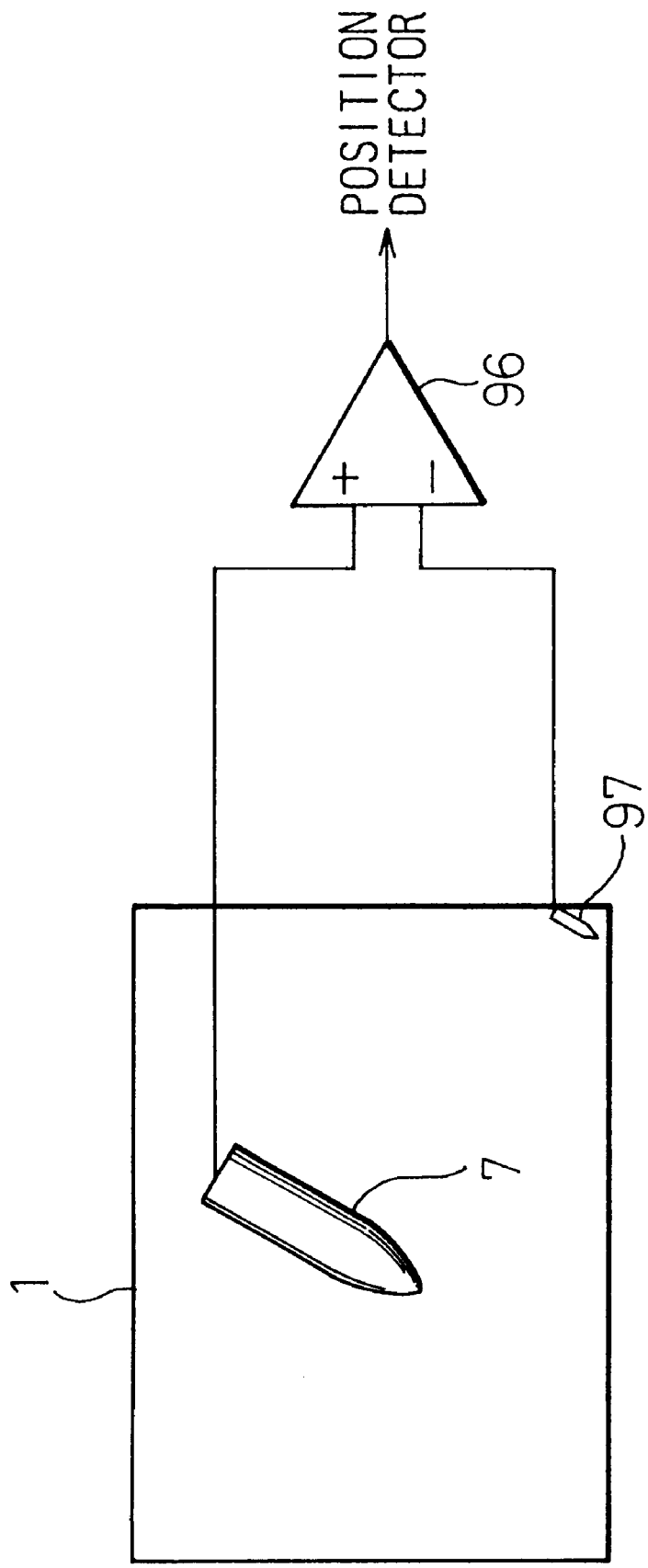
FIG. 39 shows the basic configuration of the eleventh embodiment.

FIG. 39 shows the basic configuration of the eleventh embodiment.

In FIG. 39, reference numeral 1 denotes a liquid-crystal panel. 7 denotes a stylus. The eighth embodiment further includes a dummy stylus 97. A differential amplifier 96 subtracts an output of the dummy stylus 97 from an output of the stylus 7, whereby the influence of noise is reduced.

Figure 40:
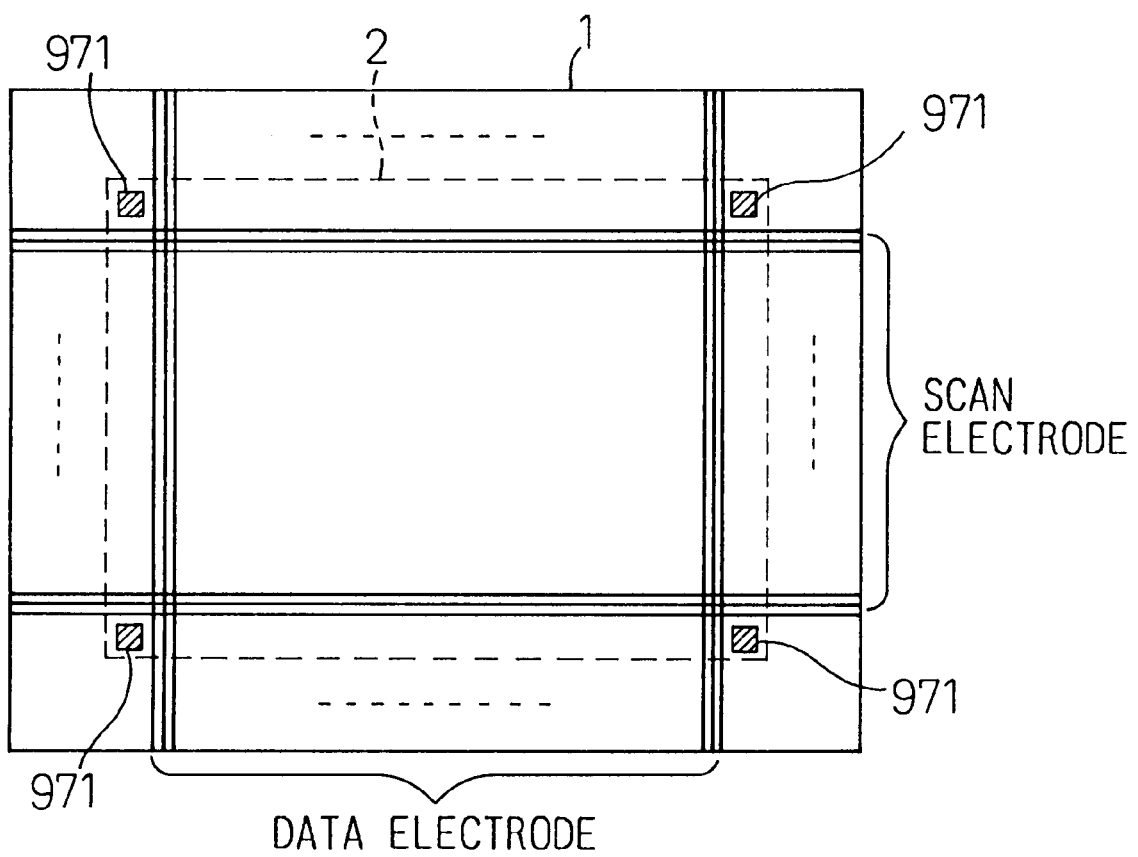
FIG. 40 shows the structure of a liquid-crystal panel in the eleventh embodiment.
Figure 41:
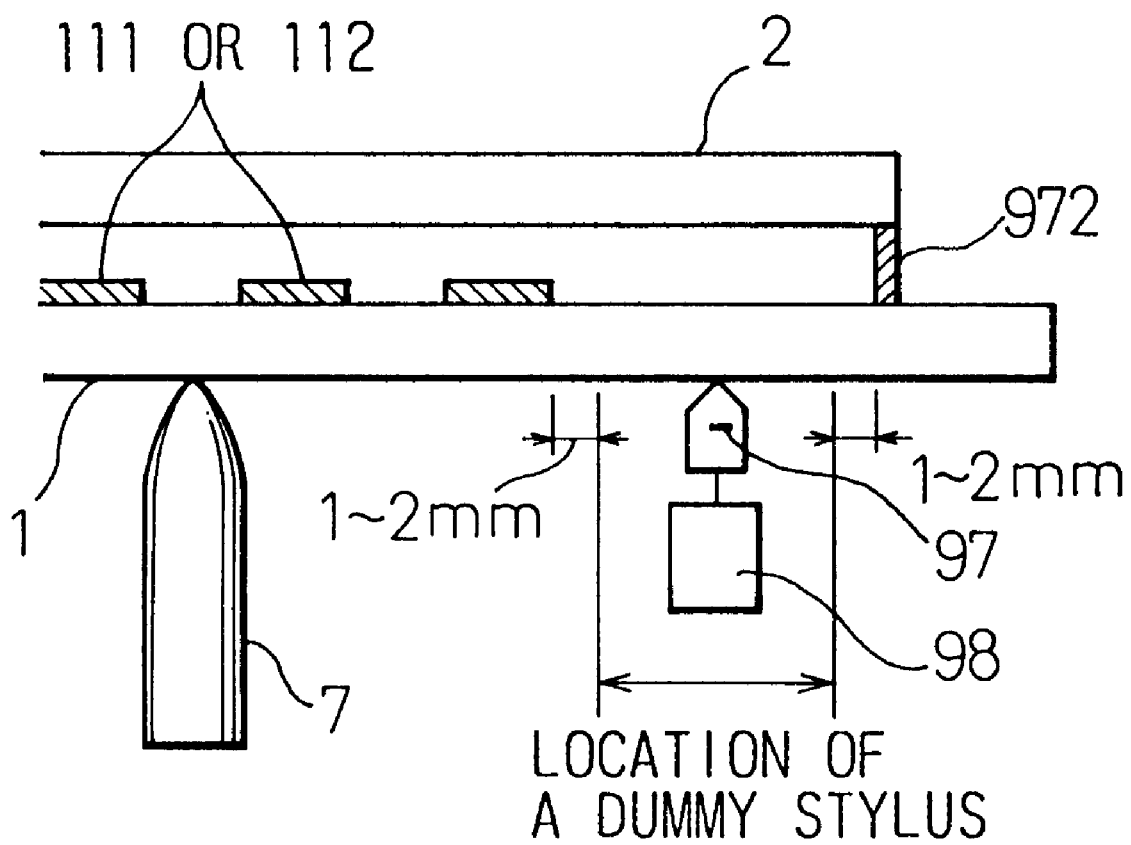
FIG. 41 shows the structure of a dummy stylus in the eleventh embodiment.

FIG. 40 shows the configuration of a liquid-crystal panel in the eleventh embodiment. FIG. 41 is a sectional view showing the dummy stylus 97 and its surrounding. In FIGS. 40 and 41, reference numeral 1 denotes a device substrate. 2 denotes an opposed substrate. 98 denotes an amplifier for amplifying an output of the dummy stylus 97. 971 denotes a position at which the dummy stylus 97 is installed. 972 denotes a seal. The stylus 7 provides a detected signal, which represents voltage variations associated with scan electrodes and data electrodes (linked on buses) and being detected through electrostatic coupling, together with noise. The noise contains external noise that is led to the opposed (common) substrate which is opposed to the device substrate and over which the transparent electrodes are formed. Since the common substrate has low resistance, the same noise is detected at any position in the common substrate. The location of the dummy stylus 97 should therefore be on the common substrate and free from the influence of the bus or the seal.

An amplifier (with an amplification factor of about 100), incorporated in an electrostatic coupling type stylus, amplifies to voltage detected at the tip of the stylus. The amplitude of the output voltage of the stylus is calculated by multiplying the amplitude of the sum of a voltage variation occurring on the bus and noise in the common substrate by the ratio of the capacitance on the glass to the input capacitance at the stylus tip. The input capacitance varies depending on the shape of the tip of the dummy stylus 97. By changing the amplification factor in the amplifier 96, noise provided by the dummy stylus 97 can be canceled out by a noise component of a detected signal. Consequently, the influence of noise is removed and detection precision is upgraded.

FIG. 42 shows the configuration of the twelfth embodiment.

In the twelfth embodiment, noise at a terminal connected to electrodes on the common substrate 2 is attenuated to be 1/100, and then subtracted from an output of the stylus by a subtracter 993. Thus, noise is removed. Assuming that the input capacitance of a stylus is about 1 picofarad (pF), mutual capacitance between the stylus and the command substrate is about 0.0001 pF. Assuming that the amplification factor is 100, when noise drawn from the common substrate 2 is attenuated to be 1/100, the noise has substantially the same level as a noise component of the output of the stylus 7. Therefore, when the noise is subtracted from the output of the stylus 7, the noise component is removed. This method obviates the necessity of a dummy stylus.

Noise removal described in the eleventh or twelfth embodiment is not limited to the active matrix type LCD but can be applied to any other type of LCD.

For detecting a contact position of a stylus according to a conventional electrostatic coupling method, pulses are applied onto a bus and a detected signal provided by the stylus is sampled. A position on the bus at which the detected signal has a peak value is detected as a contact position. Resolution in position detection is expressed as a spacing between adjoining positions on a bus. It is demanded to improve the resolution in detection of a contact position of a stylus, so that position detection can be carried out with resolution that corresponds to a value more precise than the spacing between positions on a bus. The thirteenth embodiment permits position detection with resolution that corresponds to a higher precision than the spacing between positions on a bus.

Figure 43A:
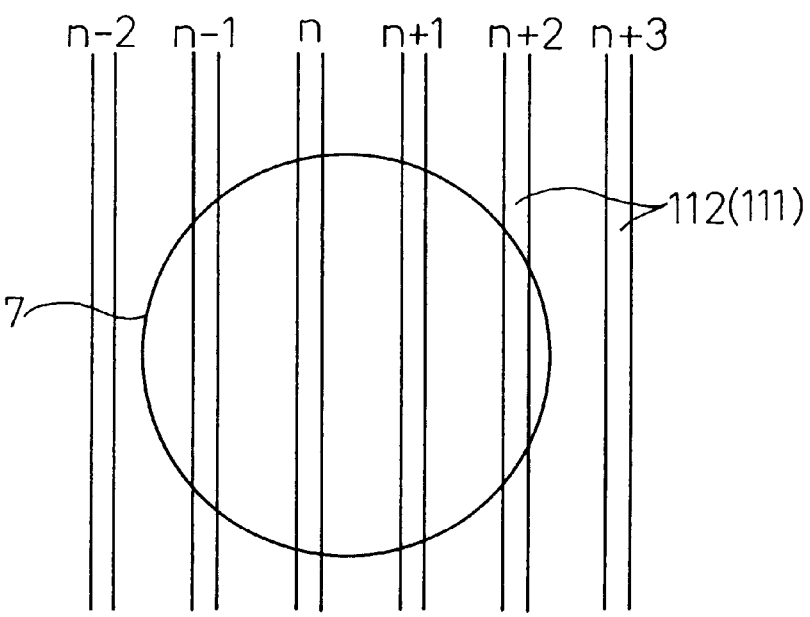
FIGS. 43A and 43B are explanatory diagrams concerning the principle of the thirteenth embodiment.
Figure 43B:
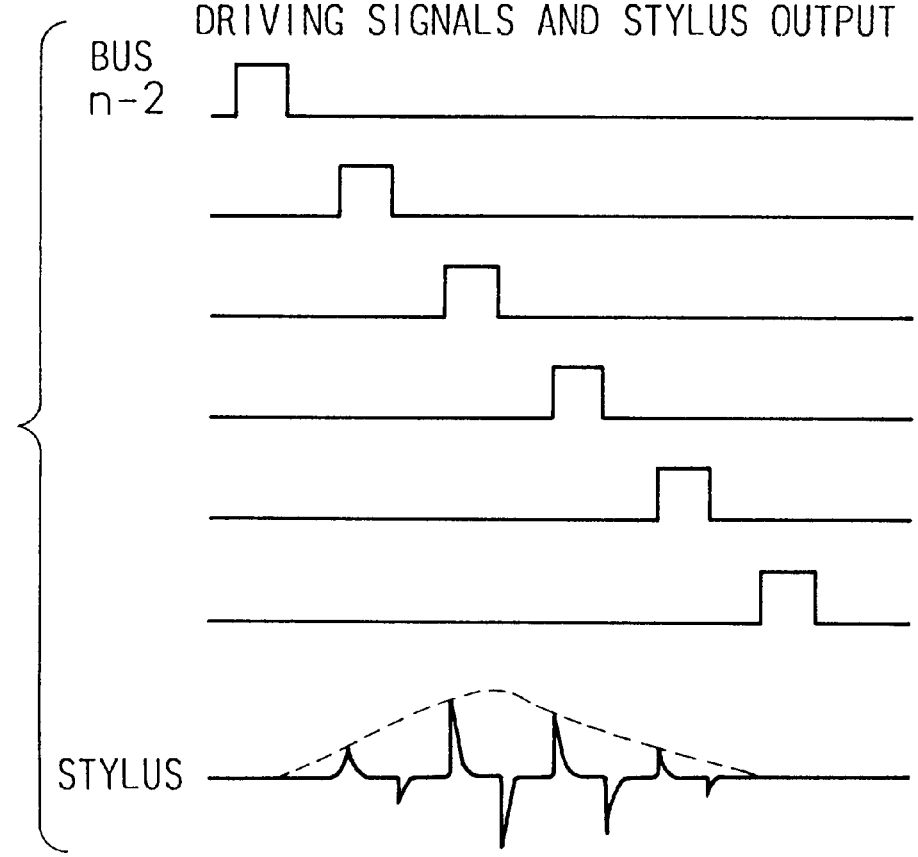

FIGS. 43A and 43B are explanatory diagrams concerning the principle of the thirteenth embodiment.

FIG. 43A shows the positional relationships between the tip of the stylus 7 in contact with the liquid-crystal panel and lines n−1, etc., and n+3. As illustrated, the center of the tip of the stylus 7 is not always located on any of buses. The tip of the stylus 7 lies near a plurality of lines and has certain amounts of capacitance relative to the lines. The capacitance relative to the bus located most closely to the center of the tip of the stylus is the highest. The capacitance decreases as the distance of a line from the center of the tip of the stylus 7 increases. When the distance exceeds a certain value, the capacitance becomes negligible. When the pulses shown in FIG. 43B are applied to the lines, the stylus provides an output having pulses dependent on the mutual capacitance between the stylus 7 and lines. A curve linking the apices of the pulses in the output associated with the lines shows the position of the tip of the stylus 7. When the peak values corresponding to the pulses are interpolated, the center of the tip of the stylus 7 can be detected with high resolution.

Figure 44:
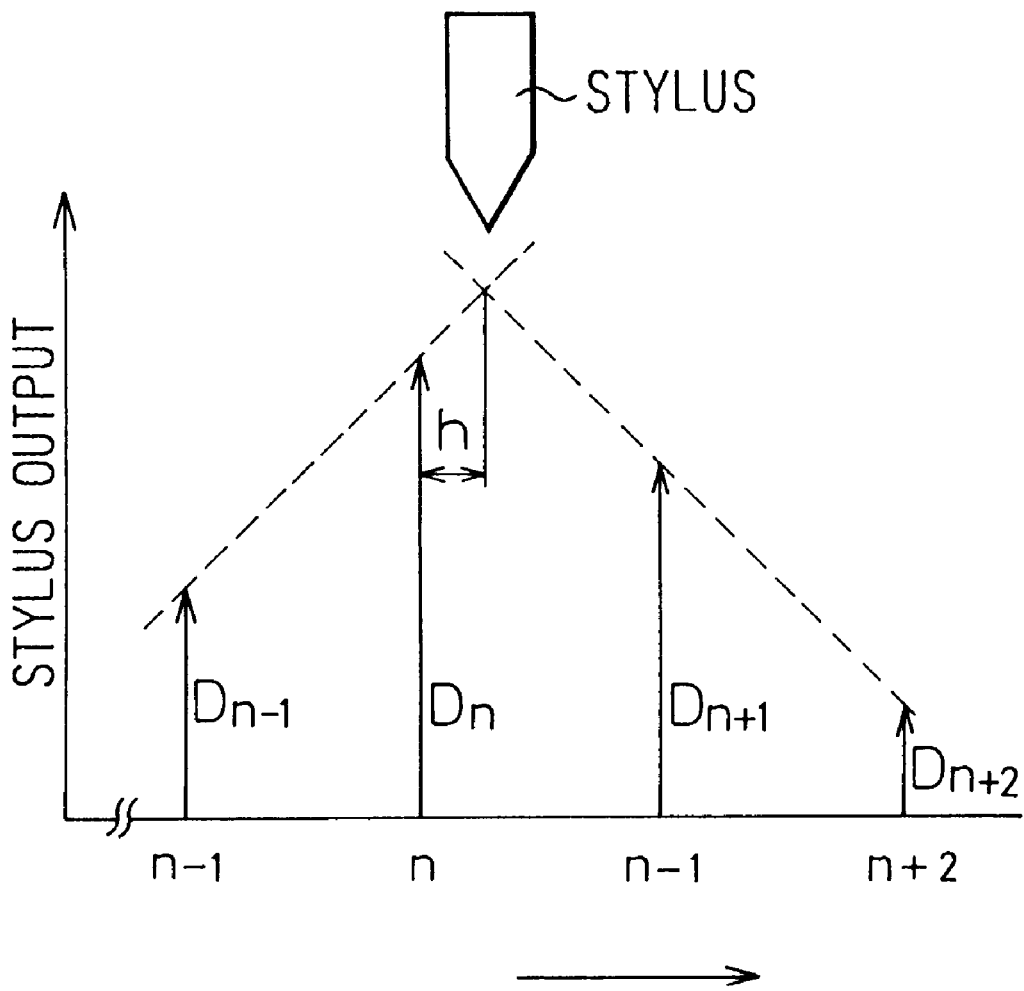
FIG. 44 is an explanatory diagram concerning a method of calculating the center of a stylus through interporation in the thirteenth embodiment.

FIG. 44 is an explanatory diagram concerning a method of calculating a contact position of a stylus in the thirteenth embodiment. In the thirteenth embodiment, the peak values corresponding to pulses are interpolated by performing linear approximation in order to calculate the center of the tip of the stylus 7. The expression shown in FIG. 44 is an example of linear approximation-based interpolation of four sequential peak values.

The method of improving resolution in position detection through interpolation in the thirteenth embodiment is not limited to the active matrix type LCD but may be applied to any other type of LCD.

The aforesaid embodiments are all concerned with detection of a contact position of the stylus 7 on the panel 1. A y-coordinate is identified according to the timing that a display scanning pulse passes through a position of a stylus, and an x-coordinate is identified according to the timing that a horizontal scanning pulse passes through the position of the stylus. A rate at which coordinates pointed to by a stylus can be updated is normally 60 Hz in the first to third embodiments. Using the configuration of the fourth or fifth embodiment, the update rates of y- and x-coordinates improve. Using the configuration of the sixth, seventh, or ninth embodiment, the update rate of an x-coordinate is improved.

Figure 45A:
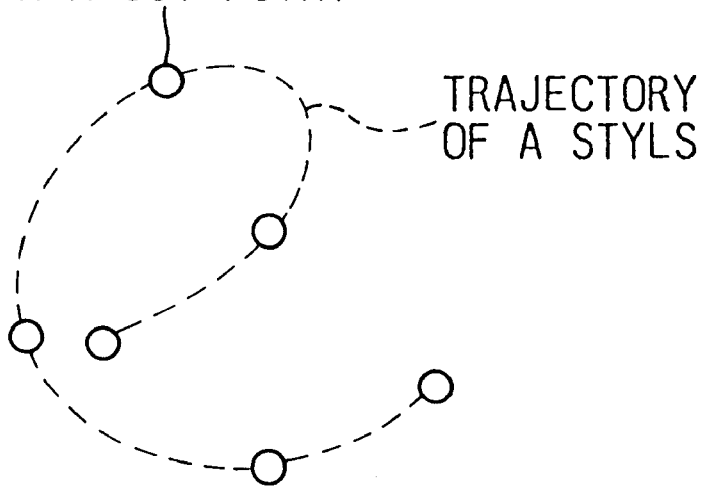
FIGS. 45A and 45B are explanatory diagrams concerning a method of recognizing a hand-written letter using the capability of a tablet.
Figure 45B:
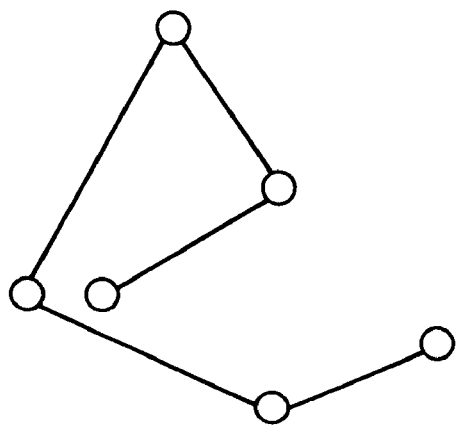

When any of items displayed is selected by pointing to it with a stylus, the foregoing update rate of coordinates causes no particular problem. When a stylus is used to manually enter characters or graphics, a high coordinate update rate is required. The update rates permitted by the first to third embodiments cannot be said to be satisfactory. FIGS. 45A and 45B are explanatory diagrams concerning an example of a problem occurring when a tablet permitting a low coordinate update rate is used to recognize a hand-written character. FIG. 45A shows a trajectory of a stylus used to enter a lowercase alphabetic letter "e" and points detected by the capability of a tablet. Herein, six contact positions are detected during entry of one letter. The result of reading is as shown in FIG. 45B.

A trajectory of a stylus is originally a curve shown in FIG. 45A. A graphic drawn by linking detected coordinates is, as shown in FIG. 45B, considerably different from the original trajectory. Character recognition software must be able to infer the letter "e" from the graphic shown in FIG. 45B. When more accurate recognition is required, a technique such as curvilinear approximation is used. The recognition sequence becomes therefore complex. There is a demand for accurate recognition through simple approximation. The example shown in FIG. 45A is concerned with a simple character. Accuracy in recognition does not become a serious problem. As far as more complex characters or graphics are concerned, simple approximation does not allow accurate recognition. Even when a simple character is concerned, if the moving speed of a stylus increases, the number of coordinates detectable during entry decreases. The simple character cannot be recognized accurately. As a solution of this problem, it is conceivable to limit the moving speed of a stylus and to increase the number of detectable coordinates. This solution is unacceptable in practice. The fourth embodiment solves this problem despite a simple configuration.

Figure 46:
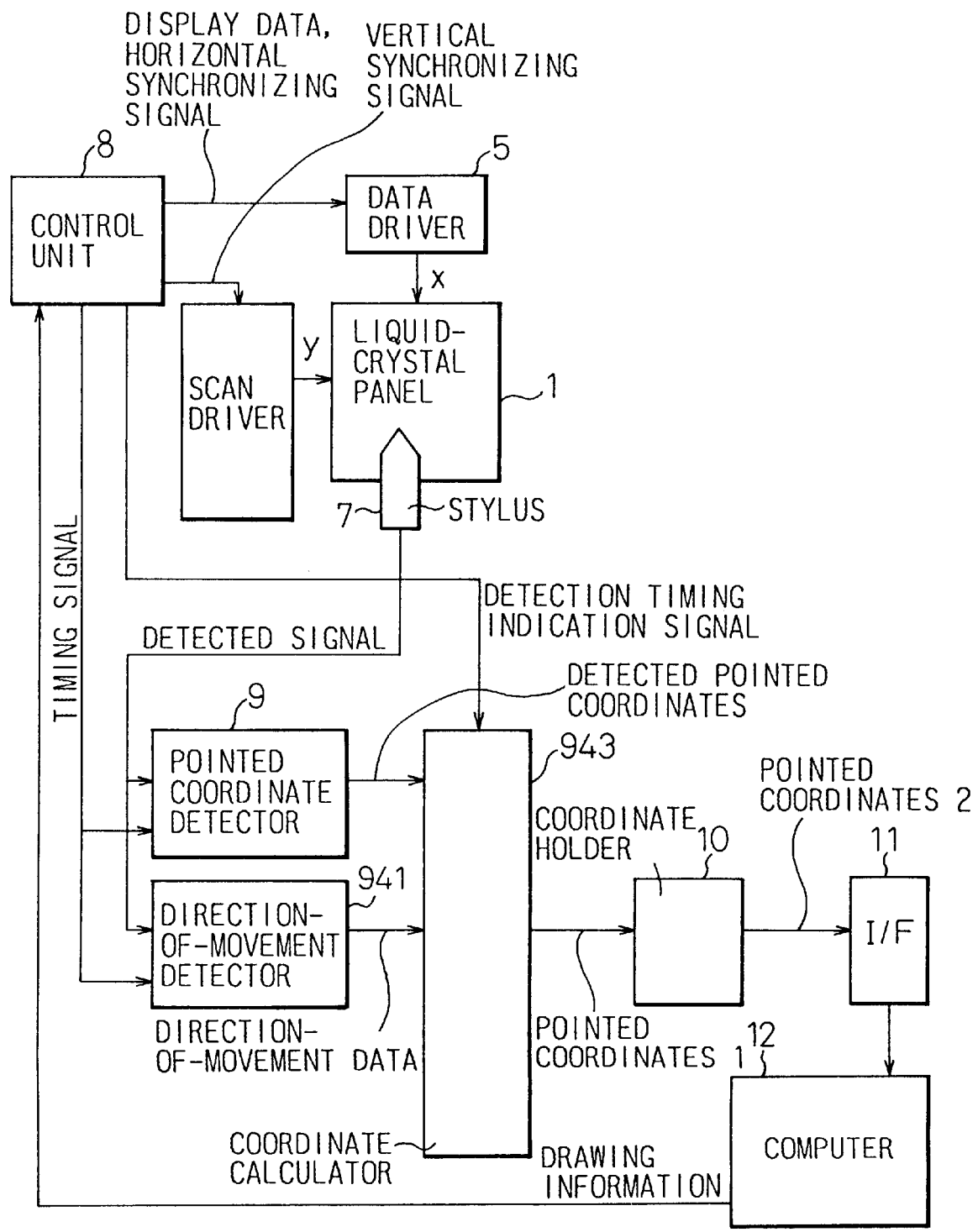
FIG. 46 shows the configuration of the fourteenth embodiment.
Figure 47:
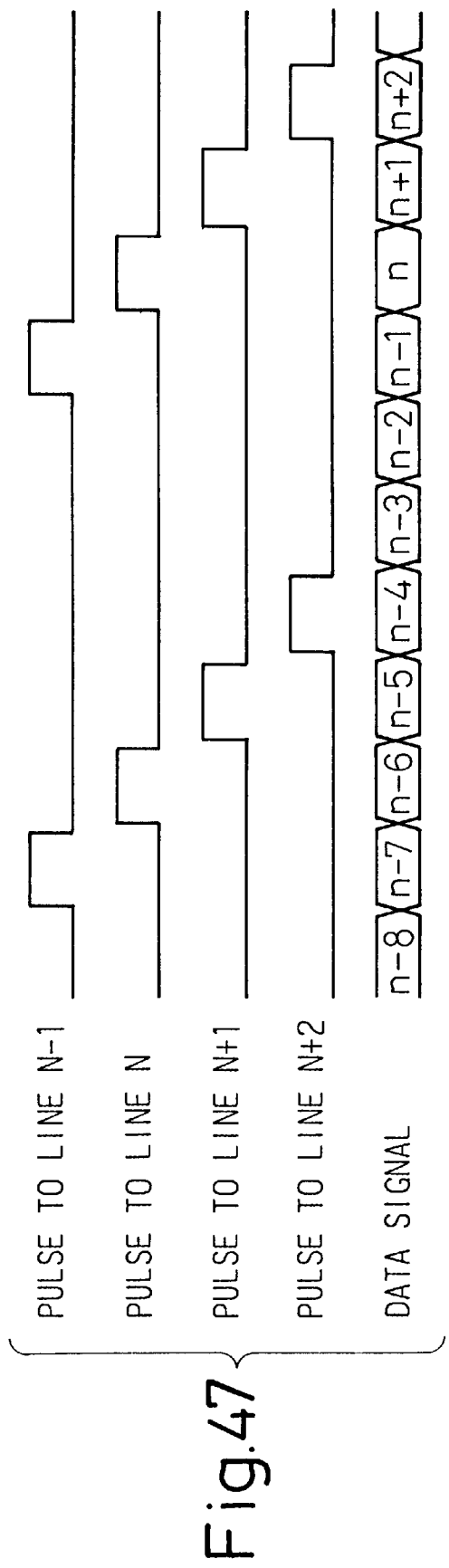
FIG. 47 shows display scanning pulses in the fourteenth embodiment.
Figure 48:
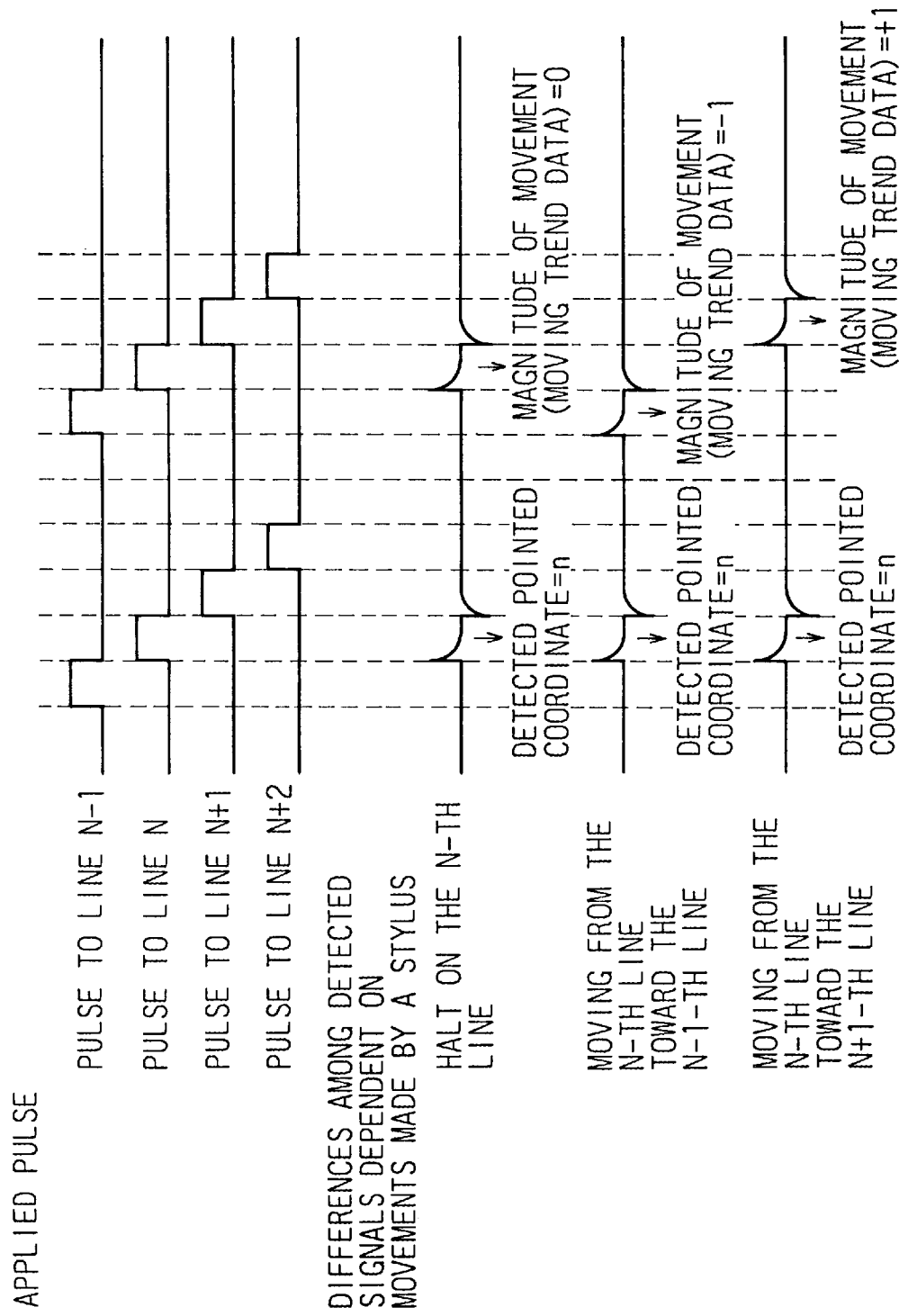
FIG. 48 shows examples of a detected signal that varies responsively to display scanning pulses in the fourteenth embodiment.
Figure 49:
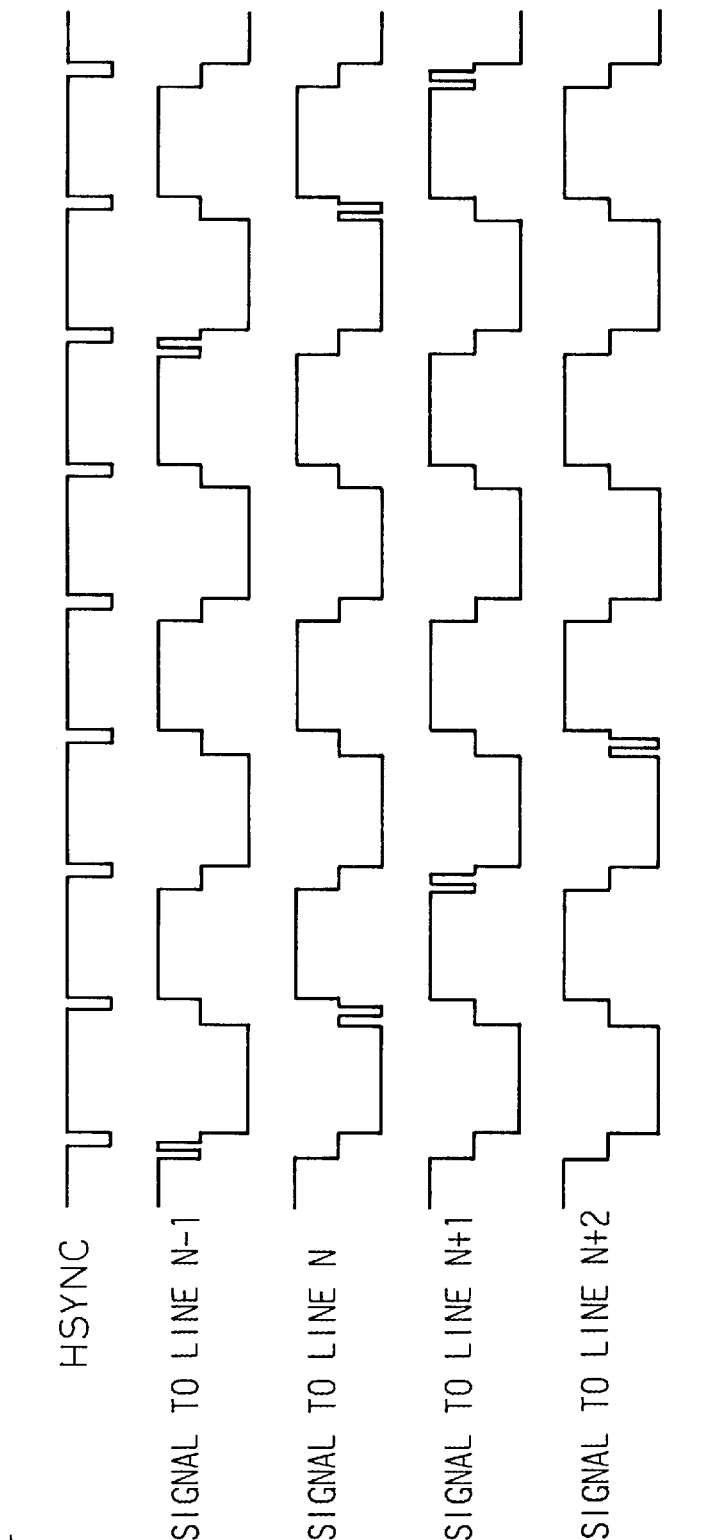
FIG. 49 shows a data signal and horizontal scanning pulses in the fourteenth embodiment.

FIG. 46 shows the configuration of an LCD having the capability of a tablet in the fourteenth embodiment. FIG. 47 shows scanning pulses and a data signal in the fourteenth embodiment. FIG. 48 shows detected signals provided by a stylus responsively to scanning pulses in the fourteenth embodiment. FIG. 49 shows signals applied to data electrodes in the fourteenth embodiment.

As apparent from comparison with FIG. 11, the fourteenth embodiment further includes a direction-of-movement detector 941 and a coordinate calculator 943. As shown in FIG. 47, a display scanning pulse provided by the scan driver 4 is composed of two pulses separated by a time interval corresponding to a period during which six display lines are scanned. Display data to be written in each display line is fed synchronously with the second pulse applied to the display line. Consequently, data is written in six display lines synchronously with the first pulses, and data written in six different display lines is displayed during a display period. Assuming that the number of display lines is 400, a period during which different data is displayed is about 1.5%. No problem will occur in terms of display quality.

As shown in FIG. 49, the data driver 5 outputs horizontal scanning pulses during a horizontal-retrace period similarly to the one in the sixth embodiment shown in FIG. 33. For brevity's sake, the number of display lines constituted by scan electrodes is the same as the number of data electrodes. One horizontal scanning pulse is applied during each horizontal-retrace period. A horizontal scanning pulse is composed of two pulses applied to data electrodes separated by six display lines.

A detected signal provided by a stylus responsive to a scanning pulse will be described with reference to FIG. 48.

Referring to FIG. 48, it is seen that there are applied pulses and differences between the detected signals depending on movements made by a stylus. One of the movements of the stylus is such that the stylus halts on the n-th display line. Another movement thereof is such that the stylus moves from the n-th display line toward the (n−1)-th display line. Yet another movement thereof is such that the stylus moves from the n-th display line toward the (n+1)-th display line.

In case the stylus halts on the n-th display line, as illustrated, the detected signal has a peak value with application of both the first and second scanning pulses to the n-th display line. When the first scanning pulse is applied, the second scanning pulse is applied to the (n−6)-th display line. It is not recognizable whether the peak value is responsive to the first or second pulse. However, when the first scanning pulse is applied to the (n−6)-th display line, the peak value is not detected in the detected signal. Therefore, it is determined that the stylus is in contact with the n-th display line but not with the (n−6)-th line. Likewise, when the second scanning pulse is applied to the n-th line, the first scanning pulse is applied to the (n+6)-th line. Since it has already been detected that when the first scanning pulse is applied to the n-th line, the detected signal has the peak value. It is therefore determined that the stylus is in contact with the n-th display line. Thus, when the stylus is stopped, the detected signal has the peak value at the same line position responsively to both the first and second scanning pulses. There is no change between the line position detected using the first scanning pulse and the one detected using the second scanning pulse. In other words, when there is no change between detected line positions; that is, when the peak value is detected in the detected signal at the same line position, it is determined that the stylus is stopped.

When the stylus moves from the n-th display line toward the (n−1)-th line, the peak value is detected in the detected signal on the n-th line in response to the first scanning pulse and on the (n−1)-th line in response to the second scanning pulse. The change between the lines concerned is expressed as −1. When the stylus moves from the n-th line toward the (n+1)-th line, the peak value is detected in the detected signal on the n-th line in response to the first scanning pulse and on the (n+1)-th line in response to the second scanning pulse. The change between the lines is expressed as +1. That is to say, when a position at which the peak value is detected, in response to the second scanning pulse, is located above a position at which the peak value is detected in response to the first scanning pulse, it is determined that the stylus is moving up. When the position at which the peak value is detected in response to the second scanning pulse is located below the position at which the peak value is detected in response to the first scanning pulse, it is determined that the stylus is moving down.

FIG. 48 is concerned with an explanation of display scanning pulses. The same applies to horizontal scanning pulses. It is determined whether the stylus is moving left or right on a screen or is stopped.

Figure 50A:
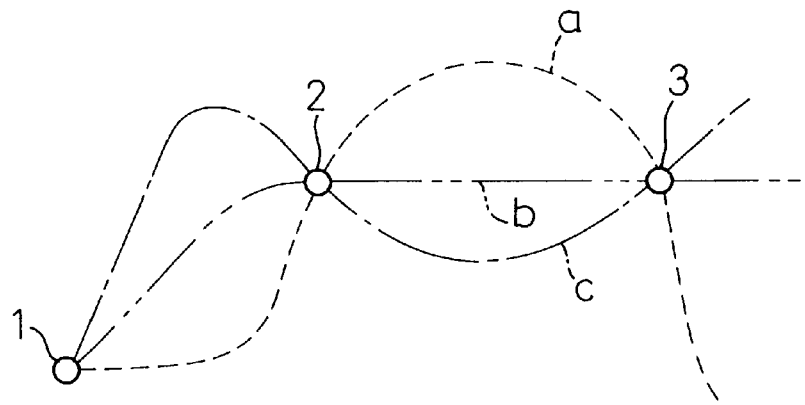
FIGS. 50A and 50C show effects of detecting a direction of movement in the fourteenth embodiment.
Figure 50B:
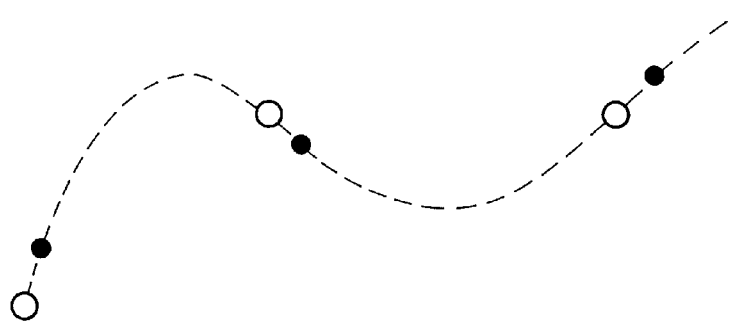
Figure 50C:
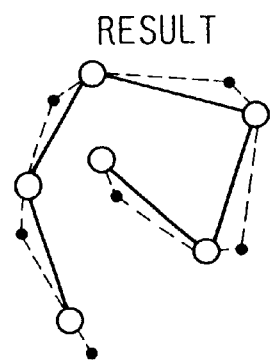

Once a direction of movement in a vertical or horizontal direction can be detected, a direction of two-dimensional movement on a screen can be identified. Referring to FIGS. 50A to 50C, this effect will be described.

FIG. 50A shows an example of the trajectories produced by a stylus. Even when the stylus produces three trajectories a, b, and c, if the timing of coordinate detection is as illustrated, detected coordinates indicate points 1, 2, and 3. Assuming that an actual trajectory is c and a direction of movement can be detected at each point of coordinates, the directions are determined as shown in FIG. 50B. A trajectory substantially fitted with the trajectory c is predicted. As shown in FIG. 50C, when a lowercase alphabetic letter "e" is entered, if a direction of movement can be identified at each point of coordinates, the resultant trajectory is more closely fitted with the actual one.

In FIG. 46, the coordinate calculator 943 predicts the position at which a stylus will lie, at the time of the next coordinate detection, after the passage of one frame, according to the coordinates of a contact position of the stylus detected by the pointed coordinate detector 9 and the magnitude of movement detected by the direction-of-movement detector 941. In reality, a value calculated by multiplying the magnitude of movement by an elapsed time is added to detected coordinates. Character recognition software running under the computer 12 reads coordinates of a predicted stylus position using the coordinate holder 10 and interface 11, and executes character recognition on the basis of the coordinates.

In the fourteenth embodiment, two pulses are used as a scanning pulse to detect a direction of movement made by a stylus. Alternatively, three pulses may constitute a scanning pulse and be used in pairs to detect directions of movement. A change in direction of movement is detected by calculating a difference between the directions. An LCD of the fifteenth embodiment is identical to the one of the fourteenth embodiment, whereas a change in the direction of movement can be detected.

Figure 51:
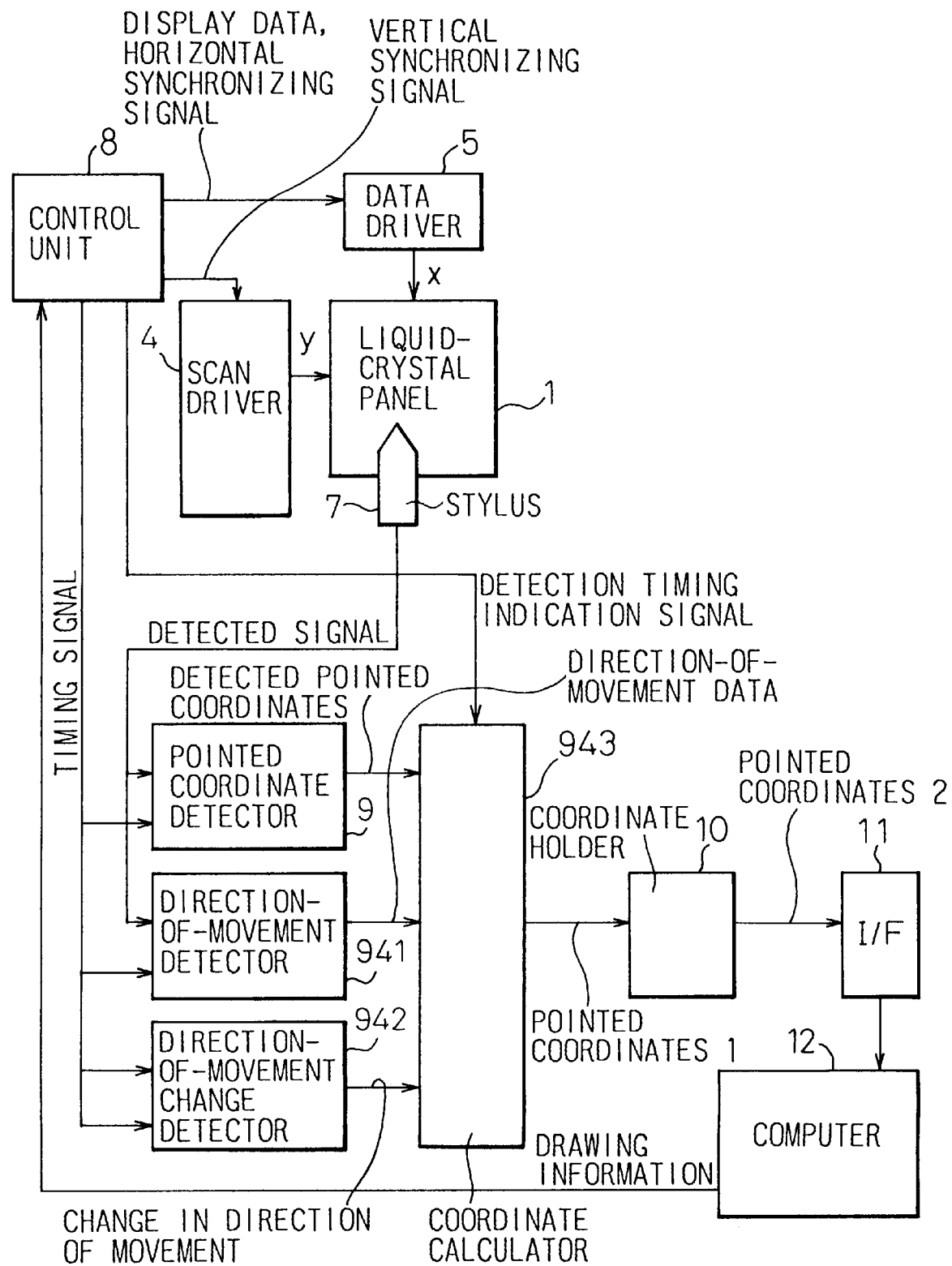
FIG. 51 shows the configuration of the fifteenth embodiment.
Figure 52:
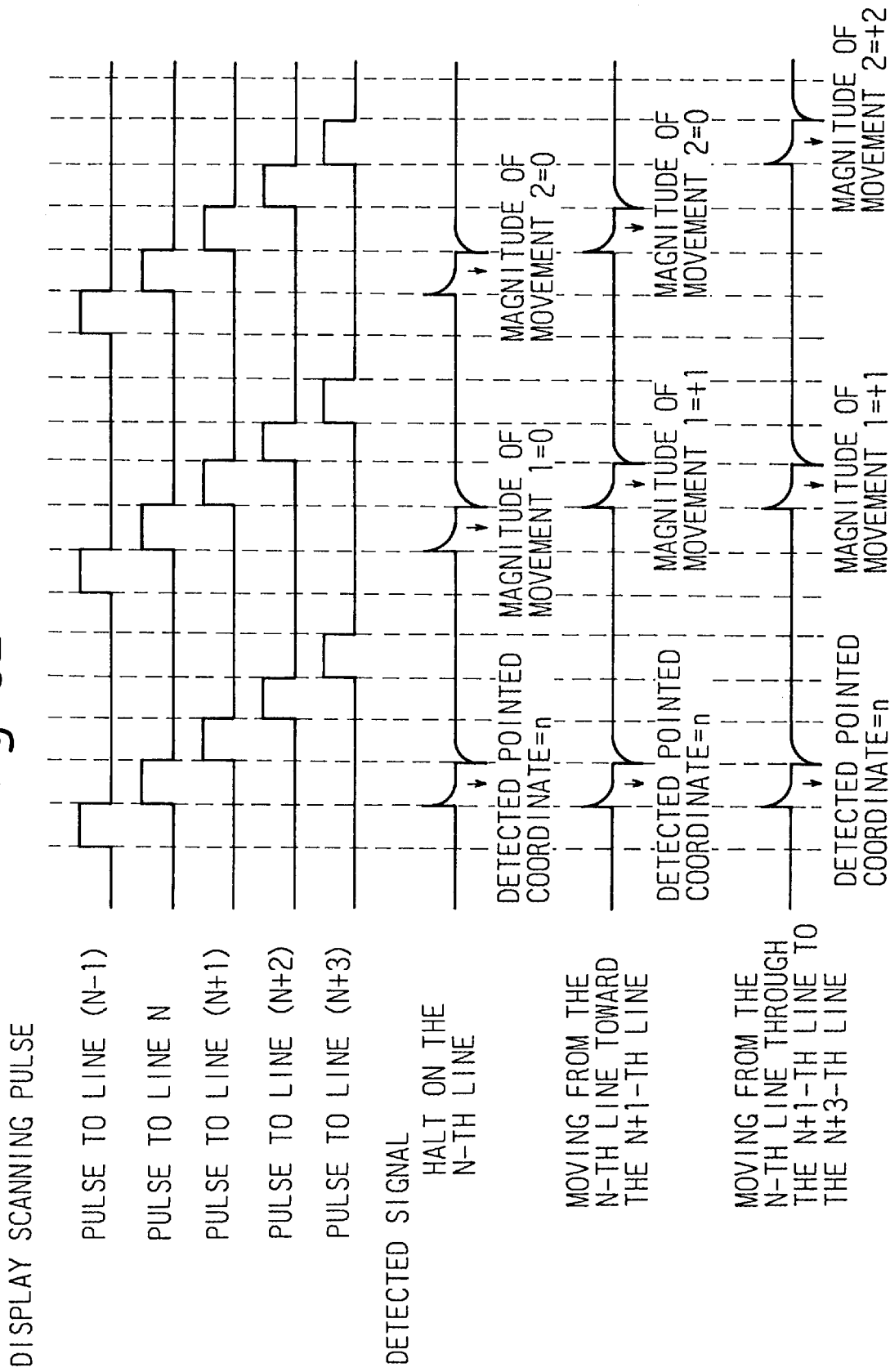
FIG. 52 shows display scanning pulses in the fifteenth embodiment.
Figure 53:
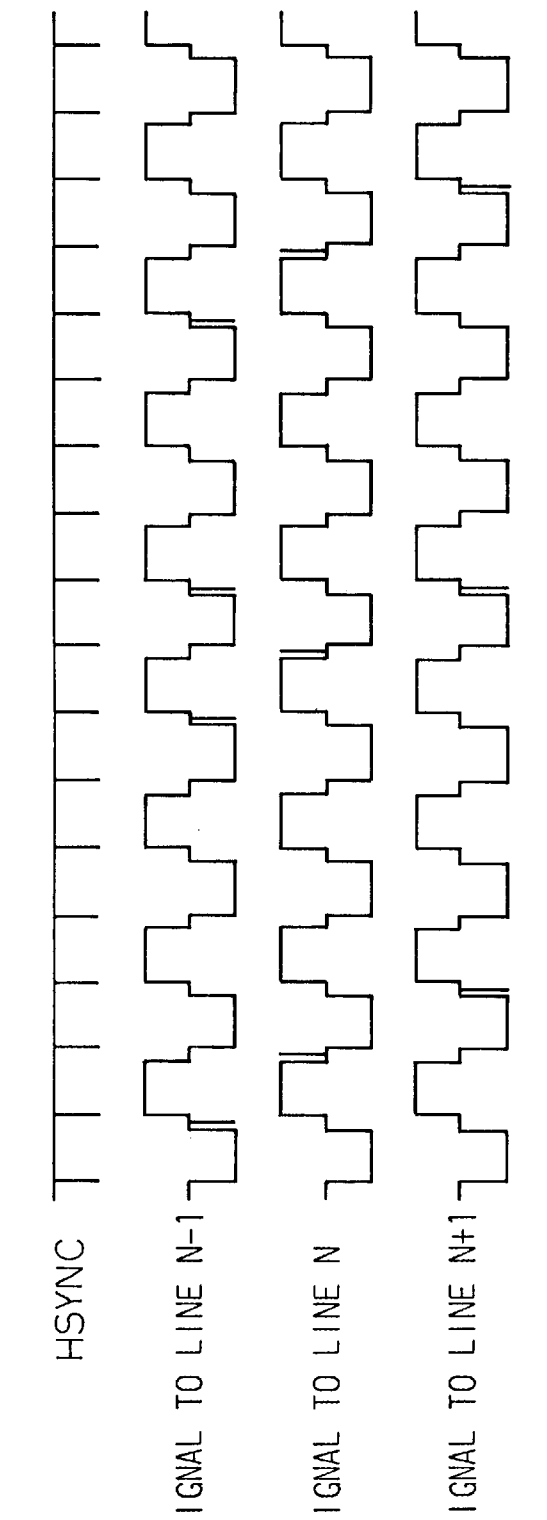
FIG. 53 shows a data signal and horizontal scanning pulses in the fifteenth embodiment.

FIG. 51 shows the configuration of an LCD having the capability of a tablet in accordance with the fifteenth embodiment. FIG. 52 shows scanning pulses and detected signals responsive to the scanning pulses in the fifteenth embodiment. FIG. 53 shows signals applied to data electrodes in the fifteenth embodiment.

The LCD having the capability of a tablet in accordance with the fifteenth embodiment is identical to the LCD of the fourteenth embodiment, whereas a change in direction of movement made by a stylus can be detected. As shown in FIG. 51, the LCD of the fifteenth embodiment includes a direction-of-movement change detector 942 in addition to the components shown in FIG. 46. What is called a display scanning pulse provided by the scan driver 4 is, as shown in FIG. 52, a pulse train composed of three pulses that are applied at intervals of time required for scanning six display lines. Display data to be written in each display line is fed synchronously with the third pulse to be applied to the line. Likewise, what is called a horizontal scanning pulse provided by the data driver 5 is, as shown in FIG. 53, a pulse train composed of three pulses that are applied at intervals of time required for scanning six display columns. The principle of detection using display scanning pulses is the same as the one of detection using horizontal scanning pulses. Detection using display scanning pulses alone will be described with reference to FIG. 52.

As shown in FIG. 52, when the stylus halts on the n-th display line, contact positions of the stylus detected responsively to three scanning pulses are the same. The magnitude of movement calculated using the contact positions detected in response to the second and first scanning pulses is zero. The magnitude of movement calculated using the contact positions detected in response to the third and second scanning pulses is also zero. This means that there is no change in magnitude of movement. When the stylus moves vertically at a certain speed, the magnitude of movement is not zero but constant. When there is no change in magnitude of vertical movement, it is considered that the stylus is moving at a constant speed.

Assuming that a contact position of a stylus detected in response to the first scanning pulse is the n-th display line, a contact position thereof detected in response to the second scanning pulse is the (n+1)-th line, and a contact position thereof detected in response to the third scanning pulse is the (n+1)-th line, the magnitude of movement calculated relative to the second and first scanning pulses is regarded as +1 and the magnitude of movement calculated relative to the third and second scanning pulses is regarded as zero. The movement made by the stylus is decelerated vertically.

Figure 54:
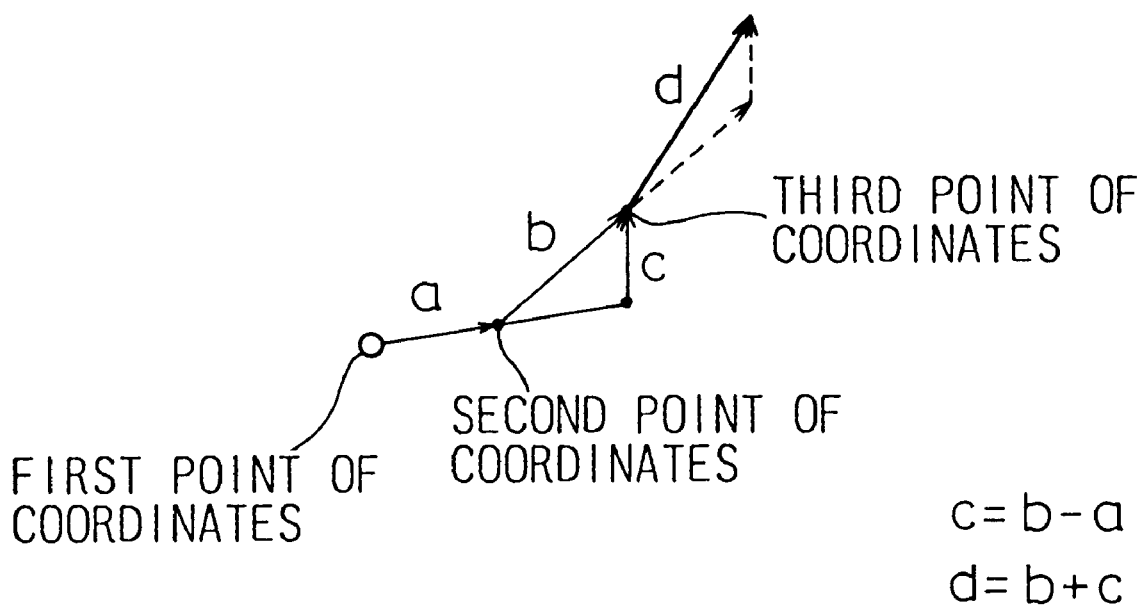
FIG. 54 is an explanatory diagram concerning prediction of a direction of movement made by a stylus in the fifteenth embodiment.

A change in magnitude of the horizontal movement made by a stylus can be detected in the same manner as mentioned above. Once changes in magnitudes of vertical-and horizontal-movements can be detected, the trajectory of the stylus can be identified with higher precision. FIG. 54 shows that stylus trajectory prediction is executed by the time of the next coordinate detection performed by the coordinate calculator 943. Three points of coordinates are detected in response to the first to third scanning pulses for a time interval t. Assuming that a vector directed from the first point of coordinates to the second point of coordinates is a and a vector directed from the second point of coordinates to the third point of coordinates is b, a vector c is expressed as a−b. The magnitude of movement d of the stylus that is predicted to be calculated after the passage of the time interval t is expressed as b+c. A predicted position is calculated by adding the magnitude of movement d to the third point of coordinates. In reality, detection is no longer performed at the end of one frame. Further prediction proceeds in such a manner that movement will be made in the direction of a vector d.

In the fourteenth and fifteenth embodiments, horizontal scanning pulses are applied during a horizontal-retrace period. Alternatively, the application may be performed during a vertical-retrace period. However, since horizontal scanning pulses must be applied to all data electrodes during a short vertical-retrace period, a pulse spacing between adjoining pulses of two or three pulses cannot be increased. Unless the moving speed of a stylus is very high, the direction of movement and a change in direction cannot be detected.

In the fourteenth and fifteenth embodiments, the moving speed of a stylus is lower than the moving speeds of a display scanning pulse or horizontal scanning pulse on a screen. When the stylus is moved quickly, malfunction may occur; that is, a direction of movement or a change in direction may be detected incorrectly. FIG. 55 is an explanatory diagram concerning occurrence of the malfunction.

As shown in FIG. 55, similarly to the fourteenth embodiment, scanning pulses that are separated by the time required for scanning six display lines are applied. Assume that a stylus standing on the n-th line is moved to the (n+1)-th display line synchronously with a scanning pulse and halts there. In response to the first pulse, a peak voltage is developed on the n-th line. In response to the second pulse, a peak voltage is developed on the (n+1)-th line. The magnitude of movement is expressed as +1. However, when the stylus standing on the n-th line is moved quickly to the (n+7)-th line synchronously with a scanning pulse and halts there, the peak voltage is developed on the n-th line responsively to the first pulse. On the (n+1)-th line, the peak voltage is developed responsively to both the first and second pulses. The position of the stylus and magnitude of movement cannot be determined. An LCD in which this kind of problem cannot occur will be introduced as the sixteenth embodiment.

To avoid the problem, a pulse used to detect a pointed coordinate and a pulse used to detect a direction of movement are shaped differently. Thereby, a reaction occurring when a stylus overreaches a pulse can be ignored. For differentiating the pulse used to detect a pointed coordinate from the one used to detect a direction of movement, there is a method of differentiating pulse durations. In the sixteenth embodiment, the number of pulses used to detect a pointed coordinate is one and the number of pulses used to detect a direction of movement is two.

FIG. 56 shows display scanning pulses in the sixteenth embodiment. As shown in FIG. 56, a display scanning pulse is composed of three pulses; that is, the first pulse used to detect a pointed coordinate, and the second and third pulses that are separated by time required for scanning four display lines from the first pulse, mutually separated by time required for scanning two display lines, and used to detect a direction of movement. Likewise, a horizontal scanning pulse is composed of three pulses. The principle of detection is the same between the display scanning pulse and horizontal scanning pulse. Only the principle of detection based on the display scanning pulse will be described, but that based on the horizontal scanning pulse will not. The other components are identical to those of the fourteenth embodiment.

Assuming that a stylus standing on the n-th line is moved to the (n+1)-th line synchronously with a scanning pulse, a peak voltage is developed on the n-th line in response to the first pulse. In response to the second and third pulses, a peak voltage is developed on the (n+1)-th line. The magnitude of movement is therefore determined as +1. Assuming that the stylus standing on the n-th line is moved quickly to the (n+7)-th line synchronously with a scanning pulse and halted there, the peak voltage is developed on the n-th line in response to the first pulse and on the (n+1)-th line in response to the first to third pulses. In this case, the peak voltage developed on the (n+1)-th line in response to the first pulse is ignored. The magnitude of movement is therefore regarded as +7.

Figure 57A:
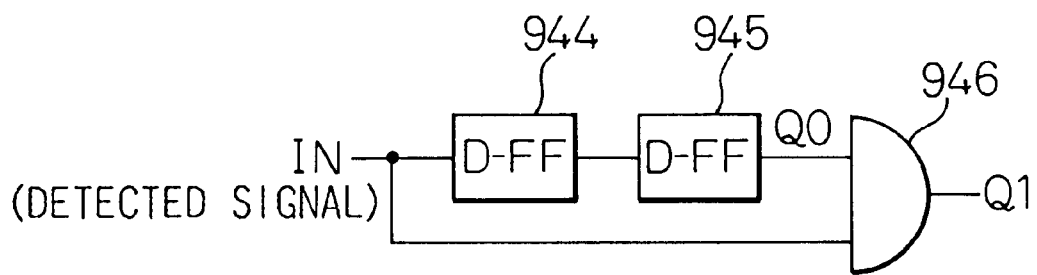
FIGS. 57A and 57B show a circuit for distinguishing two pulses and signals provided by the circuit in the sixteenth embodiment.
Figure 57B:
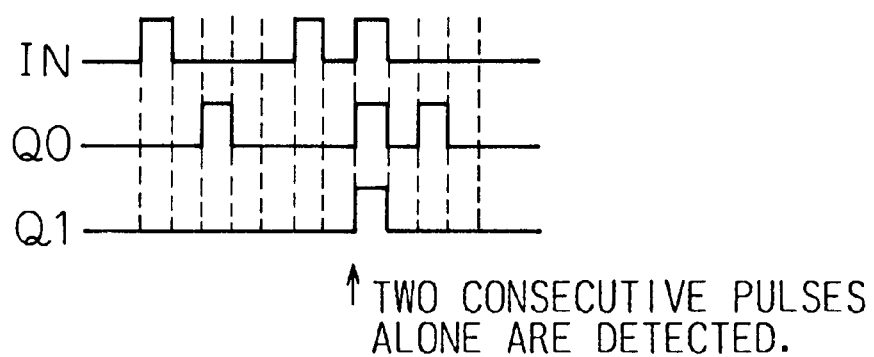

For detecting that a detected signal has the peak voltage in response to the second and third pulses, a circuit the same as the one shown in FIG. 57A is used to calculate the OR of the detected signal and a signal that lags behind the detected signal by time required for scanning two display lines. The resultant signal is used to detect the magnitude of movement.

The sixteenth embodiment has introduced an example of a combination of pulses for detecting a pointed coordinate and pulses for detecting a direction of movement which is devised to distinguish the two kinds of pulses. Various other variants of the sixteenth embodiment are conceivable. For example, the number of pulses used to detect a pointed coordinate may be two or more. Alternatively, the leading edge of a pulse provided by a stylus may be made distinguishable from the trailing edge thereof. The rising edges of pulses used to detect a pointed coordinate are delayed, while the falling edges of pulses used to detect a direction of movement are delayed. Thus, a difference in reaction between two kinds of pulses is detected.

As described above, according to the present invention, there is provided an LCD having the capability of a tablet which offers high image quality, a high response speed, a high detection rate, and reduced power consumption, and which makes it possible to detect a contact position with high resolution. Also provided are an LCD, especially, an active matrix type LCD optimal for the LCD having the capability of a tablet, and a method of driving the LCD.

What is claimed is:

1. A liquid-crystal display having the capability of a tablet, comprising:

an active matrix type liquid-crystal display including:
a device substrate having a plurality of scan electrodes constituting display lines, a plurality of data electrodes constituting display columns, pixel electrodes formed at intersections between said scan electrodes and data electrodes, and switching devices situated at said intersections between said scan electrodes and data electrodes and designed to connect said pixel electrodes to said data electrodes according to voltage levels at said scan electrodes; an opposed substrate for holding a liquid crystal in cooperation with said device substrate and applying common voltage; a scan driver for applying scanning pulses consecutively to said plurality of scan electrodes; and a data driver for applying signals representing display data consecutively to said plurality of data electrodes;
a detecting means that, when brought into contact with the display surface of said liquid-crystal display, detects pulses which are applied consecutively to said scan electrodes and data electrodes, through the electrostatic coupling between said detecting means and said scan electrodes or between said detecting means and said data electrodes, and that outputs a detected signal; and
a position detecting circuit for detecting the contact position on said display surface of said liquid-crystal display on the basis of the relative timing of said detected signal in relation to said pulses applied consecutively to said scan electrodes and data electrodes;
the positions of said scan electrodes situated in the vicinity of the contact position being identified by detecting display scanning pulses that are consecutively applied to said plurality of scan electrodes in order to cause said switching devices to conduct during a display data writing period;
said data driver outputting horizontal scanning pulses that are applied consecutively to said plurality of data electrodes during a data electrode position detection period during which said display scanning pulses are not applied to said scan electrodes; and
positions of said data electrodes situated in the vicinity of the contact position being identified by detecting said horizontal scanning pulses that are applied consecutively to said plurality of data electrodes by said data driver during said data electrode position detection period;
wherein at least one of said horizontal scanning pulses and one of said display scanning pulses are each composed of two or more pulses having a given time lag between them, and wherein said liquid-crystal display having the capability of a tablet detects a direction of movement made by said detecting means on said display surface of said liquid-crystal display and moving speed of said detecting means on the basis of a phase difference between variations of a detecting signal responsive to said two or more pulses having said given time lag between them.

2. A liquid-crystal display having the capability of a tablet according to claim 1, wherein at least one of said horizontal scanning pulses and one of said display scanning pulses are each composed of three or more pulses with a given time lag between adjoining pulses, and wherein said liquid-crystal display having the capability of a tablet comprises a direction of movement detecting circuit which detects changes in the direction of the movement made by said detecting means on said display surface of said liquid-crystal display and in the moving speed of said detecting means on the basis of a plurality of phase differences among variations of a detected signal responsive to said three or more pulses having said given time lag between adjoining pulses.

3. A liquid-crystal display having the capability of a tablet according to claim 2, further comprising a coordinate calculating circuit that predicts a position on said display surface of said liquid-crystal display at which said detecting means lies during a period, during which said detected signal varies in response to said horizontal scanning pulses or display scanning pulses, on the basis of a position of said detecting means on said liquid-crystal display, a direction of movement made by said detecting means, and a change in direction of movement, which are detected by said position detecting circuit, direction-of-movement detecting circuit, and direction-of-movement change detecting circuit, and that outputs the result of the prediction.

4. A liquid-crystal display having the capability of a tablet according to claim 1, wherein said data electrode position detection period is a horizontal-retrace period defined between periods during each of which a data signal concerning each horizontal line is applied to a data electrode.

5. A liquid-crystal display having the capability of a tablet according to claim 1, wherein a horizontal scanning pulse or display scanning pulse that is composed of a plurality of pulses has pulses of different shapes.

6. A liquid-crystal display having the capability of a tablet according to claim 5, wherein said pulses of different shapes constituting a horizontal scanning pulse or display scanning pulse are at least two adjacent pulses and one pulse.

7. A liquid-crystal display having the capability of a tablet according to claim 1, wherein when a display scanning pulses is composed of a plurality of pulses, and a display data signal is applied to a data electrode synchronously with application of the last one of said plurality of pulses.

8. A liquid-crystal display having the capability of a tablet according to claim 1, further comprising a coordinate calculating circuit that predicts a position on said display surface of said liquid-crystal display at which said detecting means lies during a period during which said detected signal varies in response to said horizontal scanning pulses or display scanning pulses, on the basis of a position of said detecting means on said display surface of said liquid-crystal display and a direction of movement made by said detecting means which are detected by said position detecting circuit and direction-of-movement detecting circuit, and that outputs the result of the prediction.

* * * * *